United States Patent [19]
Watanabe et al.

[11] Patent Number: 6,144,517
[45] Date of Patent: *Nov. 7, 2000

[54] MAGNETIC DISK DEVICE AND METHOD OF MANUFACTURING SAME

[75] Inventors: Kenjiro Watanabe, Tokyo; Toru Takeda, Saitama; Satoru Seko, Kanagawa; Kazushige Kawazoe, Kanagawa; Takayasu Muto, Kanagwa; Osamu Morita; Nobuhiro Hayashi, both of Kanagawa; Takehisa Ishida, Tokyo; Hideaki Ishioka; Takamichi Yamakoshi, both of Kanagawa, all of Japan

[73] Assignee: Sony Corporation, Tokyo, Japan

[ * ] Notice: This patent is subject to a terminal disclaimer.

[21] Appl. No.: 09/325,236

[22] Filed: Jun. 3, 1999

Related U.S. Application Data

[63] Continuation of application No. 08/704,435, Aug. 26, 1996, Pat. No. 5,907,448, which is a continuation of application No. 08/331,588, Dec. 12, 1994, abandoned.

[30] Foreign Application Priority Data

Mar. 4, 1993  [JP]  Japan ..................................... 5-069218
Mar. 4, 1994  [WO]  WIPO ........................ PCT/JP94/00350

[51] Int. Cl.[7] ..................................................... G11B 5/596

[52] U.S. Cl. .......................................... 360/77.04; 360/51

[58] Field of Search ............................. 366/77.04, 77.03, 366/78.11, 135, 51, 77.02

[56] References Cited

U.S. PATENT DOCUMENTS

| | | | |
|---|---|---|---|
| 4,764,914 | 8/1988 | Estes et al. | 369/58 |
| 5,257,149 | 10/1993 | Meyer | 360/78.14 |
| 5,296,995 | 3/1994 | Yonezawa et al. | 360/135 |
| 5,297,131 | 3/1994 | Tanaka | 369/275.2 |
| 5,341,249 | 8/1994 | Abbott et al. | 360/46 |
| 5,402,278 | 3/1995 | Morita | 360/77.05 |
| 5,907,448 | 5/1999 | Watanabe et al. | 360/77.04 |

FOREIGN PATENT DOCUMENTS

| | | | |
|---|---|---|---|
| 2-165479 | 6/1990 | Japan | G11B 21/10 |
| 2-252119 | 10/1990 | Japan | G11B 5/82 |
| 3-228219 | 10/1991 | Japan | G11B 5/82 |
| 3-259459 | 11/1991 | Japan | G11B 20/10 |
| 5-258311 | 10/1993 | Japan | G11B 7/007 |

OTHER PUBLICATIONS

IBM Technical Disclosure Bulletin, vol. 36, No. 2, Feb. 1993, New York, USA, pp. 57–60, Anonymous: "Servo Scheme Using Capacitive Sensing of Laser Ablated Marks on Magnetic Recording Disks."

Database WPI, Section EI, Week 8245, Derwent Publications Ltd., London, Great Britain, Class T03, An 82–P6310E.

(List continued on next page.)

Primary Examiner—Andrew L. Sniezek
Attorney, Agent, or Firm—Limbach & Limbach L.L.P.; Seoung-Kun Oh

[57] ABSTRACT

A magnetic disk drive device that includes a disk-shaped medium with a magnetic film formed on a surface for recording or reproducing information, and a magnetic head for recording on and reproducing information from the disk-shaped medium. The disk-shaped medium has a data recording region and a control signal recording region. The data recording region is impressed to have convex recording regions for recording data and concave guard bands for separating adjacent recording regions. The control signal recording region has impressed concavities and convexities representing tracking marks (for effecting tracking control of the magnetic head), track number indicating marks and track numbers (for identifying the tracks), and clock marks dividing one circumference into equal intervals along a path of angular movement of the magnetic head. The disk-shaped medium has reduced track pitch and increased recording capacity because the concave guard bands can be very narrow without inducing crosstalk, and the tracking marks, track number indicating marks, and clock marks are impressed as concavities and convexities along the path of angular movement of the magnetic head.

15 Claims, 55 Drawing Sheets

OTHER PUBLICATIONS

EP–A–0 063 935 (Iomega Corp), Nov. 3, 1982.
Database EPI, Section EI, Week 9114, Derwent Publications Ltd., London, Great Britain, Class T03, AN 91–096044.
EP–A–0 420 660 (Sony Corp), Apr. 3, 1991.
IBM Technical Disclosure Bulletin, vol. 36, No. 2, Feb. 1993, New York, USA, pp. 37–38, Anonymous: "Sector Servo Using Patterned Magnetic Media Blocks Written with Magnetic Transitions."
Database WPI, Section EI, Week 8721, Derwent Publications Ltd., London, Great Britain, Class T03, AN 87–116006.
WO–A–87 03130 (XEBEC Dev Part Ltd), May 21, 1987.
Database WPI, Section EI, Week 8226, Derwent Publications Ltd., London, Great Britain, Class T03, AN 82–H6323E.
EP–A–0 054 438 (Matsushita Elec Ind Co Ltd), Jun. 23, 1982.
Database WPI, Section EI, Week 8944, Derwent Publications Ltd., London, Great Britain, Class T03, AN 89–317693.

EP–A–0 339 851 (Int Business Machines Corp), Nov. 2, 1989.

1993 IEEE International Magnetics Conference (Intermag '93), Stockholm, Sweden, Apr. 13–16, 1993, vol. 29, No. 6, pt. 2, ISSN 0018–9464, IEEE Transactions on Magnetics, Nov. 1993, USA, pp. 4030–4032, Watanabe et al.: "Demonstration of Track Following Technique Based on Discrete Track Media."

IEICE Transactions of Fundamentals of Electronics, Communications and Computer Sciences, Jul. 1993, Japan, pp. 1164–1166, H. Yada et al.: "External Clocking PRML Magnetic Recording Channel for Discrete Track Media."

IEICE Transactions on Fundamentals of Electronics, Communications and Computer Sciences, Jul. 1993, Japan, vol. E76–A, No. 7, ISSN 0916–8908, pp. 1161–1163, Ishida et al.: "Discrete–Track Magnetic Disk Using Embossed Substrate."

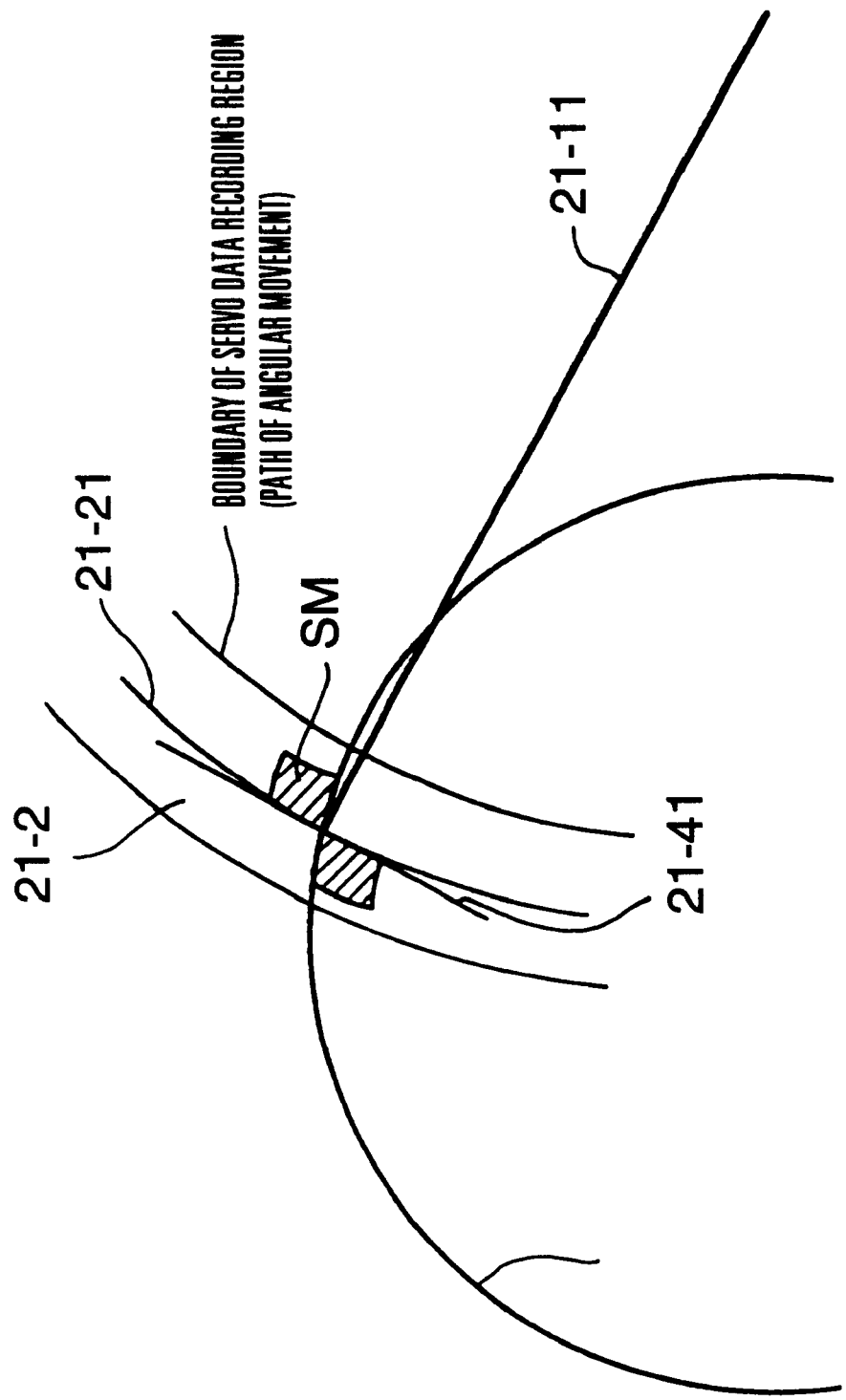

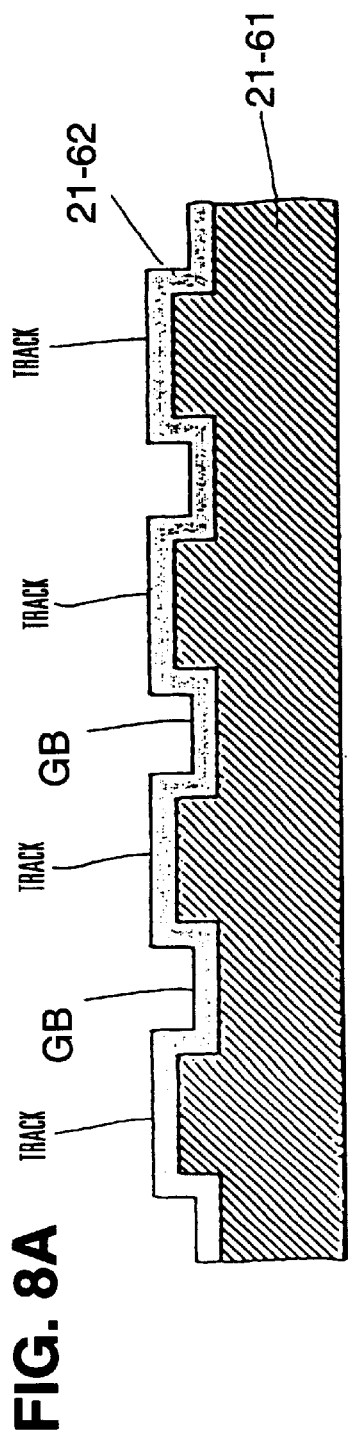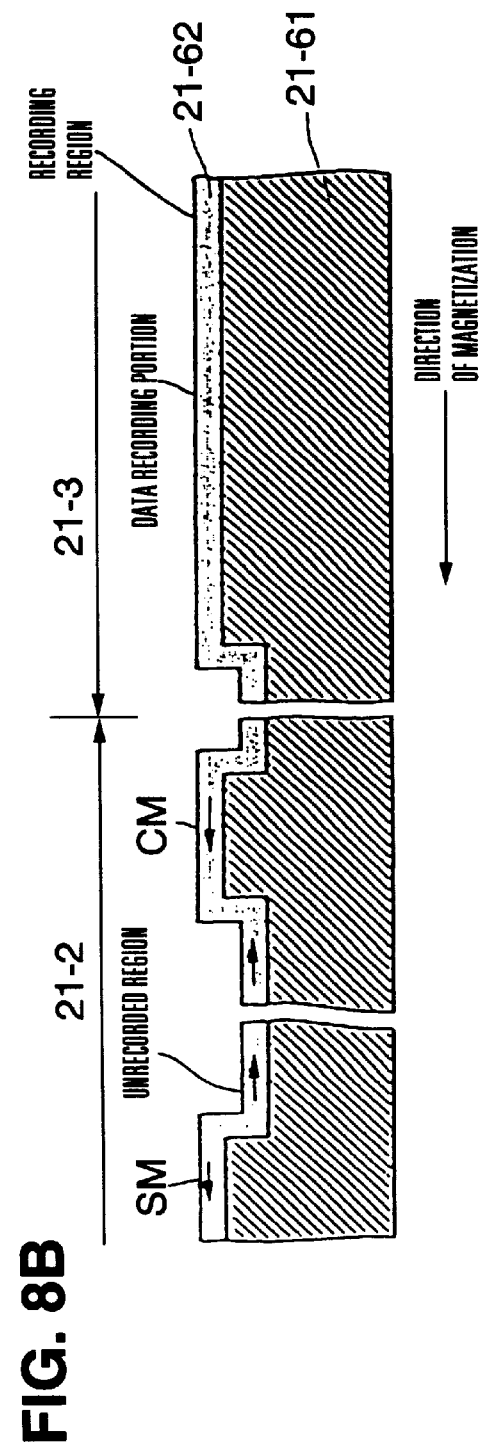
FIG. 8A
FIG. 8B

SHOCK RESPONSE [10 G OR 100 G HALF SINE (11 msec) SHOCK]
RESPONSE TO WAVEFORM FOR SHOCK
(WHEN 10 G OR 100 G HALF SINE SHOCK IS ADDED)

SHOCK RESPONSE [10 G OR 100 G HALF SINE (11 msec) SHOCK]
RESPONSE TO WAVEFORM FOR SHOCK
(WHEN 10 G OR 100 G HALF SINE SHOCK IS ADDED)

SHOCK RESPONSE [10 G OR 100 G HALF SINE (11 msec) SHOCK]
RESPONSE TO WAVEFORM FOR SHOCK
(WHEN 10 G OR 100 G HALF SINE SHOCK IS ADDED)

HEAD PATH UPON APPLICATION OF 100 G SHOCK (WORSE CASE)

FIG. 44A

STATE (+1) ○           ○
                    ↗
STATE (−1) ○ ─────→ ○

FIG. 44B

STATE (+1) ○ ─────→ ○

STATE (−1) ○ ─────→ ○

FIG. 44C

STATE (+1) ○ ─────→ ○
              ↘
STATE (−1) ○           ○

FIG. 52A TRACK PATTERN AS SEEN FROM PLAYBACK HEAD 90-11a
FIG. 52B REPRODUCED SIGNAL
FIG. 52C CLOCK
FIG. 52D SWITCHING SIGNAL
FIG. 52E TRACK PATTERN AS SEEN FROM RECORDING HEAD 90-11b
FIG. 52F WRITE ENABLE SIGNAL
FIG. 52G RECORDING DATA
FIG. 52H DELAYED RECORDING DATA

FIG. 58A TRACK PATTERN
FIG. 58B REPRODUCED SIGNAL
FIG. 58C TIME MEASURING WINDOW SIGNAL

FIG. 64

| SERVO DATA RECORDING REGION: DATA RECORDING SYSTEM | 10 : 90 | 23 : : 77 | 30 : 70 |
|---|---|---|---|
| VARIATION | 13.0nm | 23.0nm | 32.0nm |

FIG. 65

WHEN β = 1

| INPUT CONDITION<br>CONDITION PATTERN | $y_k - y_p \leq -2$<br>A | $-2 < y_k - y_p \leq 0$<br>B | $0 < y_k - y_p$<br>C |
|---|---|---|---|
| UPDATING RULE | $y_p \rightarrow y_k$<br>$\beta \rightarrow -1$ | $y_p \rightarrow y_p,$<br>$\beta \rightarrow \beta$ | $y_p \rightarrow y_k$<br>$\beta \rightarrow +1$ |
| OUTPUT DATA | WHEN β = -1<br>UPDATE = 1<br>DATA = 1<br>p or k = p | WHEN β = *<br>UPDATE = 0<br>DATA = 0<br>p or k = k | WHEN β = 1<br>UPDATE = 1<br>DATA = 0<br>p or k = p |

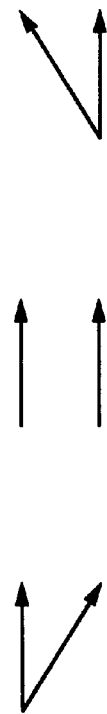

FIG. 66

| WHEN β = -1 | | | |
|---|---|---|---|
| INPUT CONDITION | $y_k - y_p \leq 0$ | $0 < y_k - y_p \leq 2$ | $2 < y_k - y_p$ |
| CONDITION PATTERN | D | E | F |
| UPDATING RULE | $y_p \rightarrow y_k$<br>$\beta \rightarrow -1$ | $y_p \rightarrow y_k$<br>$\beta \rightarrow \beta$ | $y_p \rightarrow y_k,$<br>$\beta \rightarrow +1$ |
| OUTPUT DATA | WHEN β = 1<br>UPDATE = 1<br>DATA = 0<br>p or k = p | WHEN β = *<br>UPDATE = 0<br>DATA = 0<br>p or k = k | WHEN β = 1<br>UPDATE = 1<br>DATA = 1<br>p or k = p |

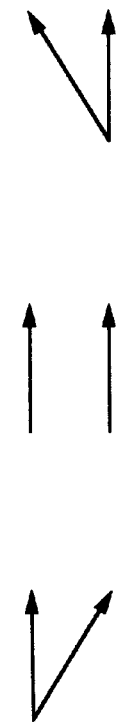

MAGNETIC DISK DEVICE AND METHOD OF MANUFACTURING SAME

This is a continuation of application Ser. No. 08/704,435, filed Aug. 26, 1996, U.S. Pat. No. 5,907,448 which is a continuation of application Ser. No. 08/331,588 filed on Dec. 12, 1994, now abandoned.

TECHNICAL FIELD

The present invention relates to a magnetic disk device suitable for use as a hard disk drive in a computer system, for example, and a method of manufacturing such a magnetic disk device.

BACKGROUND ART

Computer systems employ hard disk devices and can quickly access programs or data recorded in the hard disk devices. In such a hard disk device, a magnetic film is formed on each of the surfaces of a magnetic disk, and data are recorded on and reproduced from the magnetic film by a flying-type magnetic head. The hard disk device comprises a mechanism for actuating the magnetic head and a drive unit for driving the magnetic disk, the mechanism and the drive unit being assembled in a casing. The hard disk device can record data on the magnetic disk at a relatively high density.

The magnetic film is formed on the entire surfaces of the magnetic disk in the conventional magnetic disk device. Therefore, it has been necessary to provide guard bands of relatively large width between tracks in order to suppress crosstalk from adjacent tracks. As a result, a track pitch cannot be reduced, presenting an obstacle to efforts to realize a small-size device having a large recording capacity.

If an encoder clock signal is recorded in advance on a magnetic disk and thereafter the magnetic disk is assembled in a casing, then an attachment error (eccentricity) tends to occur in the assembling process, making it difficult to record and reproduced data in and from an exact position on the magnetic disk. Heretofore, it has been customary to assemble a magnetic disk in a casing, and thereafter record an encoder signal on the magnetic disk. As a consequence, it has been time-consuming and costly to complete the device.

The present invention has been made in view of the above drawbacks, and provides a magnetic disk device which is of a low cost and has a higher-density recording capacity, and a method of manufacturing such a magnetic disk device.

DISCLOSURE OF THE INVENTION

A magnetic disk device of the present invention has a disk-shaped medium (magnetic disk) with a magnetic film formed on a surface for recording or reproducing information, a magnetic head (recording head and playback head) for recording on and reproducing information from said disk-shaped medium, an arm supporting said magnetic head and angularly movable to move said magnetic head to a predetermined radial position on said disk-shaped medium, characterized in that said disk-shaped medium has a data recording region and a control signal recording region (servo data recording region and ID recording region, said data recording region has concentric or spiral tracks formed therein, said tracks being impressed to have convexities as recording portions for recording data and concavities as guard bands for separating adjacent ones of said recording portions, said control signal recording region having impressed concavities and convexities representing tracking marks (wobbled marks for effecting tracking control on said magnetic head, track number indicating marks (gray code and track numbers) for identifying said tracks, and clock marks dividing one circumference into equal intervals, at least one of the marks being formed along a path of angular movement of said magnetic head, the arrangement being such that recording or reproducing operation of said magnetic head is controlled according to a signal produced by reproducing said tracking marks, said track number indicating marks, or said clock marks.

In another aspect of the present invention, the magnetic disk device has a disk-shaped medium (magnetic disks) with a magnetic film formed on a surface for recording or reproducing information, a magnetic head for recording on and reproducing information from said disk-shaped medium, characterized in that said disk-shaped medium has a data recording region and a control signal recording region (servo data recording region and ID recording region), said data recording region has concentric or spiral tracks formed therein, said tracks being impressed to have convexities as recording portions for recording data and concavities as guard bands for separating adjacent ones of said recording portions, said control signal recording region having impressed concavities and convexities representing at least tracking marks (wobbled marks) for effecting tracking control on said magnetic head, track number indicating marks (gray code and track numbers for identifying said tracks, and clock marks dividing one circumference into equal intervals, the arrangement being such that said magnetic head measures a change corresponding to eccentricity of said disk-shaped medium from a signal produced by reproducing said tracking marks, said track number indicating marks, or said clock marks, and recording or reproducing operation of said magnetic head is controlled according to a result of measurement.

The tracking marks, said track number indicating marks, and said clock marks may be provided in 1000 combinations or less per circumference. The control signal recording region may occupy 40% or less of one circumference of said disk-shaped medium, The disk-shaped medium may comprise a resin or glass substrate, for example.

The magnetic head may be separated into a recording head for recording data, and a playback head for reproducing data.

The tracking marks and said track number indicating marks may have first marks used when data are recorded and second marks used when data are reproduced, said second marks being disposed along substantial centers of said tracks, and said first marks being disposed at positions that are displaced a predetermined distance radially from substantial centers of said tracks. The tracking marks and said track number indicating marks may comprise a plurality of marks having the same function.

A change corresponding to eccentricity of said disk-shaped medium may be a positional change measured from said tracking marks or said track number indicating marks, or a time change measured from said clock marks.

An eccentricity control quantity for correcting a positional deviation due to eccentricity of said magnetic head from said tracks may be calculated from the signal produced by reproducing said tracking marks, said track number indicating marks, or said clock marks. The eccentricity control quantity which is calculated may be stored, and the stored eccentricity control quantity may be read out and added to a tracking control signal to effect tracking control on said magnetic head. Alternatively, a clock signal may be generated in synchronism with said clock marks, the time change measured from said clock marks may be stored, and a time base of said clock signal may be corrected according to the stored time change.

The signal produced by reproducing said track number indicating marks may be subjected to CRC calculations simultaneously while the signal is being Viterbi-decoded.

A clock signal may be generated from the signal produced by reproducing said clock marks, recording data may be delayed according to said clock signal, and the delayed recording data may be recorded on said disk-shaped medium.

The magnitude of a relative positional deviation between said magnetic head and said tracks as measured from said tracking marks may be determined, and recording operation on said disk-shaped medium may be controlled according to a result of determination.

A casing which houses the disk-shaped medium and the magnetic head may have only a vent hole.

The disk-shaped medium may have a diameter of about 2.5, 1.8, or 1.3 inches.

A method of manufacturing a magnetic disk device having a disk-shaped medium with a magnetic film formed on a surface for recording or reproducing information, and a magnetic head for recording on and reproducing information from said disk-shaped medium is characterized by the steps of forming a data recording region and a control signal recording region (servo data recording region) on said disk-shaped medium, forming concentric or spiral tracks in said data recording region, said tracks being impressed to have convexities as recording portions for recording data and concavities as guard bands for separating adjacent ones of said recording portions, forming impressed concavities and convexities in said control signal recording region which represent at least tracking marks (wobbled marks) for effecting tracking control on said magnetic head, track number indicating marks (gray code and track numbers) for identifying said tracks, and clock marks dividing one circumference into equal intervals, and assembling said disk-shaped medium and said magnetic head in a casing after said tracking marks, said track number indicating marks, and said clock marks have been formed and recorded on the disk-shaped medium.

The guard bands are formed as physical concavities with respect to the recording portions in which data are recorded in the tracks. Therefore, no data are reproduced from the guard bands, the guard bands are not required to be wide for reducing crosstalk. It is possible to narrow the guard bands, and increase the recording capacity.

The tracking marks, the track number indicating marks, or the clock marks are impressed as concavities and convexities along the path of angular movement of the magnetic head. Therefore, these marks can be arranged highly accurately in desired positions by using optical technology, for example. Even if the track pitch is reduced, data can accurately be recorded and reproduced.

In the magnetic disk device of the present invention, eccentricity of the disk-shaped medium is measured, and recording or reproducing operation is controlled according to the measured eccentricity. Therefore, the magnetic head can accurately access the tracks regardless of eccentricity produced due to an attachment error at the time the magnetic disk is assembled even though the disk-shaped medium on which the tracking marks, the track number indicating marks, and the clock marks are recorded in advance is assembled into the casing.

In the method of manufacturing a magnetic disk device of the present invention, the disk-shaped medium is assembled in the casing after the tracking marks, the track number indicating marks, and the clock marks have been impressed in concavities and convexities on the disk-shaped medium. As a consequence, after the disk-shaped medium has been assembled, any process of recording an encoder thereon is not required, and the magnetic disk device can be completed quickly. As a result, the cost of the magnetic disk device can be lowered.

BRIEF DESCRIPTION OF THE DRAWINGS

FIG. 7 is a diagram showing a planar configuration of the servo data recording region of the magnetic disk according to the present invention;

FIGS. 8A and 8B are cross-sectional views of the magnetic disk according to the present invention;

FIGS. 44A, 44B, and 44C are diagrams illustrative of the states of paths in Viterbi decoding;

FIG. 64 is a table of changes in the amount of floating of the slider at the time it moves over the servo data recording region, with the ratio of the servo data recording region to the data recording region per segment being as a parameter;

FIG. 65 is a table of input conditions, condition patterns, updating rules, and output data when $\beta=1$;

FIG. 66 is a table of input conditions, condition patterns, updating rules, and output data when $\beta=1$.

BEST MODE FOR CARRYING OUT THE INVENTION

Figure 1:
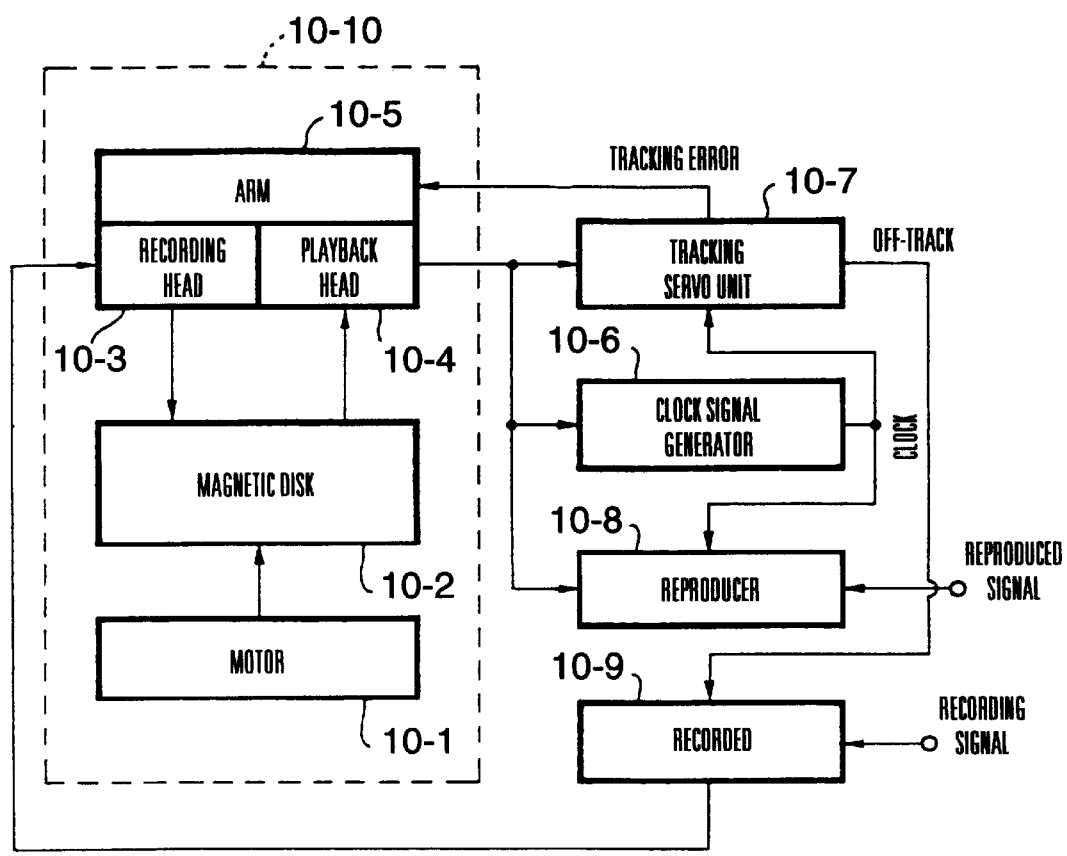
FIG. 1 is a block diagram of an entire arrangement of a magnetic disk device according to the present invention.

FIG. 1 shows an entire arrangement of a magnetic disk device according to the present invention. A motor 10-1 rotates a magnetic disk 10-2 at a predetermined speed. A recording head 10-3 and a playback head 10-4 are mounted on an arm 10-5. The arm 10-5 is angularly movable about a shaft to move the recording head 10-3 and the playback head 10-4 to a radial position over the magnetic disk 10-2. The motor 10-1, the magnetic disk 10-2, the recording head 10-3, the playback head 10-4, and the arm 10-5 are housed in a casing 1010.

The magnetic disk 10-2 has various marks. The playback head 10-4 reproduces the marks and outputs a signal representing the reproduced marks, from which a clock signal generator 10-6 generates and outputs a clock signal to a tracking servo unit 10-7 and a reproducer 10-8. The tracking servo unit 10-7 refers to the clock signal supplied from the clock signal generator 10-6, generates a tracking error signal from the signal outputted from the playback head 10-4, and actuates the arm 10-5 based on the tracking error signal. The recording head 10-3 and the playback head 10-4 are moved under tracking control to a radial position over the magnetic disk 10-2.

A recorder 10-9 receives a recording signal supplied from a circuit (not shown), and causes the recording head 10-3 to record the recording signal on the magnetic disk 10-2. The playback head 10-4 reproduces data recorded on the magnetic disk 10-2 and outputs a signal representing the reproduced data. The reproducer 10-8 demodulates the recorded data from the signal outputted from the playback head 10-4, and outputs the demodulated data to a circuit (not shown), The tracking servo unit 10-7 monitors the tracking error signal and controls the recorder 10-9 to stop recording operation when a large shock is applied to the device to displace the recording head 10-3 off track.

The foregoing description is concerned with the overall arrangement and operation of the magnetic disk device. The present invention is directed to many aspects in the magnetic disk device, and each of such aspects will be described below.

First, an aspect relative to the magnetic disk 10-2 will be described. A format, a planar shape, a cross-sectional shape, a magnetizing process, a surface treatment, and the proportion of servo data regions of the magnetic disk will be described.

Figure 17:
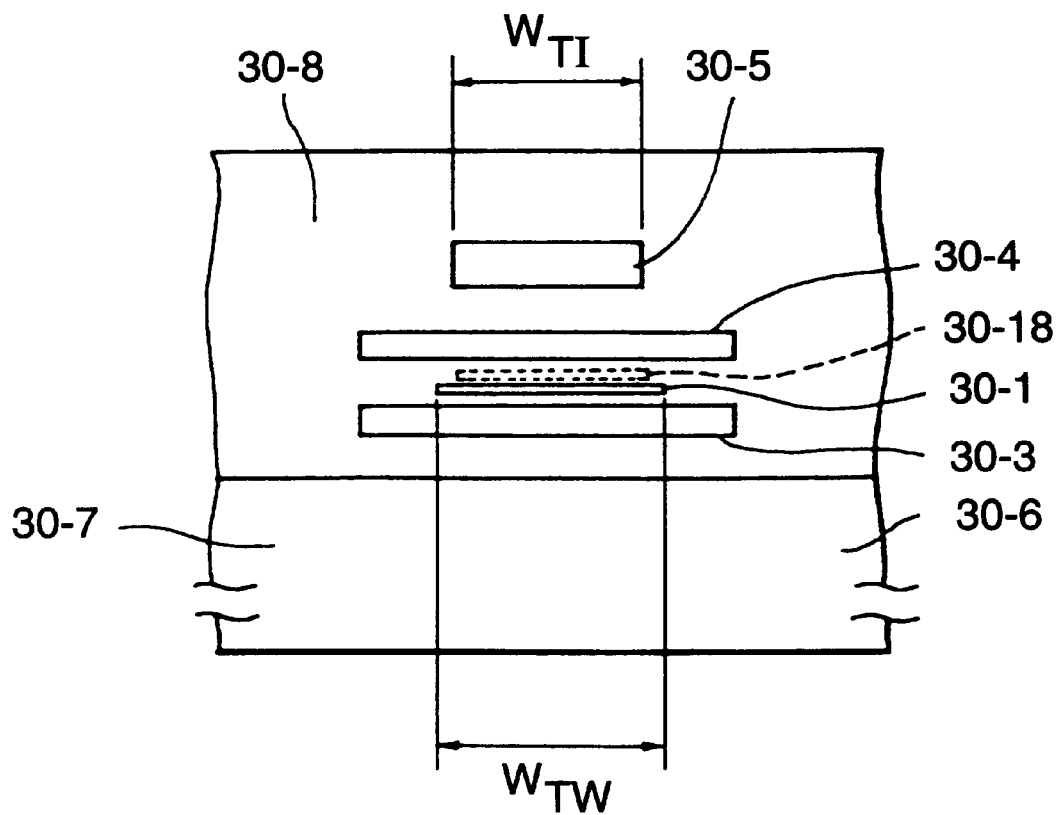
FIG. 17 is a front elevational view of the magnetic head according to the present invention.
Figure 18:
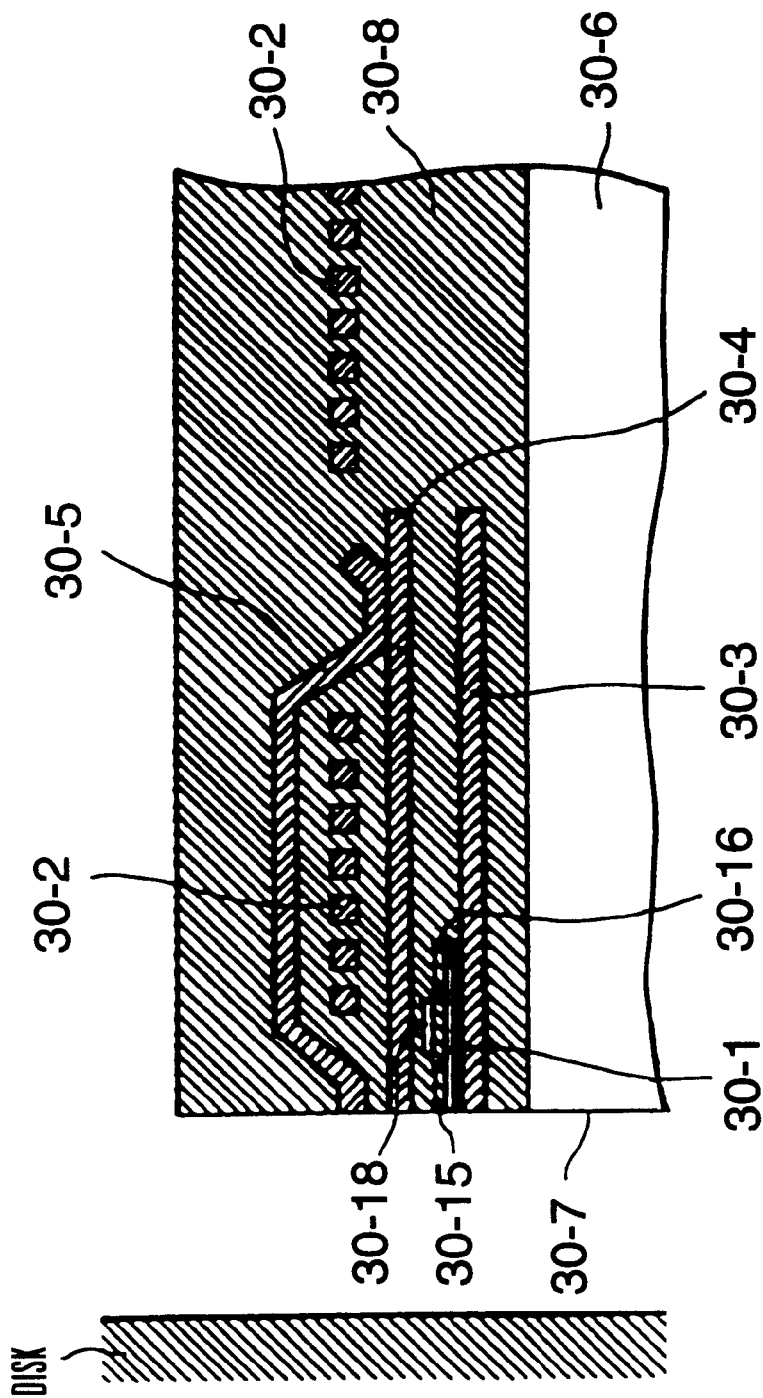
FIG. 18 is a cross-sectional view of the magnetic head according to the present invention.

Then, an aspect with respect to the recording head 10-3 and the playback head 10-4 will be described with reference to FIGS. 17 and 18. A gap and a cross-sectional structure of a magnetic head will be described.

Thereafter, an aspect relative to the arm 10-5 will be described with reference to FIGS. 19 and 20. An arm structure will be described.

After the arm 10-5, an aspect relative to the clock signal generator will be described below with reference to FIGS. 21 through 33. The generation of a clock signal, and a process of measuring eccentricity required for time base correction of the clock signal will be described.

Then, an aspect concerning the tracking servo unit 10-7 will be described with reference to FIGS. 34 through 43. Tracking servo operation and the number of servo data recording regions necessary for tracking servo will be described below. A process of determining an off-track condition using a tracking error signal will also be described.

Furthermore, an aspect relative to the reproducer 10-8 will be described with reference to FIGS. 44 through 50, and an aspect relative to the recorder 10-9 will be described with reference to FIGS. 51 through 58. Reproduction and recording of data will be described.

Finally, an aspect regarding the casing 10-10 will be described with reference to FIGS. 59 through 64. The casing which houses the magnetic head, the magnetic disk, etc. will be described.

To describe each of the aspects in a manner suitable for them, the arrangement shown in FIG. 1 is divided into elements as required, and only necessary elements are picked up and reconstructed. Therefore, technical elements used in the description of each aspect are not held in one-to-one correspondence to the divided elements shown in FIG. 1. This is because only necessary technical elements are rejoined and expressed in order to describe each technical aspect.

The aspect with respect to the magnetic disk 10-2 shown in FIG. 1 will first be described below.

Figure 2:
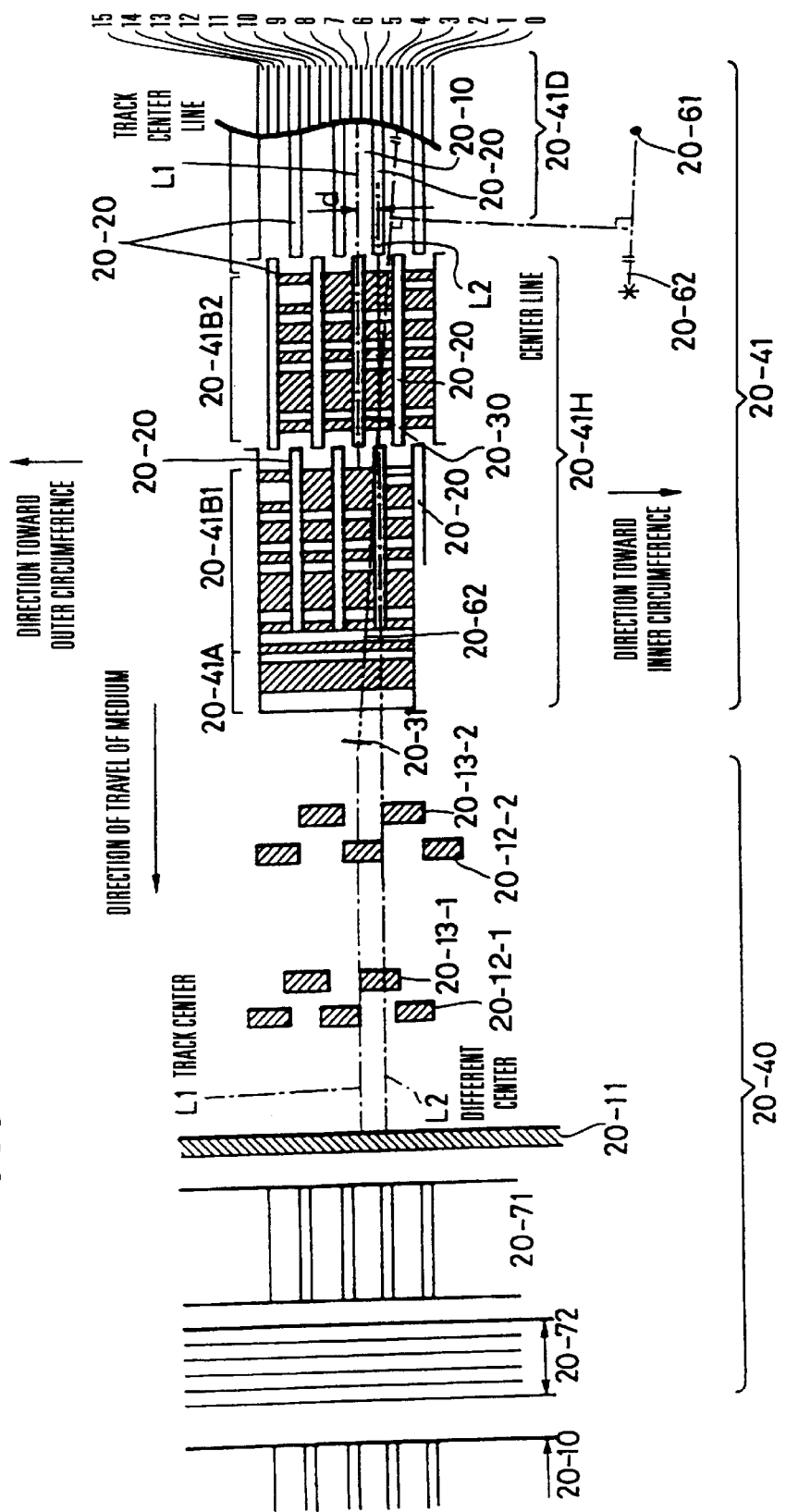
FIG. 2 is a diagram showing formats of a servo data recording region and a data recording region of a magnetic disk according to the present invention.
Figure 3:
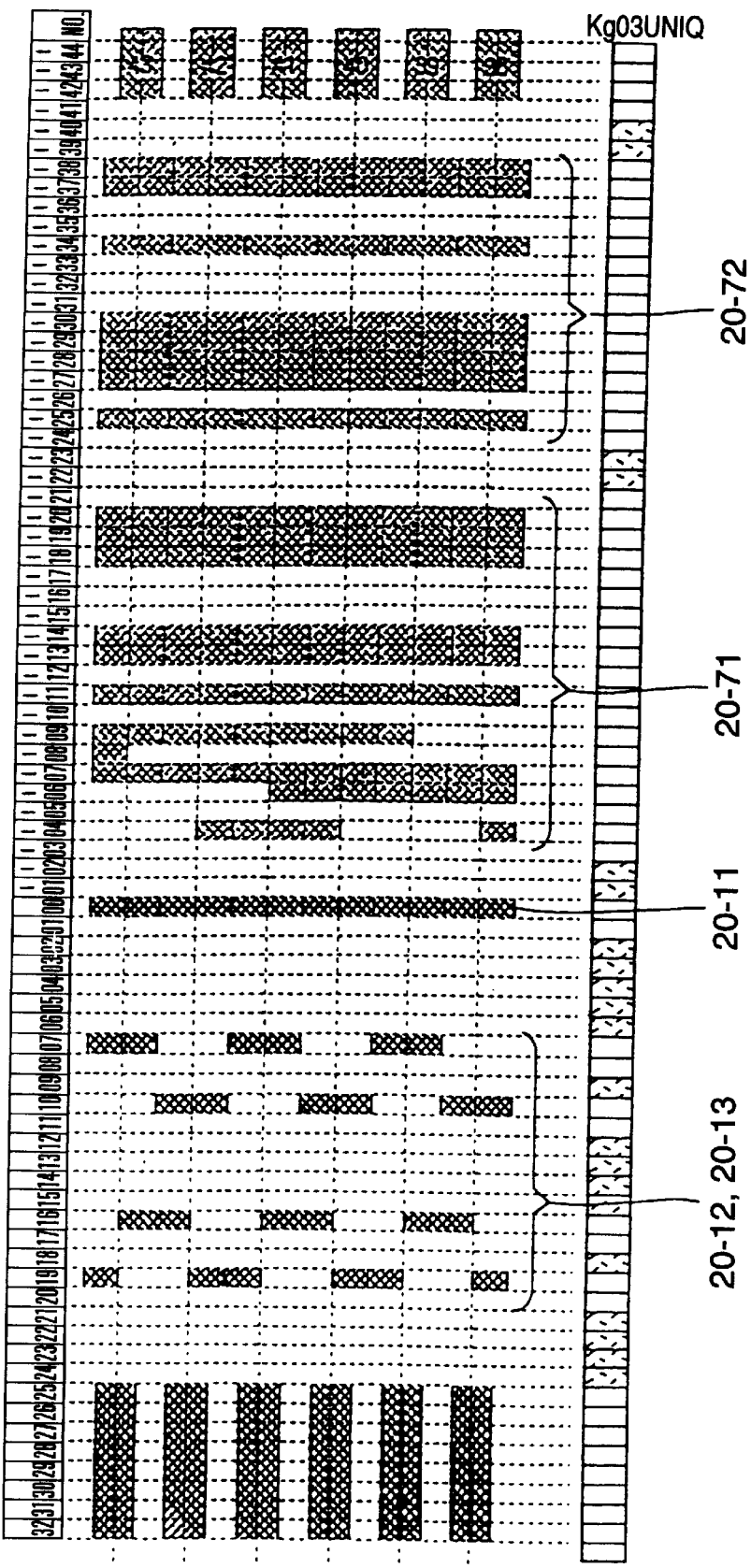
FIG. 3 is a diagram showing a format of a servo data recording region in which a unique pattern exists, of the magnetic disk according to the present invention.
Figure 21:
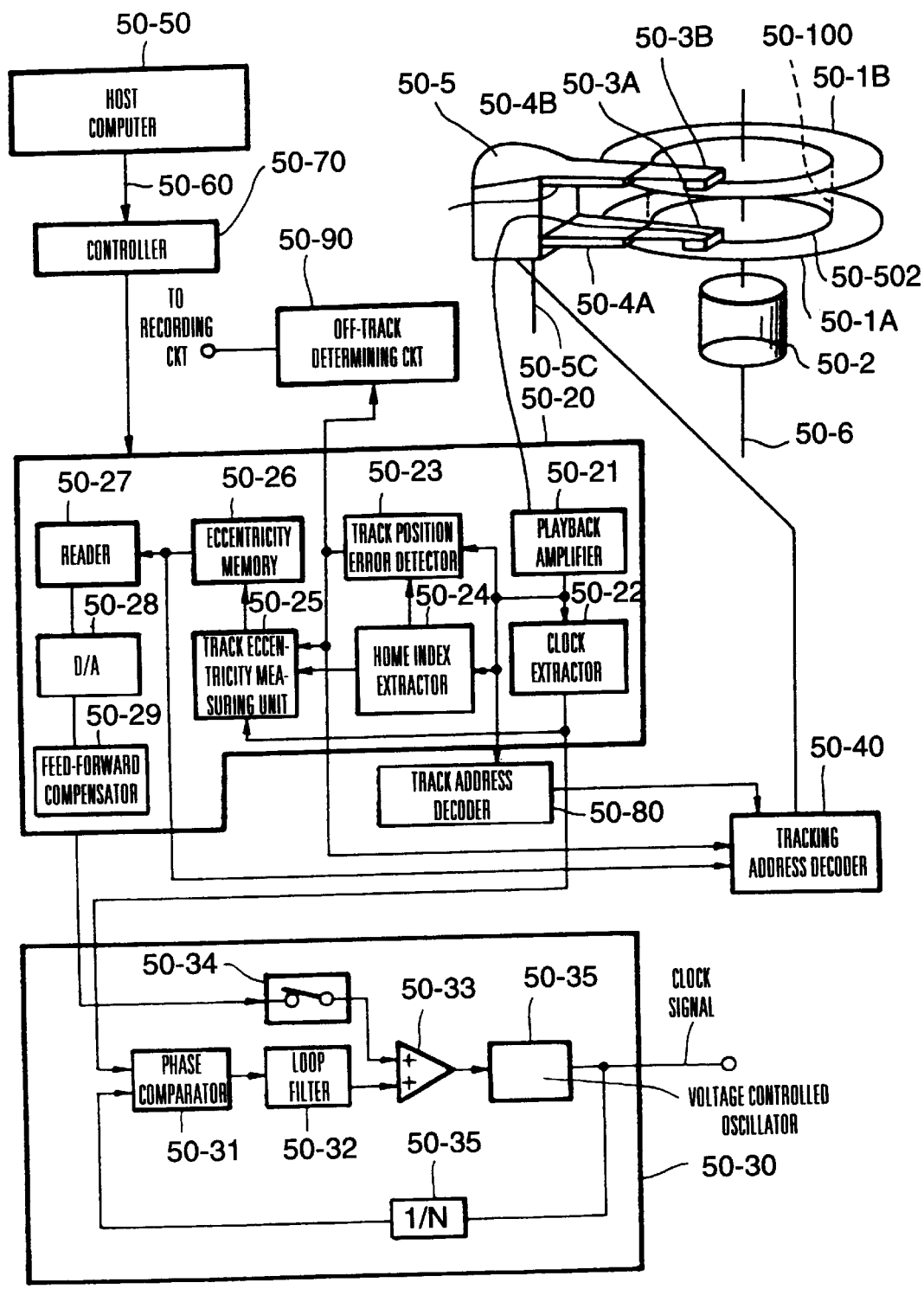
FIG. 21 is a block diagram of a circuit for correcting a time base error of a clock signal according to the present invention.

The magnetic disk used in the magnetic disk device is circumferentially divided into 60 sectors each composed of 16 segments. Therefore, the magnetic disk is circumferentially composed of 840 segments. Each segment is divided into a servo data recording region and a data recording region (20-40 and 20-41 in FIG. 2 or 21-2 and 21-3 shown in FIG. 6). Each servo data recording region has a gray code 20-71, a clock mark 20-11, and wobbled marks 20-12, 20-13. A unique pattern 20-72 is added to the first segment of each sector. In one of the 60 sectors, however, a home index 20-73 having a function as PG is recorded instead of the unique pattern.

FIG. 3 shows an arrangement of the servo data recording region 20-40 in which the unique pattern 20-72 is formed. The servo data recording region 20-40 includes the gray code 20-71 next to the unique pattern 20-72, the clock mark 20-11 next to the gray code 20-71, and the wobbled marks 20-12, 20-13 next to the clock mark 20-11.

Figure 4:
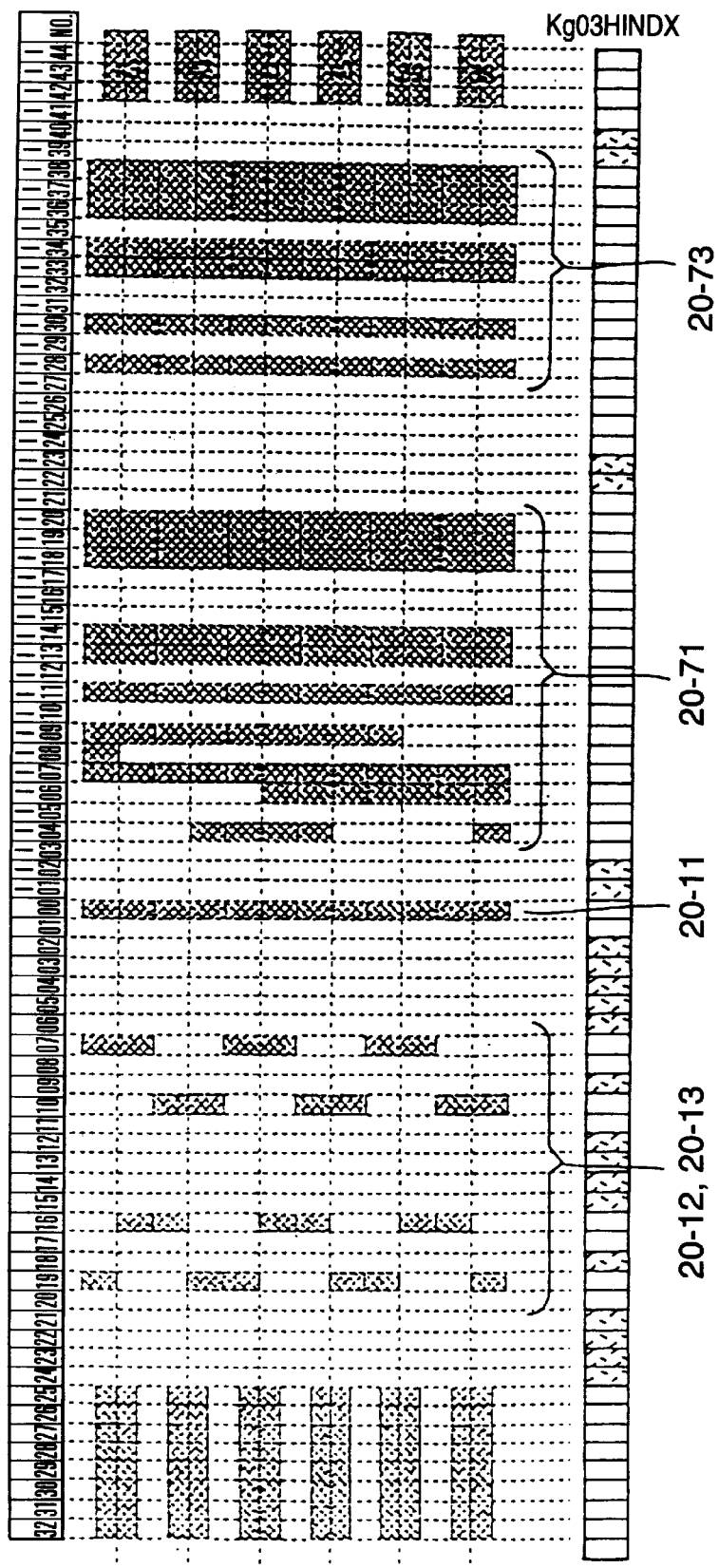
FIG. 4 is a diagram showing a format of a servo data recording region in which a home index exists, of the magnetic disk according to the present invention.
Figure 5:
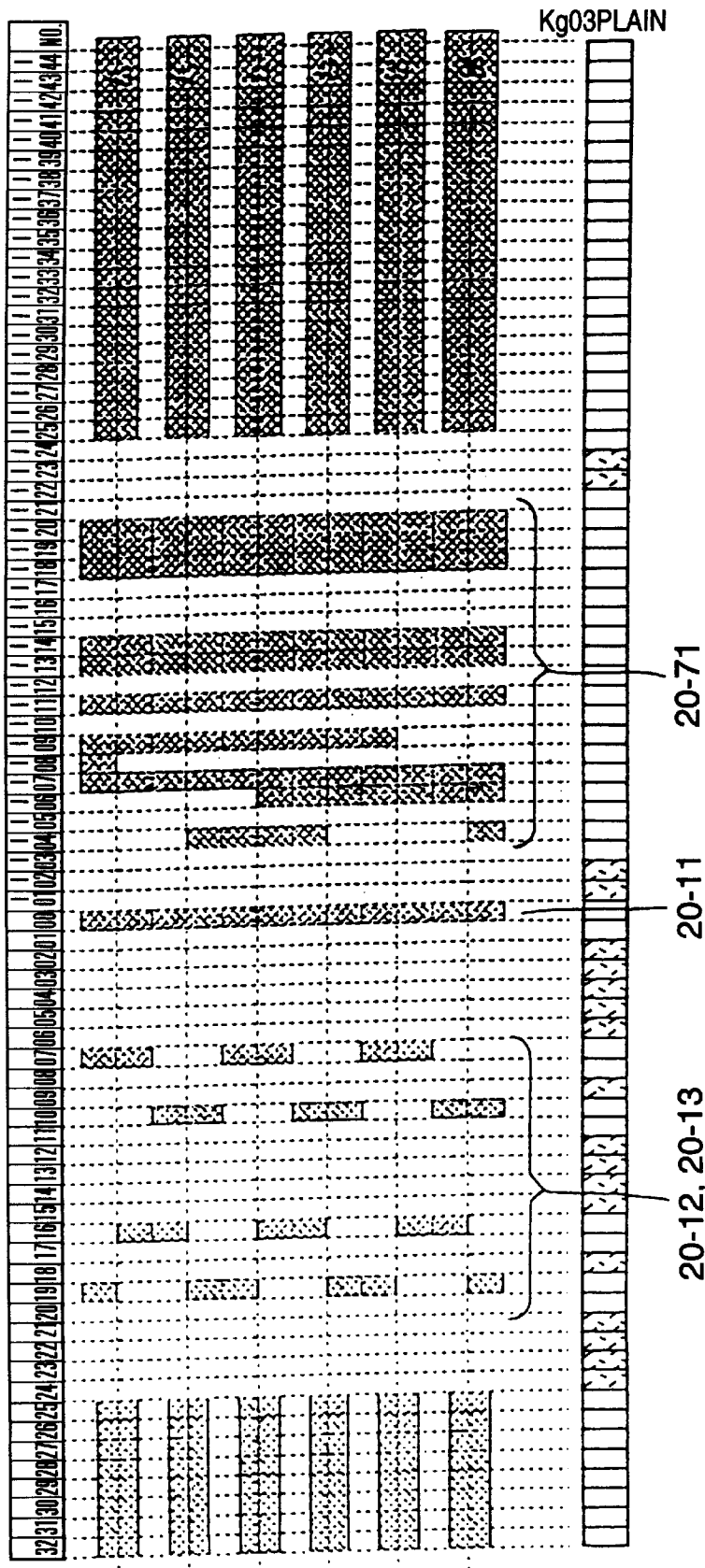
FIG. 5 is a diagram showing a format of a servo data recording region in which no unique pattern and no home index exist, of the magnetic disk according to the present invention.

FIG. 4 shows an arrangement of the servo data recording region 20-40 in which the home index 20-73 is disposed instead of the unique pattern 20-72. FIG. 5 shows an example in which neither unique pattern 20-72 nor home index 20-73 is formed.

FIG. 2 shows the servo data recording region 20-40 in which the unique pattern 20-72 is formed and the data recording region 20-41 immediately following the servo data recording region 20-40.

In this embodiment, the unique pattern 20-72, the gray code 20-71 (representing absolute addresses 0 through 2800 (track numbers) indicative of tracks), the clock mark 20-11, and the wobbled marks 20-12 (20-12-1, 20-12-2), 20-13 (20-13-1, 20-13-2) are formed and recorded in the servo data recording region 20-40.

If the width of the clock mark 20-11 in the direction of tracks (the width in the horizontal direction in FIG. 2) is 1, then the gray code 20-71 has a width of 20 and the unique pattern 20-72 has a width of 16.

The clock mark 20-11 is a mark for generating a timing signal which serves as a reference for recording and reproducing data. When a playback head 20-30 reproduces the clock mark 20-11, the playback head 20-30 outputs a timing signal corresponding to an edge of the clock mark 20-11. As shown in FIG. 2, the clock mark 20-11 is formed not only in data tracks 20-10 but also in regions between tracks 20-10 (intertrack regions). Therefore, the clock mark 20-11 is formed continuously radially on the disk (see FIG. 6).

The wobbled marks 20-12-1, 20-13-1 are disposed radially outwardly and inwardly of a center line L1 of the tracks 20-10, and spaced a distance from each other in the direction of tracks. When the playback head 20-30 reproduces the wobbled marks 20-12-1, 20-13-1, the playback head 20-30 outputs positional pulses corresponding to edge positions of the wobbled marks 20-12-1, 20-13-1. The playback head 20-30 can be positioned on the center line L1 of the tracks 20-10 by effecting tracking servo control for equalizing the levels of the positional pulses.

Other wobbled marks 20-12-2, 20-13-2 are also provided. These wobbled marks 20-12-2, 20-13-2 will be described later on.

The wobbled marks 20-12-1, 20-13-1, 20-12-2, 20-13-2 have the same width (the length in the direction of tracks) as the clock mark 20-1, the width being 0.6 $\mu$m in the radially innermost position and 1.2 $\mu$m in the radially outermost position.

An ID recording region 20-41H is formed at the first area of the data recording region 20-41. Data to be recorded and reproduced are recorded in a region 20-41D which follows the ID recording region 20-41H.

The ID recording region 20-41H is divided into a sector number recording region 20-41A and a track number recording region 20-41B (20-41-B1, 20-41B2). At least the sector number recording region 20-41A is formed continuously radially between tracks as well as in the tracks 20-10. A sector number 20-41a indicative of a sector is recorded in the sector number recording region 20-41A. A track number 20-41b indicative of a track is recorded in the track number recording region 20-41B. The playback head 20-30 outputs a pulse train when it reproduces the ID recording region 20-41H.

Data of 40 bits composed of a sector number of 8 bits and two track numbers each of 16 bits are ID data recorded in the ID recording region 20-41H.

These ID data are PR (partial response) (−1, 0, 1)-modulated, and recorded in the ID recording region 20-41H.

If the magnetic disk is a CAV disk, then sector numbers are the same on radially inner and outer tracks. The sector numbers are recorded continuously in regions between tracks as well as in the tracks 20-10.

The track number recording region 20-41B is divided into a track number recording region 20-41B1 for playback operation and a track number recording region 20-41B2 for recording operation.

The track number recording region 20-41B1 for playback operation is formed such that its center (center in the direction of width) is positioned on the center line L1 of the tracks 20-10. However, the track number recording region 20-41B2 for recording operation is formed such that its center line L2 is spaced (offset) from the center line L1 of the tracks 20-10 by a distance d in a direction perpendicular to the tracks 20-10 (in the radial direction of the disk). Identical track numbers 20-41b1, 20-41b2 are recorded in the track number recording region 20-41B1 for playback operation and the track number recording region 20-41B2 for recording operation.

Two or more identical track numbers may be recorded in each of the regions 20-41B1, 20-41B2, so that track numbers can be read more reliably.

The offset distance d of the track number recording region 20-41B2 for recording operation is progressive smaller in the radially inward direction and larger in the radially outward direction.

As shown in FIG. 2, the wobbled marks 20-12-1, 20-13-1 are formed for positioning the playback head 20-30 with respect to the center line L1 of the tracks 20-10 (in the sector number recording region 20-41A and the track number recording region 20-41B1 for playback operation), and the wobbled marks 20-12-2, 20-13-2 are formed in the servo data recording region 20-40 for positioning the playback head 20-30 to trace the center line L2 of the track number recording region 20-41B2 for recording operation.

In a playback mode, therefore, the playback head 20-30 can be scanned along the center line L1 of the tracks 20-10 by effecting tracking control on the playback head 20-30 with respect to the wobbled marks 20-12-1, 20-13-1.

In a recording mode, the playback head 20-30 can be scanned along the center line L2 of the track number recording region 20-41B2 for recording operation by effecting tracking control based on a tracking error signal that is produced when the wobbled marks 20-12-2, 20-13-2 are reproduced by the playback head 20-30. At this time, a recording head 20-31 runs along the center line L1 of the tracks 20-10.

In the above embodiment, the ordinary wobbled marks 20-12-1, 20-13-1, the offset wobbled marks 20-12-2, 20-13-2, the sector number recording region 20-41A, the track number recording region 20-41B1 for playback operation, the track number recording region 20-41B2 for recording operation, and the region 20-41D are arranged in the order named. However, a second group of the offset wobbled marks 20-12-2, 20-13-2, the offset track number recording region 20-41B2 for recording operation, and the region 20-41D may be repeatedly arranged following a first group of the ordinary wobbled marks 20-12-1, 20-13-1, the sector number recording region 20-41A, the track number recording region 20-41B1 for playback operation, and the region 20-41D.

The track numbers 20-41b1, 20-41b2 recorded in the track number recording regions 20-41B1, 20-41B2 are used by a recording/reproducing system. The gray code 20-71 corresponds to the recording/reproducing system, but is used by a servo system. They are not identical to each other. However, they are used in a control process for confirming tracks to record data therein or reproduce data therefrom. Therefore, the servo recording region 20-40 and the ID recording region 20-41H can be recognized as control signal recording regions.

Since regions for recording sector numbers or track numbers are formed, and sector numbers or track numbers are recorded in those regions, the sector numbers or track numbers can reliably be reproduced irrespective of how the playback head is positioned.

According to the present invention, servo data including the unique pattern 20-72, the home index 20-73, the gray code 20-71, the clock mark 20-11, the wobbled marks 20-12, 20-13 in the servo data recording region 20-40, and the sector number 20-41a, the track numbers 20-41b1, 20-41b in the ID recording region 20-41H, and tracks are formed and recorded as convexities and concavities (which are impressed).

For example, a guard band 20-20 is formed such that it is 200 nm lower than the data tracks 20-10 (as a concavity). Therefore, the tracks are formed discretely.

An arrangement for forming regions by impression is disclosed in Japanese patent application No. 4-71731, for example. The principles of such an arrangement will briefly be described below. Such a magnetic disk can be fabricated by applying optical disk technology. Specifically, a glass master is prepared, and its surface is coated with a photoresist, for example. Then, a laser beam is applied to only portions of the photoresist where concavities will be formed. After the laser beam has been applied, the photoresist is developed to remove the exposed portions. A stamper is formed from the glass master thus formed, and a large number of replicas are produced from the stamper. The steps formed on the glass master have been transferred to each of the replicas. A magnetic disk is completed by forming a magnetic film on the surface to which the steps have been transferred.

In FIG. 2, those regions which are shown hatched are magnetized to N poles corresponding to a logic "1", for example, of ID data, and those regions which are shown not hatched are magnetized to S poles corresponding to a logic "0".

The magnetic disk with concentric or spiral tracks formed thereon is rotated at a constant angular velocity (zone bit recording).

The tracks are formed between a position at one-half of the radius of the disk and an outermost circumference thereof, i.e., in a radially outer range covering one-half of the radius of the disk.

The disk has a diameter of 2.5 inches, 1.8 inches, or 1.3 inches. The track pitch is 5.2 μm, the track width is 3.6 μm, and the guard band has a width of 1.6 μm.

A magnetic disk having a diameter of 2.5 inches has a storage capacity of 200 MB on its both surfaces, and a magnetic disk having a diameter of 1.8 inches has a storage capacity of 100 MB on its both surfaces.

Figure 6:
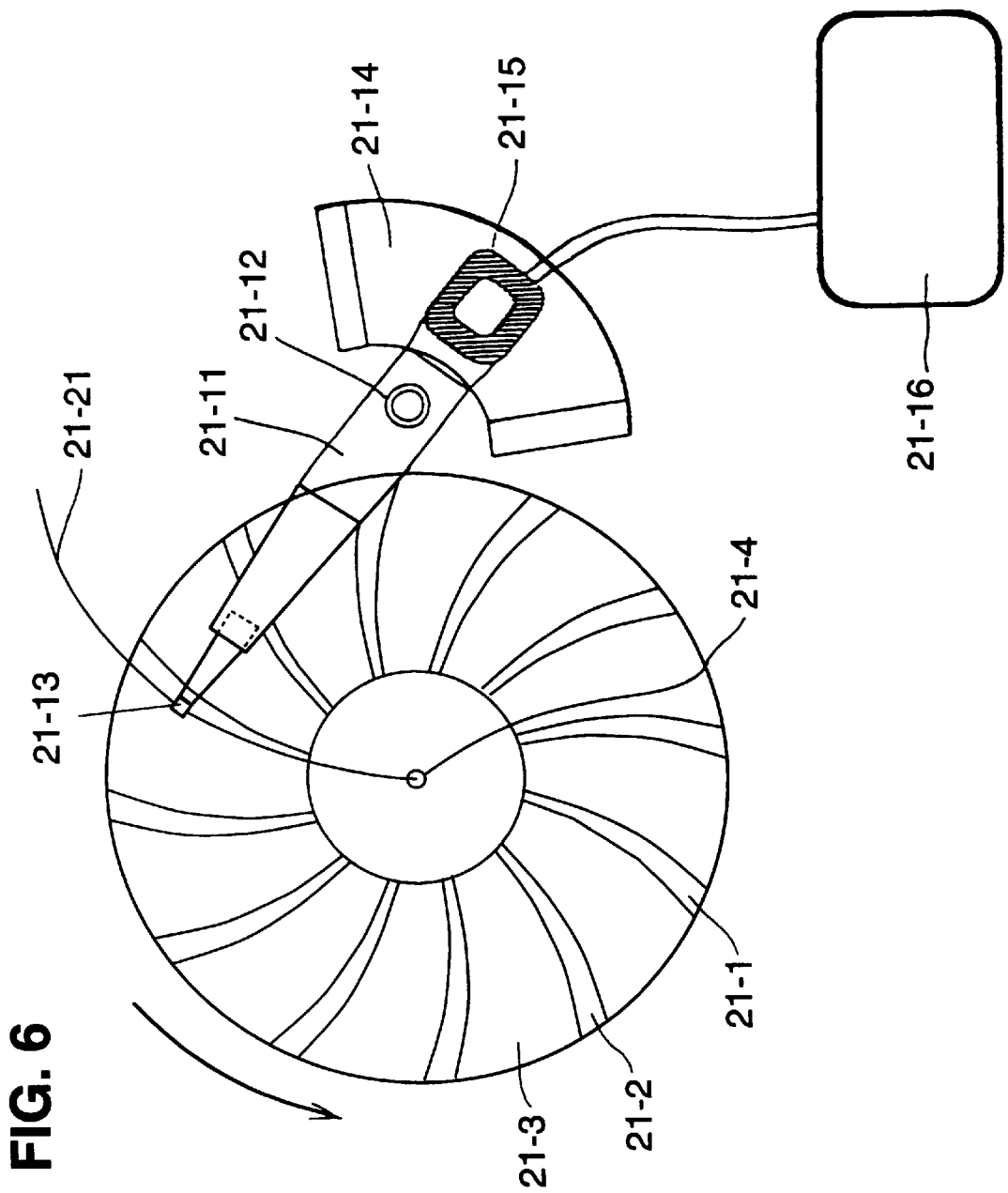
FIG. 6 is a view showing the relationship between servo data recording regions and data recording regions of a magnetic disk according to the present invention, and the path of angular movement of a magnetic head.

FIG. 6 shows a magnetic disc according to the present invention and a mechanism for actuating a magnetic head 21-13 for recording data or reproducing data from data regions.

On the magnetic disk 21-1, each segment is divided into a data recording region 21-3 (20-41 in FIG. 2) and a servo data recording region 21-2 (20-40 in FIG. 2) as described with reference to FIG. 2. Servo data recording regions 21-2 and data recording regions 21-3 are formed along a path 21-21 of movement of the magnetic head 21-13.

In this device, the magnetic head 21-13 is mounted on the distal end of an arm 21-11 (20-62 shown in FIG. 2) which is angularly movable about a fulcrum (center of rotation) 21-12 (20-61 shown in FIG. 2). A voice coil 21-15 is mounted on the arm 21-11 remotely from the end of the arm 21-11 where the magnetic head 21-13 is mounted, across the fulcrum 21-12, and a magnet 21-14 is disposed below the voice coil 21-15. When a predetermined drive current is supplied to the voice coil 21-15 from a drive circuit 21-16, an electromagnetic force acts on the voice coil 21-15 that is positioned in a magnetic flux generated by the magnet 21-14, turning the arm 21-11 about the fulcrum 21-12. At this time, the magnetic head 21-13 moves along the path 21-21 which is of an arcuate shape extending about the fulcrum 21-12 and passing through the center 21-4 of the magnetic disk 21-1.

In FIG. 6, the arm 21-11 is shown as a straight arm. However, the arm 21-11 may be a bent arm.

FIG. 7 shows in detail a region dedicated for recording a servo signal in the servo data recording region 21-2.

In the embodiment shown in FIG. 7, a servo mark SM (the clock mark, the wobbled marks, the gray code, the unique pattern, and the home index) is formed as a substantially rectangular pattern defined by a curved line along the path 21-21 of movement of the magnetic head 21-13 and curved lines along tracks on the magnetic disk 21-1. Data regions of the ID recording region 20-41H shown in FIG. 2 and all other regions formed by impression are formed along the path of movement the magnetic head 21-13.

In FIG. 7, since the servo mark SM is shown as exaggerated with respect to the tracks and the radius of the path 21-21, the sides of the servo mark SM are represented by curved lines. Actually, however, the length of a side of the servo mark SM is extremely small as compared with the tracks and the radius of the path 21-21, and hence the servo mark SM is virtually surrounded by almost straight lines.

Where the servo mark SM and other marks that are formed by impression are arranged along the path 21-21, equal time intervals in a seek mode are not disrupted, and hence a PLL circuit (50-30 in FIG. 21) for generating a clock signal is prevented from being thrown out of phase lock in the seek mode. When data are recorded or reproduced by the magnetic head 21-13 with no bent angle (the bent angle is 0 and a magnetic gap line 21-41 parallel to the magnetic gap of the magnetic head 21-13 is perpendicular to the tracks), since the magnetic gap is perpendicular to the tracks, no azimuth loss is produced.

FIGS. 8A and 8B shows cross sections of the magnetic disk 21-1 of the above arrangement. FIG. 8A shows a cross section perpendicular to the tracks, and FIG. 8B shows a cross section along the tracks. As shown in FIGS. 8A and 8B, a substrate 21-61 which is made of synthetic resin, glass, aluminum, or the like has steps formed on its surface, and a magnetic film 21-62 is formed on the stepped surface. Lower areas (concavities) of the steps serve as guard bands (GB), and higher areas (convexities) thereof as tracks (recording portions).

As shown in FIG. 8B, the data recording region 21-3 remains flat. In the servo data recording region 21-2, only those portions for recording a servo mark SM and a clock mark CM project (to same height as the data recording region), and unrecorded regions where no servo signal is recorded are lower than those portions (formed as concavities). Such a disk with concavities and convexities can be fabricated by the optical disk technology.

In the magnetic disk, the servo data recording regions and the ID recording regions are formed along the path of movement of the magnetic head in the radially outward or inward direction. Therefore, equal time intervals in a seek mode are maintained, and a PLL circuit for generating a clock signal is prevented from being thrown out of phase lock in the seek mode. It is also possible to suppress azimuth loss.

A process of magnetizing a disk with concavities and convexities will be described below. There are 840 servo data recording regions 21-2 positioned at equal intervals along the full circumference, and, as shown in FIG. 9, an impressed pattern of rectangular convexities 22-13 each having a width of about 5 μm perpendicular to tracks and a length ranging from about 0.7 to 2.9 μm parallel to the direction of travel of the disk is formed depending on the signal in the servo data recording regions 21-2.

Figure 9:
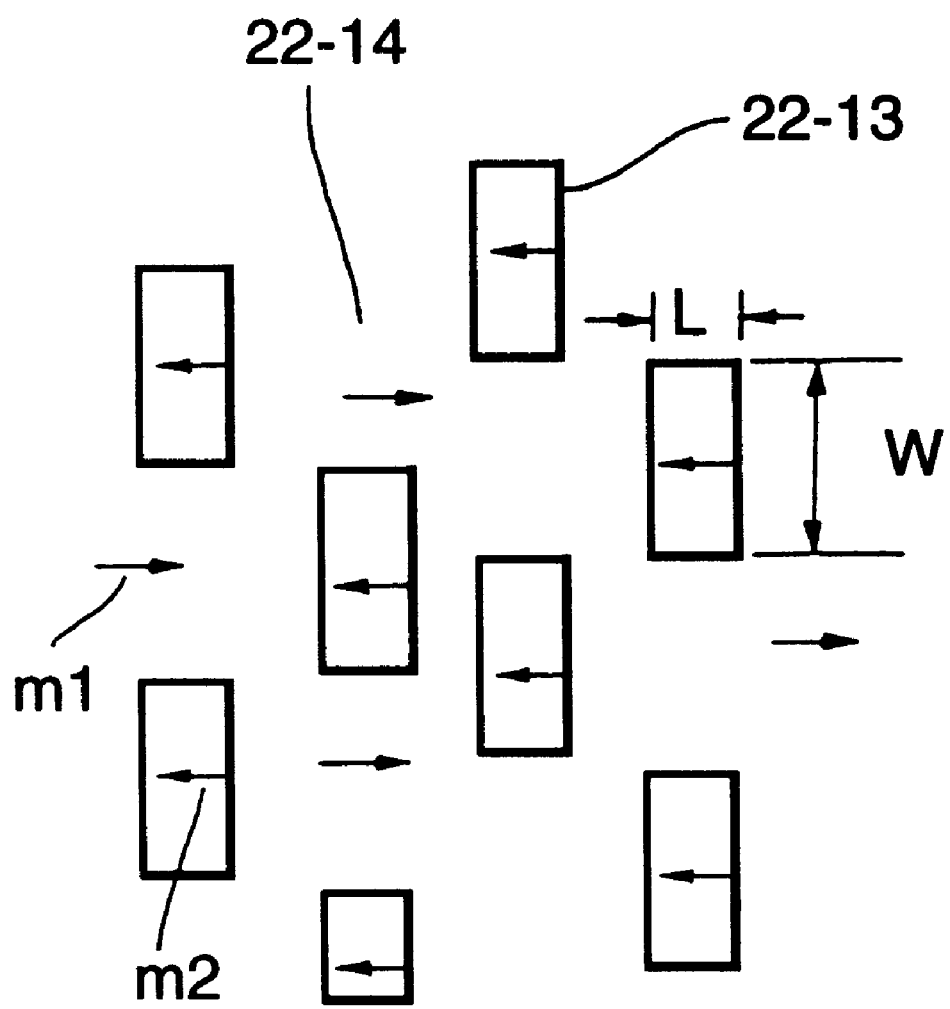
FIG. 9 is a view of an impressed pattern of convexities and concavities on the magnetic disk according to the present invention.

The convexities 22-13 and concavities 22-14 are magnetized in opposite directions indicated by the arrows m1, m2 in FIG. 9 to write positioning signals (such as wobbled marks, clock marks, and track numbers) on a magnetic disk 22-1.

Figure 10A:
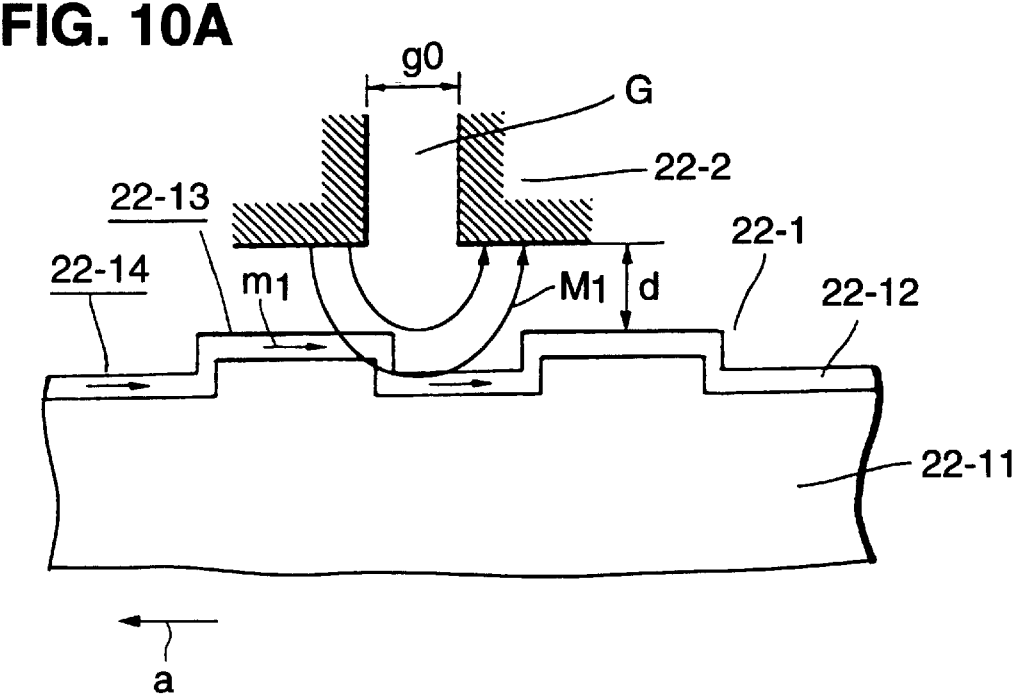
FIGS. 10A and 10B are views illustrating a process of magnetizing the magnetic disk with convexities and concavities according to the present invention.

In this example, the magnetic disk 22-1 (21-1 in FIG. 6) was rotated in the direction indicated by the arrow a in FIG. 10A. While a first direct current was being supplied to a magnetic head 22-2 (the magnetic head of a manufacturing apparatus), the magnetic head 22-2 was moved at track pitches in the radial direction of the magnetic disk 22-1 to magnetize a magnetic layer 22-12 on the convexities 22-13 and the concavities 22-14 on the magnetic disk 22-1 in one direction. The magnetic layer 22-12 was deposited on a nonmagnetic support 22-11.

Figure 10B:
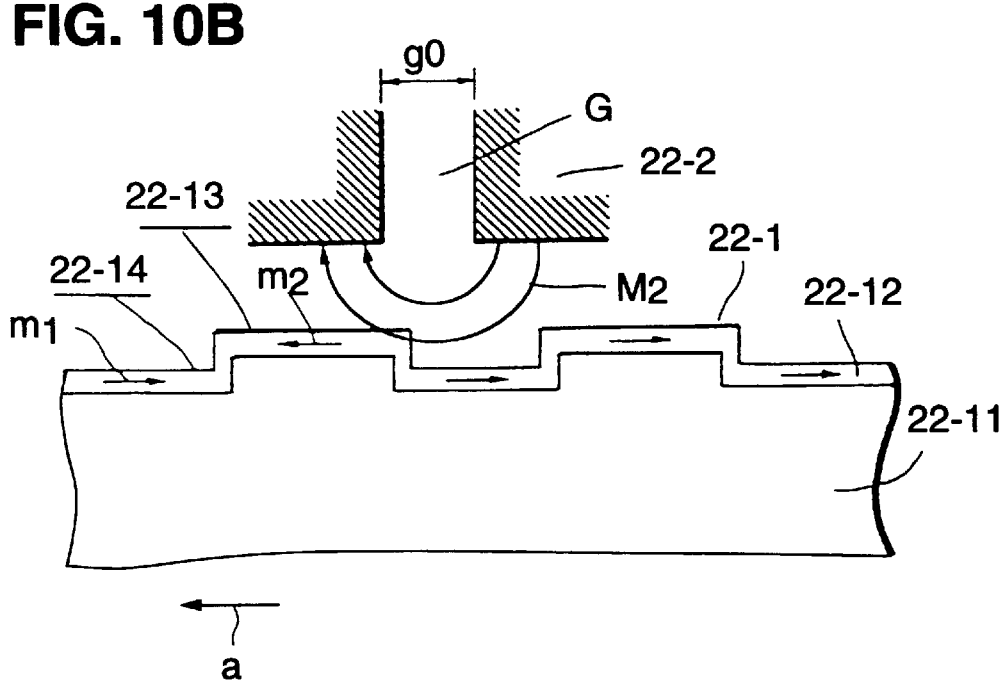

Thereafter, as shown in FIG. 10B, while a second direct current which is opposite in polarity to the first direct current and has a value smaller than the first direct current was being supplied to the magnetic head 22-2, the magnetic head 22-2 was moved and scanned at track pitches in the radial direction of the magnetic disk 22-1 to magnetize only the magnetic layer 22-12 on the convexities 22-13 on the magnetic disk 22-1 in the opposite direction, thereby writing positioning signals.

The magnetic head 22-2 has a magnetic gap G having a gap length g0 of 0.4 μm, a track width of 100 μm, and a coil winding of 56 turns with a central tap (28+28). The magnetic head 22-2 floats over the magnetic disk 22-1 by a distance d of 0.13 μm at a relative speed of 6 m/s with respect to the magnetic disk 22-1.

Since positioning signals can be written by a single magnetic head, any head replacing process is dispensed with, and the productivity of the disk is increased.

Figure 11:
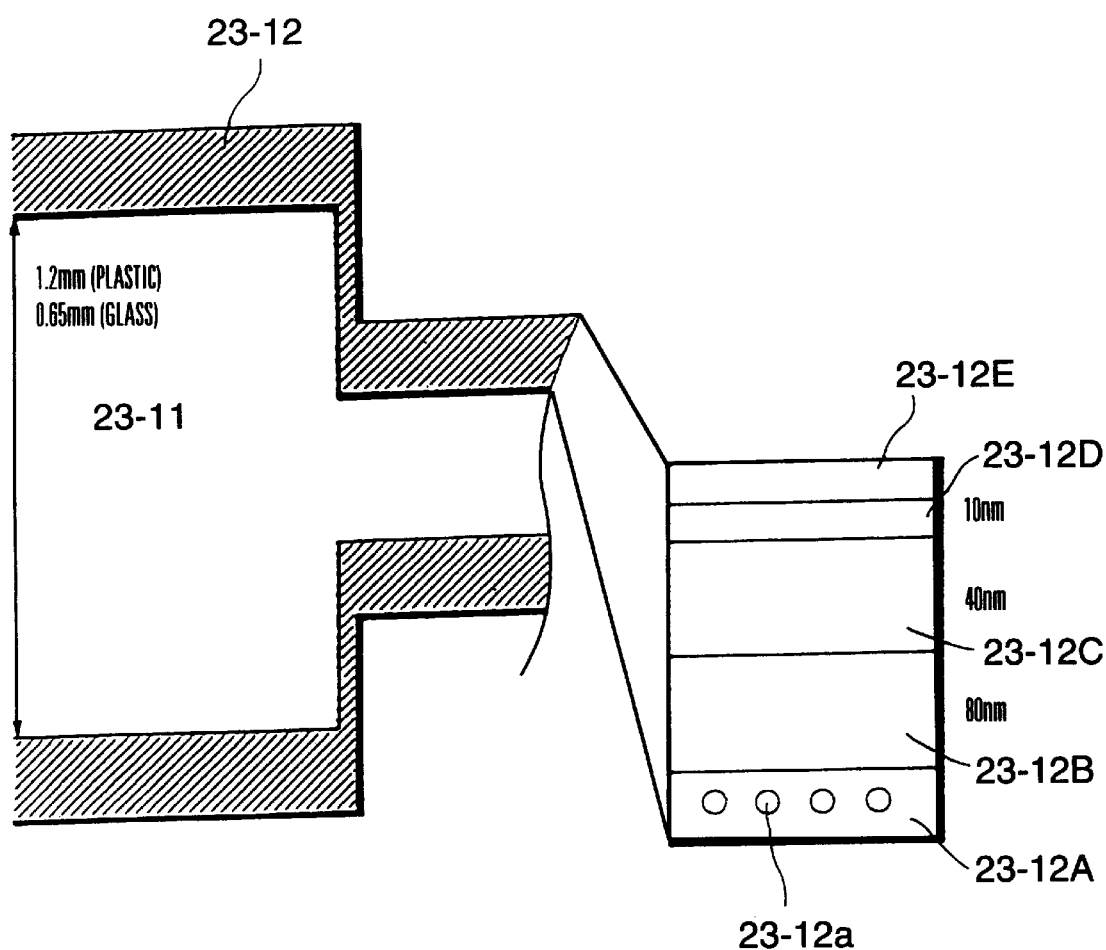
FIG. 11 is a cross-sectional view of a more detailed sectional structure of the magnetic disk according to the present invention.

FIG. 11 shows a detailed cross-sectional structure of a magnetic disk which is magnetized in this manner. A substrate 23-11 made of plastic, glass, or aluminum has a step (concavity) of 200 nm. If the substrate 23-11 is made of glass, its thickness is 0.65 mm, and if the substrate 23-11 is made of plastic, its thickness is 1.2 mm. Magnetic layers 23-12 are formed on respective opposite surfaces of the substrate 23-11.

Each of the magnetic layers 23-12 includes a particle layer 23-12A formed on the substrate 23-11 and having a particle density ranging from 0.5 to 100 particles per 1 μm, preferably, a particle density of about 10 particles per 1 μm. The particle layer 23-12A contains particles of $SiO_2$ (spherical silica particles) 23-12a distributed therein at the above particle density.

If the substrate 23-11 is made of glass or aluminum, the substrate 23-11 can maintain rigidity relatively. If the substrate 23-11 is made of plastic, it may not necessarily maintain sufficient rigidity, and its durability may be poorer than glass or aluminum. Because the substrate has large surface irregularities, it may be difficult to position a magnetic head closely to the magnetic layer 23-12 out of contact therewith. The particle layers 23-12A of this magnetic disk allow such surface irregularities to be reduced in size since the surface irregularities are determined by the density and particle diameter of the particles 23-12a.

The particles (spherical silica particles) 23-12a can be attached to the substrate 23-11 by dipping. The particles have an average diameter of 50 nm or less, preferably in the range of from 8 to 10 nm. When the average diameter was 8 nm, the particle diameter distribution had a standard deviation of 4.3 nm. The spherical silica particles were scattered in isopropyl alcohol so as to have a concentration of 0.01 wt %, and coated on the surfaces of the substrate 23-11 at a pull-up speed of 125 mm/min. The coating ratio was 100%.

Since the particle density is determined by the dipping speed and the concentration, it is possible to control the surface irregularities by controlling them. Attaching the particles by dipping makes it possible to simplify the equipment. Dipping may be effected locally (e.g., in an inner or outer circumferential region).

The particles 23-12a may be inorganic fine particles of a material other than $SiO_2$.

On the particle layer 23-12A, there is formed a chromium layer 23-12B having a thickness of about 80 nm. The chromium layer 23-12B functions as an exchange binding film, has an effect of improving magnetic characteristics, and particularly can increase coercive forces.

A cobalt platinum layer 23-12C is formed to a thickness of 40 nm on the chromium layer 23-12B. A protective film 23-12D of $SiO_2$ having a thickness of 10 nm is spin-coated or coated on the cobalt platinum layer 23-12C. A lubricant 23-12E is coated on the protective film 23-12D. The lubricant 23-12E may be made of Z-DO1 (trademark) of FOMBLIN Inc.

Figure 12:
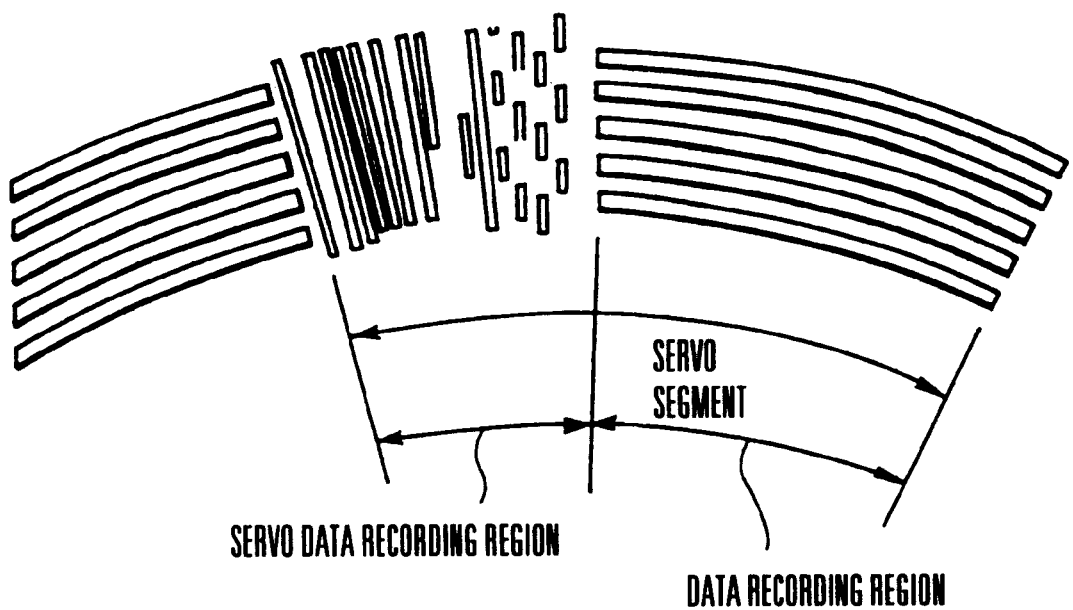
FIG. 12 is a plan view which schematically illustrates the servo data recording region and the data recording region of the magnetic disk according to the present invention.

Then, the proportions of a data recording region and a servo data recording region will be described below. As shown in FIG. 12, each segment is divided into a data recording region and a servo data recording region. The data recording region is flat, and the servo data recording region contains a servo pattern of clock marks, wobbled marks, and a gray code (more specifically, also sector numbers and track numbers in the ID recording region 20-41H shown in FIG. 2) that are recorded as physical concavities and convexities.

Figure 13:
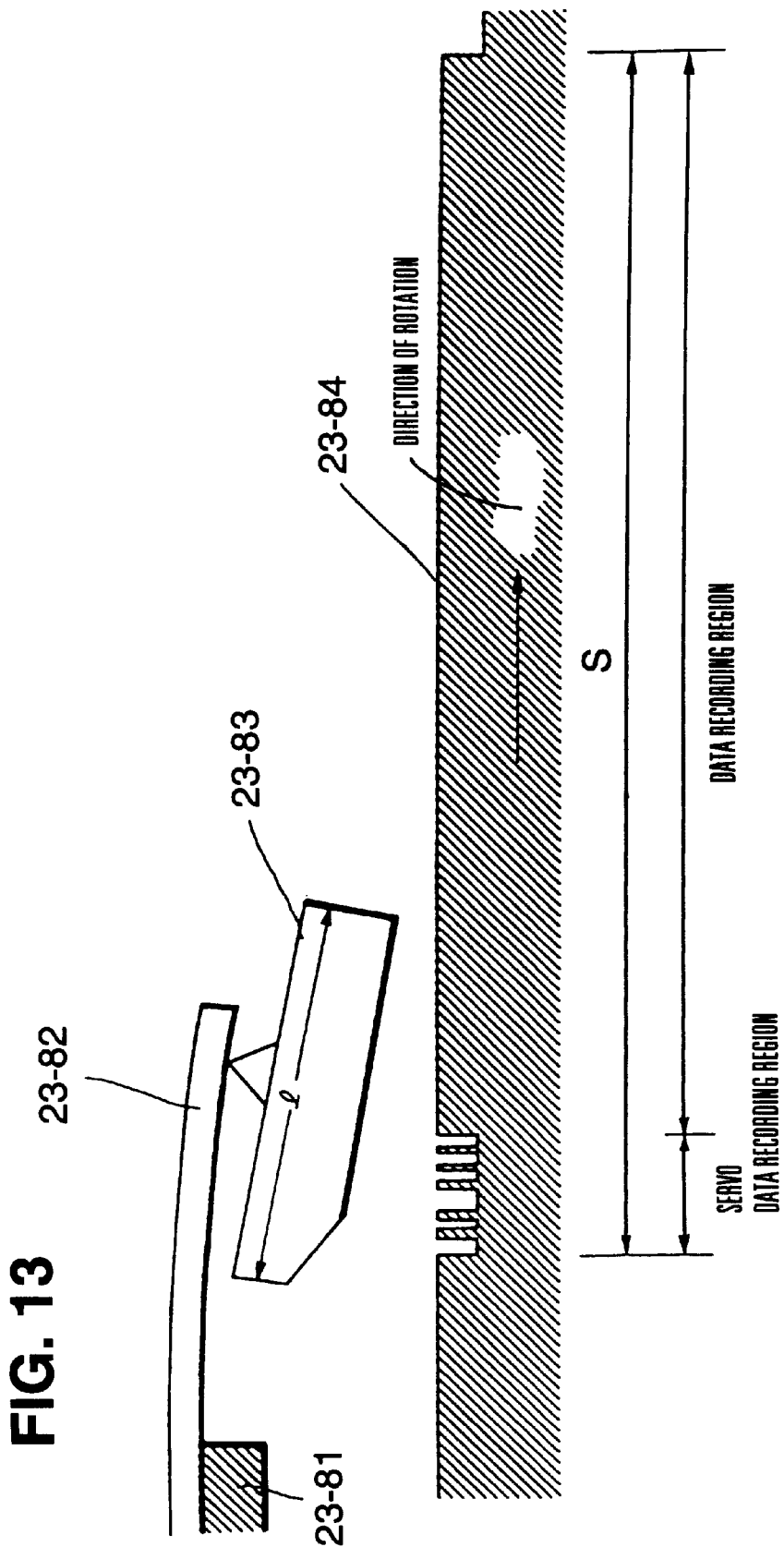
FIG. 13 is a view showing the relationship between a slider according to the present invention and the magnetic disk.

As schematically shown in FIG. 13, a magnetic head held by a slider 23-83 (a slider 40-57 shown in FIG. 19) that is supported on an arm 23-81 (an arm 40-53 shown in FIG. 19) by a load beam 23-82 (a suspension spring 40-56 shown in FIG. 19) is positioned a certain distance from a magnetic disk 23-84 by an air stream which is generated as the magnetic disk 23-84 rotates.

The smaller the distance between the magnetic head, and hence the slider 23-83 and the magnetic disk 23-84, the greater a change in the magnetism detected by the magnetic head, and the larger the reproduced output. If the distance were too small, the magnetic head would be brought into contact with the magnetic disk 23-84. Therefore, it is necessary to keep the slider 23-83 spaced a certain distance from the magnetic disk 23-84.

Figure 14:
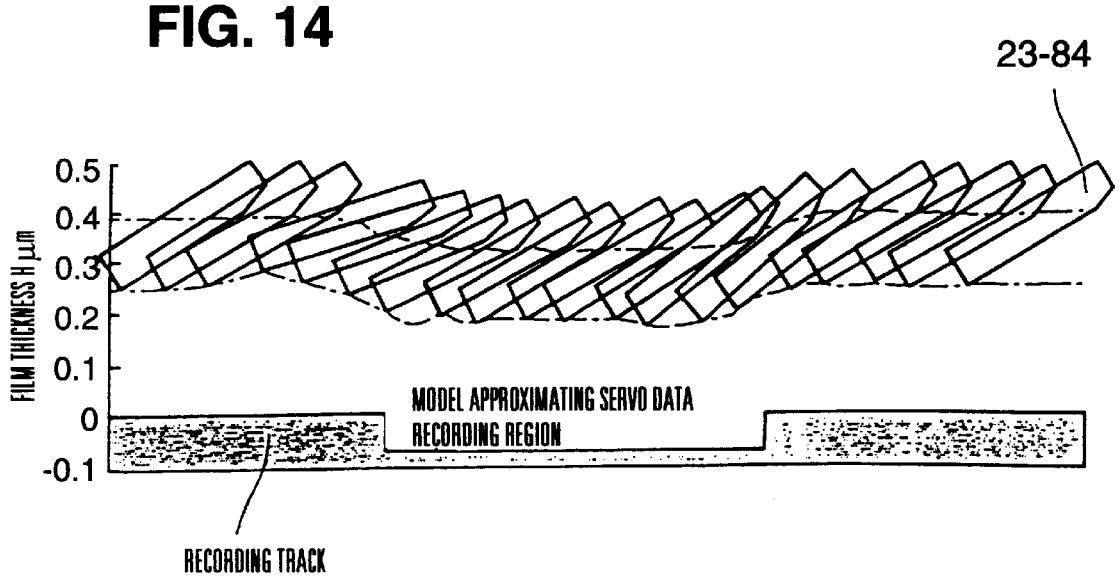
FIG. 14 is a diagram illustrative of a change in the amount of floating of the slider in the vicinity of a concavity on the magnetic disk.

Since the surface of the magnetic disk 23-84 (the magnetic disk 22-1 shown in FIG. 10) is not flat, the distance between the slider 23-83 and the magnetic disk 23-84 varies depending on the concavities and convexities thereof. If a segment length S is sufficiently large with respect to the length L of the slider and the servo data recording region is as long as the slider 23-83, then, as shown in FIG. 14, when the slider 23-84 starts to enter a servo data recording region (concavity) from a normal floating condition (floating condition over a flat region), the leading end of the slider begins to move downwardly, and hence pitch about its support. The trailing end of the slider is temporarily lifted, and thereafter the slider moves downwardly as a whole. At the bottom of the concavity, the slider runs while the pitching thereof which is caused when the slider starts to enter the concavity is being dampened.

When the slider 23-83 moves out of the concavity, the leading end thereof is lifted, and the slider 23-83 pitches in a direction opposite to the direction in which it has pitched upon entry into the concavity. The trailing end of the slider is temporarily depressed, and thereafter the entire slider leaves the concavity. The slider returns to its normal floating condition while its pitching movement is being dampened.

The above movement is carried out when the slider 23-83 moves over one concavity. Actually, the servo data recording region periodically occurs at the segment period. To reduce clock jitter, it is preferable to reduce the segment period and increase the number of servo data recording regions per track. However, if the number of servo data recording regions per track is increased, then data recording regions are reduced, resulting in a reduced recording capacity of the disk. Therefore, the number of servo data recording regions is determined based on a trade-off of the recording capacity of the disk and the jitter tolerance.

Figure 15:
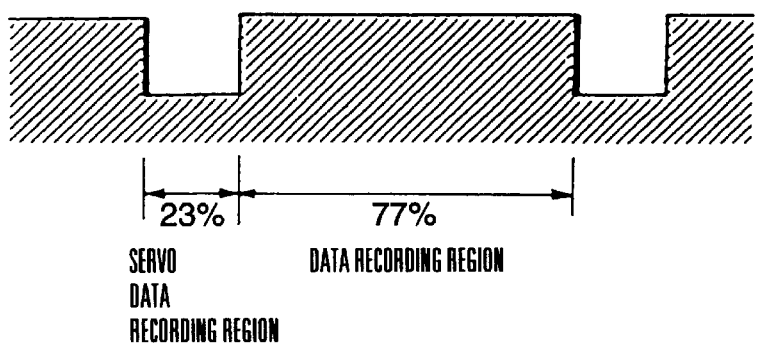
FIG. 15 is a diagram showing the proportions of the servo data recording region and the data recording region, which are used in the simulation of a change in the amount of floating of the slider.
Figure 16:
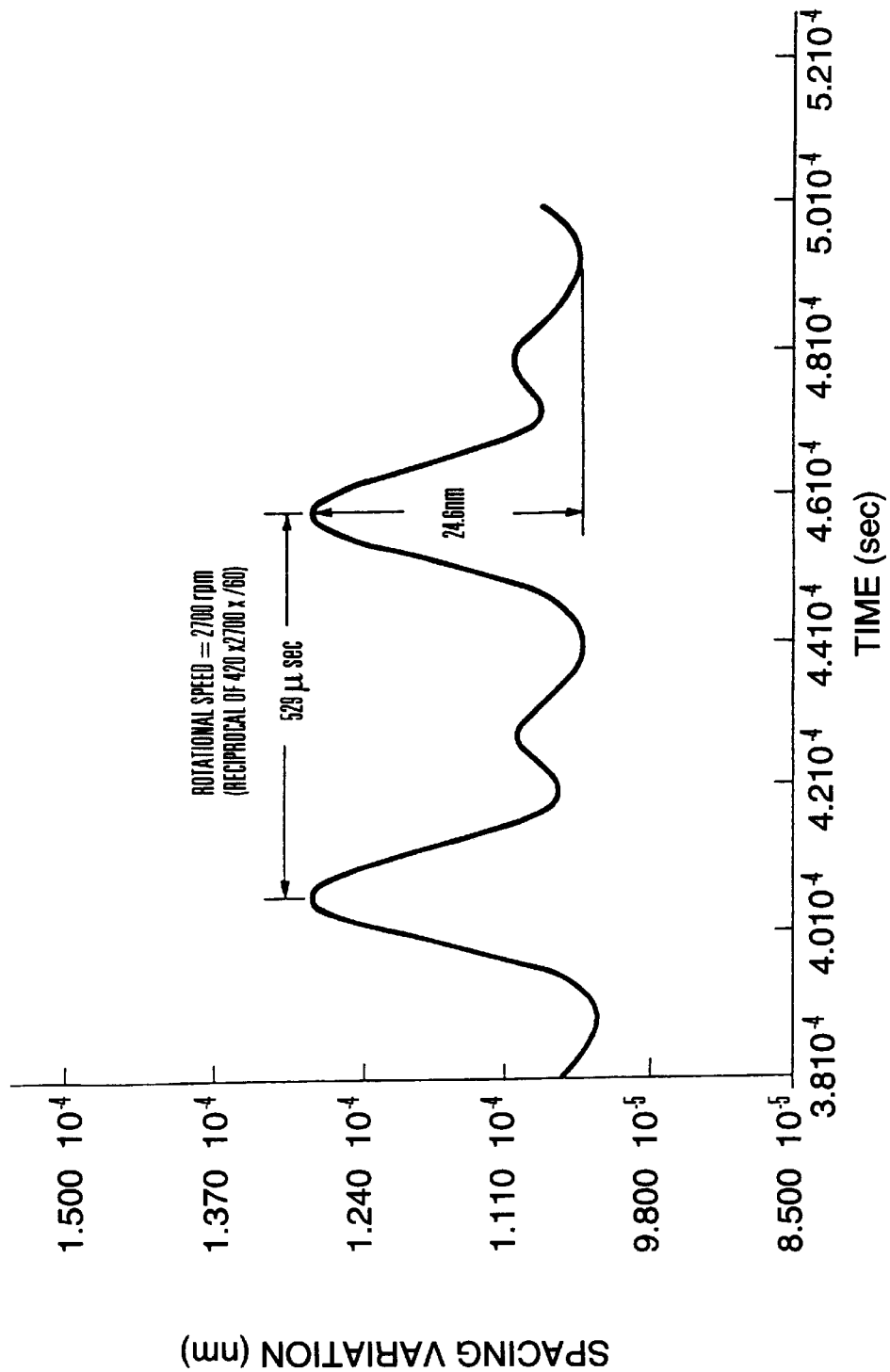
FIG. 16 is a diagram showing the manner in which the amount of floating of the slider varies in a segment period according to the present invention.

If it is assumed that, as shown in FIG. 15, the proportion of a servo data recording region to a segment is 23% and in the form of a concavity, and the data recording region in the remaining 77% is in the form of a convexity, then the component of the segment period is added to the characteristics with which the slider moves over one concavity as shown in FIG. 14. FIG. 16 shows the manner in which the distance between the slider 23-83 and the magnetic disk 23-84 varies at the segment period. In FIG. 16, the slider has a length of 1.8 mm, the magnetic disk 23-84 rotates at a rotational speed of 2700 rpm, and the number of segments per one revolution is 420. It can be seen from FIG. 16 that the distance between the slider 23-83 and the magnetic disk 23-84 greatly varies at the segment period.

FIG. 64 shows simulated values of changes in the amount of floating of the slider 23-83 at the time it moves over the servo data recording region, with the ratio of the servo data recording region to the data recording region per segment being as a parameter. The conditions in the simulation are that the number of segments per track is 420, the amount of floating is 0.11 μm, the peripheral speed is 12.8 m/s, the rotational speed of the disk is 45 Hz, and the skew angle is 0 degree. The depth of the concavity of the serve data recording region is 0.1 μm.

As shown in FIG. 64, as the ratio of the servo data recording region to the data recording region increases from 10:90 to 23:77 to 30:70, the change in the amount of floating increases successively from 13.0 nm to 28.0 nm to 32.0 nm. Therefore, it can be understood that the smaller the proportion of the servo data recording region, the smaller the change in the amount of floating of the slider 23-83 over the magnetic disk. If the proportion of the servo data recording region increases, the recording capacity decreases, and the change in the amount of floating of the slider increases. In worst cases, the change in the amount of floating of the slider is not dampened sufficiently on a flat surface, making it difficult to record and reproduce data stably. It is preferable that the proportion of the servo data recording region (a region where a concavity is formed) per track be 40% or less.

The aspects of the recording head 10-3 and the playback head 10-4 shown in FIG. 1 will be described below.

In FIG. 177, on a floating-type slider (the slider 23-83 shown in FIG. 13) or a base 30-6 attached thereto, there are deposited first and second magnetic layers 30-3, 30-4 facing an ABS (Air Bearing Surface) 30-7 that contacts or confronts the magnetic disk, the first and second magnetic layers 30-3, 30-4 serving as a shield for the playback head. An MR element 30-1 comprising an MR (magnetoresistance) thin film and a bias conductor 30-18 are disposed such that they are sandwiched between the first and second magnetic layers 30-3, 30-4 with a nonmagnetic insulating layer 30-8 therebetween, thereby making up an MR playback head. The bias conductor 30-18 is arranged across the MR element 30-1 to make the MR element 30-1 magnetized in a given direction to cause the magnetoresistance characteristics thereof to work in a characteristic region which exhibits excellent linearity and high sensitivity.

A third magnetic layer 30-5 is deposited outwardly of the second magnetic layer 30-4, i.e., on its side remote from the MR element 30-1, with the nonmagnetic insulating layer 30-8 therebetween. A spiral-pattern head winding (30-2 in FIG. 18) is formed between the second and third magnetic layers 30-4, 30-5 so as to surround magnetically coupling portions between their rear portions spaced from the ABS 30-7.

There are thus constructed a shield-type MR magnetic head (playback head) with the MR element 30-1 disposed between the first and second magnetic layers 30-3, 30-4, and an Ind (induction)-type magnetic head (recording head) with the head winding wound on a magnetic path which is composed of the second and third magnetic layers 30-4, 30-5.

The track width of the MR playback head is limited by a width $W_{TH}$ Of the MR element 30-1 which faces the ABS 30-7, and the track width of the Ind-type recording head is limited by a width $W_{TI}$ of the third magnetic layer 30-5 which face the ABS 30-7. The width $W_{TH}$ of the MR element 30-1 is of a relatively large value of 5.2 μm (a width equal to the track pitch), for example, and the width $W_{TI}$ of the third magnetic layer 30-5 is of a relatively small value 4.0 μm (a width smaller than the track pitch), for example.

Using such an MR/Ind-composite thin-film head, data is recorded on and reproduced from a discrete-type magnetic disk having a track pitch of 5.2 μm, a track width of 3.6 μm, and a guard band of 1.6 μm, i.e., a track density of 4885 TIP (Track Per Inch). It is possible to avoid changes in the reproduced output without inviting an increase in the playback noise, and to increase the reproducing characteristics.

A cross-sectional structure of a magnetic head will be described below with reference to FIG. 18. The first and second magnetic layers 30-3, 30-4 are disposed on the base 30-6 in facing relationship to the ABS 30-7, the first and second magnetic layers 30-3, 30-4 sandwiching and shielding the MR element 30-1. The nonmagnetic insulating layer 30-8 serving as a magnetic gap upon recording data and the third magnetic layer 30-5 are disposed on the first and second magnetic layers 30-3, 30-4 in facing relationship to the ABS 30-7. The reference numeral 30-2 represents the spiral-pattern head winding formed between the second and third magnetic layers 30-4, 30-5 so as to surround magnetically coupling portions between their rear portions. The second and third magnetic layers 30-4, 30-5 constitute a recording head.

The MR element 30-1 has a leading-end electrode 3015 on its side held against the ABS 30-7, and a trailing-end electrode 30-16 on the other end thereof for detecting a signal magnetic field from a magnetic disk that is positioned in contact with or in confronting relationship to the ABS 30-7. The reference numeral 30-18 indicates a bias conductor for giving a bias magnetic field to the MR element 30-1. The second magnetic layer 30-4 functions as a shield for the MR element 30-1 upon reproducing data, and as an inductive core upon recording data.

The distance (recording gap) between the upper surface of the second magnetic layer 30-4 and the lower surface of the third magnetic layer 30-5 is 0.6 μm, and the distance between the center of the MR element 30-1 and the upper surface of the first magnetic layer 30-3 is 2 μm.

The composite thin-film head can increase the reproduced output because the track width of the playback head is large.

When data are recorded on and reproduced from the discrete-type magnetic disk using the composite thin-film head, it is possible to reduce playback fringing and provide a large margin with respect to a positional shift between the playback head and a track on the magnetic disk. Therefore, any changes in the reproduced output can be suppressed, and the reproduced output characteristics can be increased.

Each of the widths $W_{TI}$, $W_{TW}$ may be an integral multiple of the track width. The recording head and the playback head may double each other.

Figure 19:
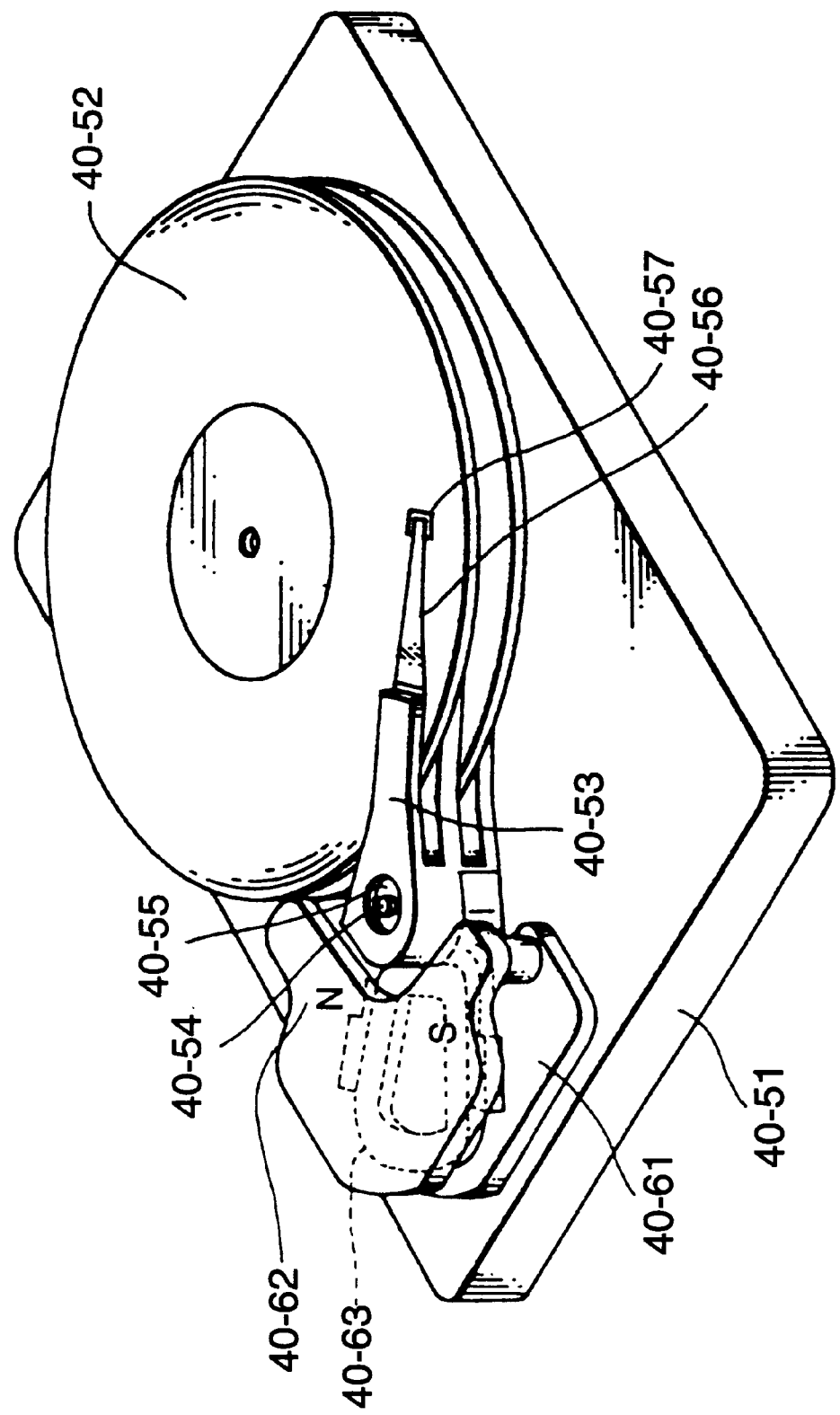
FIG. 19 is a perspective view showing an arm according to the present invention.
Figure 20:
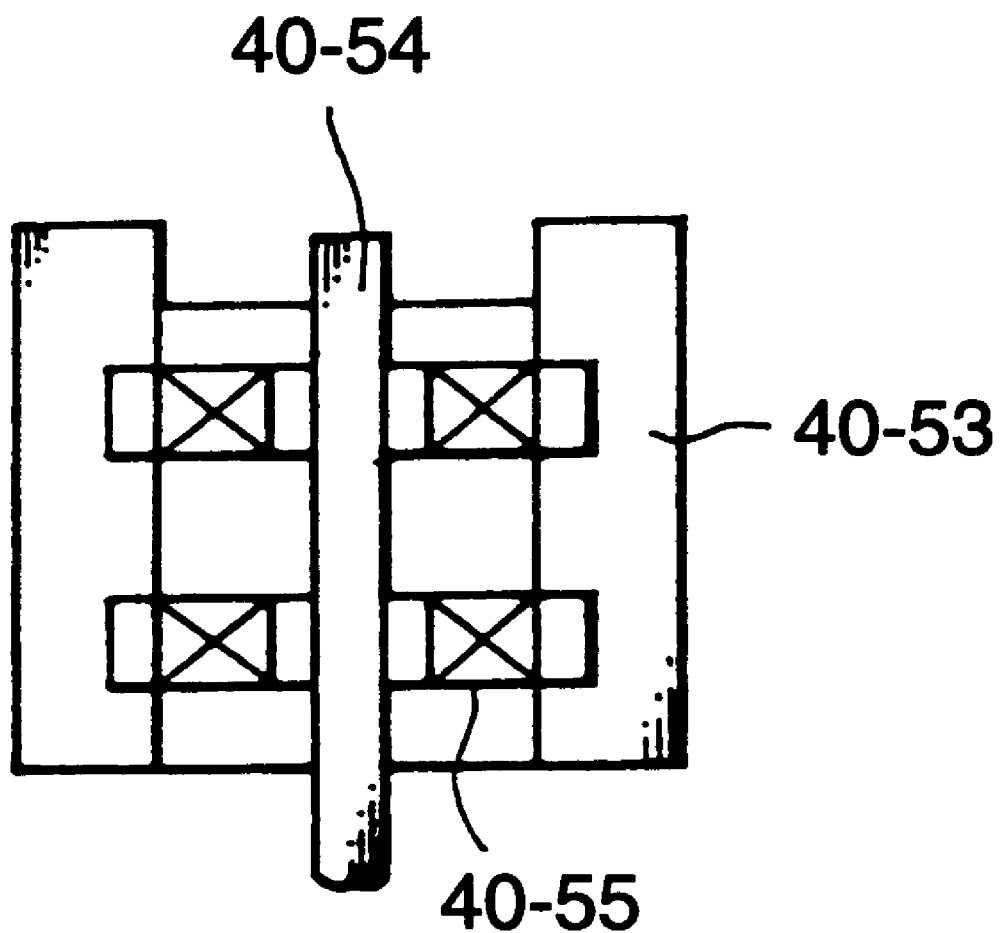
FIG. 20 is a cross-sectional view of a ball bearing shown in FIG. 19.

FIG. 19 shows a structure of an arm on which the magnetic head (recording head and playback head) described with reference to FIGS. 5, 6, 17, and 18 is mounted. As shown in FIG. 19, magnetic disks 40-52 are rotatably mounted on a lower casing 40-51 by a spindle motor (10-21 shown in FIG. 59). An arm 40-53 is angularly movably mounted on the lower casing 40-51 for angular movement about a shaft 40-54. As shown in a cross-sectional view of FIG. 20, ball bearings 40-55 are disposed between the shaft 40-54 and the arm 40-53 for reducing friction at the time the arm 40-53 is angularly moved.

A suspension spring 40-56 is attached to the distal end of the arm 40-53, and a slider 40-57 is attached to the distal end of the suspension spring 40-56 by a gimbal spring (not shown). The magnetic head (recording head and playback head) is mounted on the slider 40-57. There are two magnetic disks 40-52, each having magnetic films disposed on opposite surfaces thereof. A total of four sliders are disposed in confronting relationship to the opposite surfaces of the magnetic disks.

A voice coil 40-63 (21-15 shown in FIG. 6) is attached to the other end of the arm 40-53. Magnets 40-61, 4062 (21-14 shown in FIG. 6) are disposed above and below, respectively, of the voice coil 40-63. Magnetic fluxes are directed locally from the magnet 40-61 toward the magnet 40-62 and also from the magnet 40-62 toward the magnet 40-61. The coil 40-63 is disposed across the magnetic fluxes. As a result, when a drive current flows through the coil 40-63, electromagnetic forces are generated to cause the coil 40-63 and hence the arm 40-63 to turn about the shaft 40-54. Consequently, the slider 40-57 (and hence the magnetic head mounted thereon) is moved to a certain radial position over the magnetic disk 40-52.

The aspect of the clock signal generator 10-6 shown in FIG. 1 will be described below.

FIG. 21 shows an arrangement of an embodiment in which the present invention is applied to a magnetic hard disk device. Double-sided magnetic disks 50-1A, 50-1B (40-52 shown in FIG. 9) are rotated by a spindle motor 50-2. Magnetic heads 50-3A, 50-3B are supported respectively by arms 50-4A, 50-4B, and can be angularly moved about a center 50-5C of rotation by a voice coil motor (VCM) 50-5 to follow tracks 50-502 on upper surfaces of the magnetic disks 50-1A, 50-1B for writing data on and reading data from these tracks.

The two magnetic disks 50-1A, 50-1B constitute a cylinder 50-100. Although not shown, there are two magnetic heads for writing data on and reading data from lower surfaces of the double-sided magnetic disks 50-1A, 50-1B. These magnetic heads are also supported by the arms 50-4A, 50-4B for angular movement about the center 50-5C by the VCM 50-5. As described above with reference to FIG. 2, a plurality of clock marks 20-11 for giving a time standard are impressed in data tracks on the surfaces of the magnetic disks 50-1A, 50-1B. The reference numeral 50-6 represents the center of rotation of the spindle motor 50-2, i.e., the center of rotation of the magnetic disks 50-1A, 50-1B.

A host computer 50-50 supplies commands including a write command, a read command, etc. to a controller 50-70 through an interface cable 50-60. The controller 50-70 outputs control signals for controlling the magnetic hard disk device to a signal processor 50-20.

Reproduced signals read from the disks 50-1A, 50-1B by the magnetic heads 50-3A, 50-3B are amplified to a certain amplitude by a playback amplifier 50-21. The playback amplifier 50-21 supplies its output signal to a clock extractor 50-22, a track position error detector 50-23, a home index extractor 50-24, and a track address decoder 50-80.

An extracted clock signal (the clock mark 20-11) produced by the clock extractor 50-22 is supplied to a track eccentricity measuring unit 50-25. A home index signal 20-73 (FIG. 4), i.e., a rotational phase origin signal, produced by the home index extractor 50-24 is also supplied to the track eccentricity measuring unit 50-25. The track position error detector 50-23 generates a track position error signal (tracking error signal) from the difference between reproduced levels of a pair of wobbled marks 20-12, 20-13, and supplies the tracking error signal to a tracking servo circuit 50-40 and an off-track determining circuit 50-90.

The track eccentricity measuring unit 50-25 measures an amount of eccentricity of the data track circle 50-502 with respect to the central axis 50-6 as a function of an angular position θ on the disk where the home index on the disk is generated at a position represented by an angular coordinate value of 0, and stores the measured amount of eccentricity in a table in an eccentricity memory 50-26. The amount of eccentricity is supplied to a PLL circuit 50-30 for correcting a time base error of the clock signal, and also to a tracking servo circuit 50-40 for controlling the VCM 50-5.

One of the features of the embodiment shown in FIG. 21 is that the amount of eccentricity stored in the memory 50-26 is read by a reader 50-27 in synchronism with the rotation of the disk and converted by a D/A converter 50-28 into an analog signal, which is then compensated for by a feed-forward compensator 50-29, i.e., converted into a speed signal that is fed forward as a control voltage for a voltage-controlled oscillator (VCO) 50-35 of the PLL circuit 50-30.

The PLL circuit 50-30 includes a phase comparator 50-31, a loop filter 50-32 for effecting filtering such as low-path filtering on an output signal from the phase comparator 50-31, and the voltage-controlled oscillator 50-35 for outputting a clock signal whose phase and frequency depend on an output signal from the loop filter 50-32. The phase comparator 50-31 outputs the phase difference between the clock signal extracted by the clock extractor 22 and a clock signal outputted by the voltage-controlled oscillator 50-35 and fed back through a divide-by-N frequency divider 50-36.

The embodiment shown in FIG. 21 resides in that an analog adder (operational amplifier) 50-33 is disposed between the loop filter 50-32 and the VCO 50-35 for adding a signal supplied from the feed-forward compensator 50-29 through a switch 50-34 to the signal outputted from the loop filter 50-32, and supplying the sum signal to the VCO 50-35. Each of the loop filter 50-32 and the adder 50-33 may comprise a digital calculating element.

With this arrangement, the VCO 50-35 is driven by not only the output signal from the phase comparator 50-31 but also a track circle eccentricity representing voltage supplied through the reader 50-27, the D/A converter 50-28, the feed-forward compensator 50-29, and the switch 50-34. Therefore, the VCO 50-35 follows a pulse signal in synchronism with 840 clock marks per revolution, for example, which are generated from the disk, in a closed loop mode, and also operates in an open loop mode with a signal predicting a present instantaneous amount of eccentricity and supplied from the memory 50-26.

While a disk with eccentricity is operating, the clock from the disk as observed from the playback head fixed in the direction of θ (the direction of rotation of the disk) suffers fluctuations (jitter) in the direction of the time axis. Most of the component of the fluctuations which corresponds to the rotational frequency (60 Hz) intentionally oscillates the VCO 50-35 in the open loop mode to cause the clock signal outputted from the clock extractor 50-22 and the clock signal outputted from the VCO 50-35 to be closely in phase with each other at about ±20 ns (nanoseconds).

Because the clock signals are held closely in phase with each other in the open loop mode, the closed loop mode may only be necessary to cancel out mainly a high-frequency component (whose frequency is several to several tens times the rotational frequency) of the fluctuation component which has small amplitudes. Finally, therefore, the output signal from the VCO 50-35 can be kept very closely in phase with the clock signal outputted from the clock extractor 50-22 at ±1 ns or less.

As described above with reference to FIG. 2, data track circles are produced by a cutting machine having a feed accuracy of about 0.01 microns as with the optical disk fabrication apparatus. Therefore, the circularity of the data track circles has an error having a value which is sufficiently smaller than 1 microns. When such a disk is mounted on the rotatable shaft (the shaft 40-54 shown in FIG. 19), the center of the disk, i.e., the center of the data track circles, suffers an attachment error ranging from 10 to 50 μm with respect to the rotational shaft.

A process of measuring such a deviation (eccentricity) will be described in detail later on with reference to FIGS. 25 through 23. First, such a process will briefly be described with reference to FIG. 22.

Figure 22:
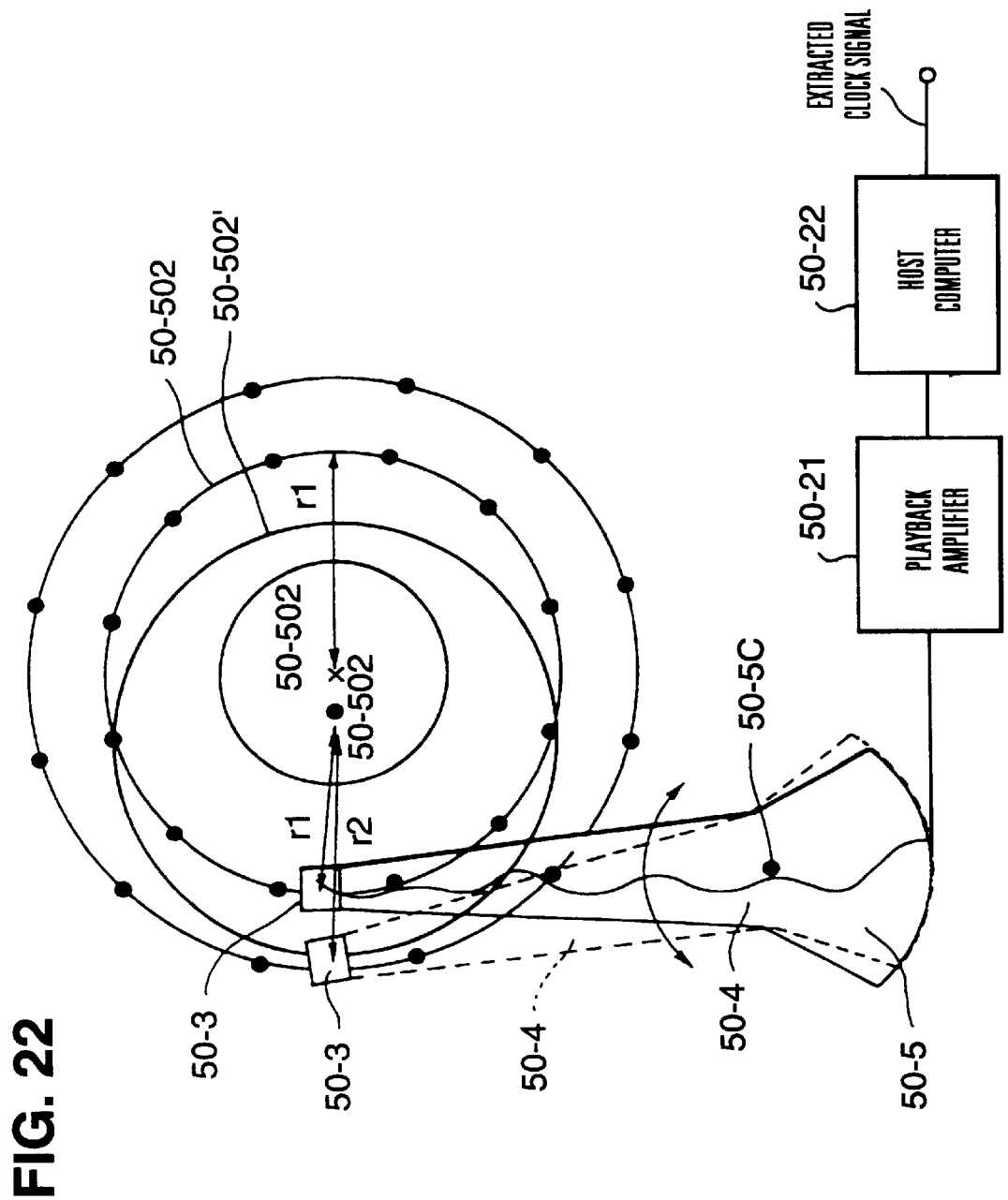
FIG. 22 is a diagram illustrative of an operation of eccentricity.
Figure 23:
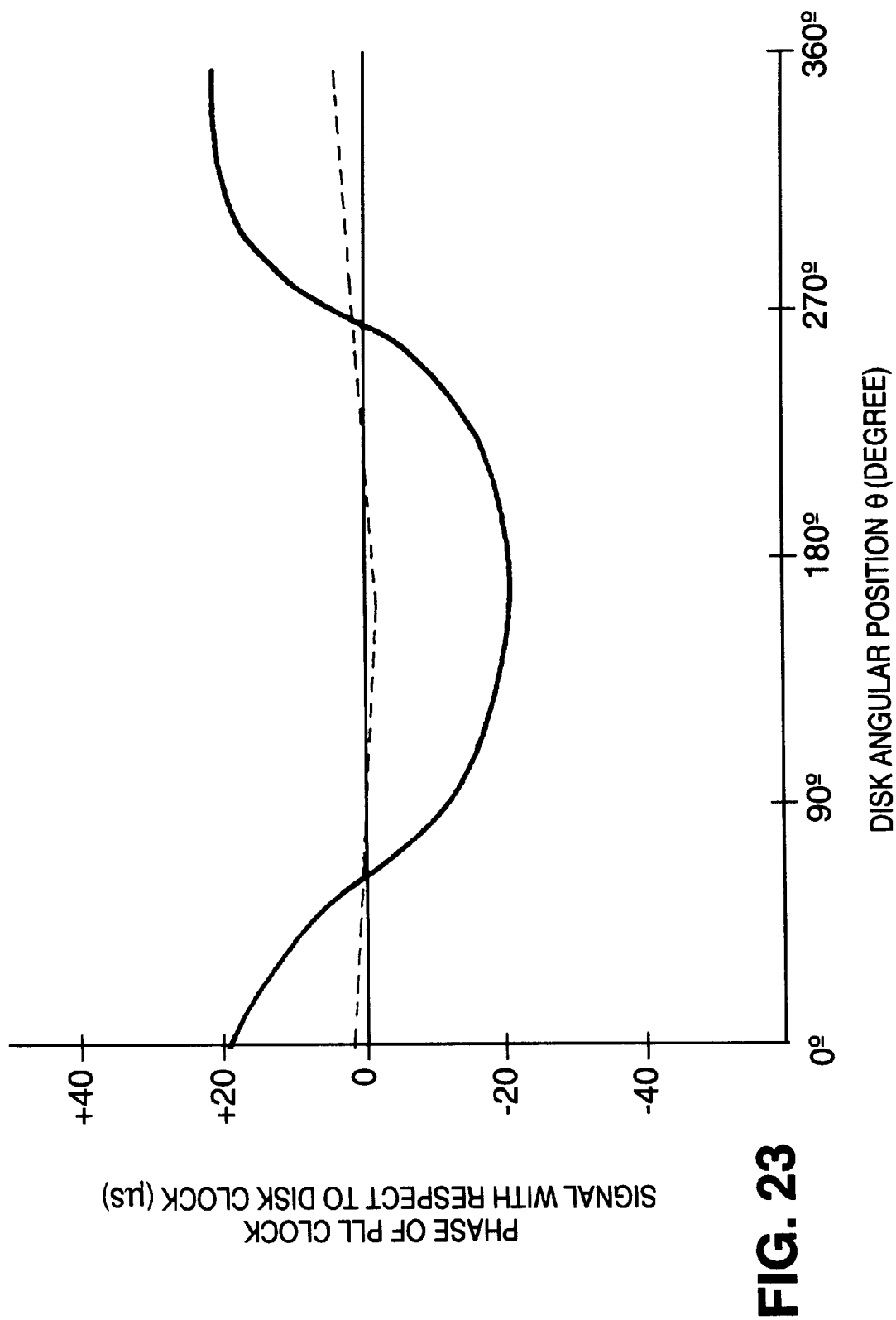
FIG. 23 is a diagram showing the manner in which the phase of a PLL clock varies with respect to a disk clock.

In FIG. 22, the reference numeral 50-500 indicates the center of the track 50-502, and the reference numeral 50-501 indicates the center of rotation of the disk. The playback head 50-3 is supported on the arm 50-4 and positioned by the tracking servo circuit 50-40 so as to trace the central axis of the track 50-502.

If it is assumed that the track 50-502 has a radius r0 (m), an eccentricity δ (m), and a rotational speed N (Hz), then the track 50-502 has an average peripheral speed V0 as follows:

$$V0 = 2\pi r0 \times N \text{ (m/sec)}.$$

If the number of pulses produced by clock marks (indicated by round dots in FIG. 22) contained in the circular track 50-502 having the radius r0 is M (pulses/revolution), then an interpulse distance L0 is given by:

$$L0 = 2\pi r0 / M.$$

The time T0 required for the playback head 50-3 to path through the interpulse distance L0 is:

$$T0 = L0/V0 = (2\pi r0/M)/(2\pi r0 \times N) = 1/(N \times M).$$

For example, if N=60.0 Hz and M=840, then the time T0 is:

$$T0 = 19.841 \text{ (μsec)}.$$

The pulse period T2 in a region where the radius is increased to r2=r0+δ by the eccentricity, and the pulse period T1 in a region where the radius is reduced to r1=r0−δ by the eccentricity are given as follows:

$$T2 = 2\pi r0/M(2\pi r2 \times N) = r0/r2 \times (N \times M),$$

$$T1 = 2\pi r0/M(2\pi r1 \times N) = r0/r1 \times (N \times M).$$

Therefore, when r0=20 mm and r2=20.05 mm, the time period T2 becomes T0×1.0025, and hence varies by 0.25%. While this change is very small, it can be measured relatively accurately as it is a quantity in time domain.

In this example, since T0=19.841 (μs), T2=19.891 (μs), and T1=19.792 (μs), the average value of T and each of maximum and minimum values thereof differ from each other by about 50 ns (nanoseconds). Since such differences can be measured with sufficient accuracy according to the present electronic circuit technology, the measurement of eccentricities results in the measurement of time intervals.

Advances and delays of the signal as it is observed against the eccentricity in one revolution of the disk are stored as digital numerical values in the memory 50-26, thereby completing the generation of an eccentricity table.

A feed-forward control process of the VCO 50-35 using the eccentricity table stored in the memory 50-26 is carried out as follows: First, the contents of the memory 50-26 are read in synchronism with the rotational phase of the disk by the reader 50-27, and converted into an analog voltage by the D/A converter 50-28. The analog signal is compensated for phase by the feed-forward compensator 50-29, which is composed of a coil L, a capacitor C, and a resistor R (not shown), and then applied through the switch 50-34 and the analog adder 50=33 to the VCO 50-35. The oscillating phase of the VCO 50-35 varies largely as indicated by the solid-line curve in FIG. 23 when no feed-forward compensation signal is applied thereto. When a feed-forward compensation signal is applied to the VCO 50-35, the oscillating phase of the VCO 50-35 becomes close to 0° as indicated by the broken-line curve in FIG. 23.

Figure 24:
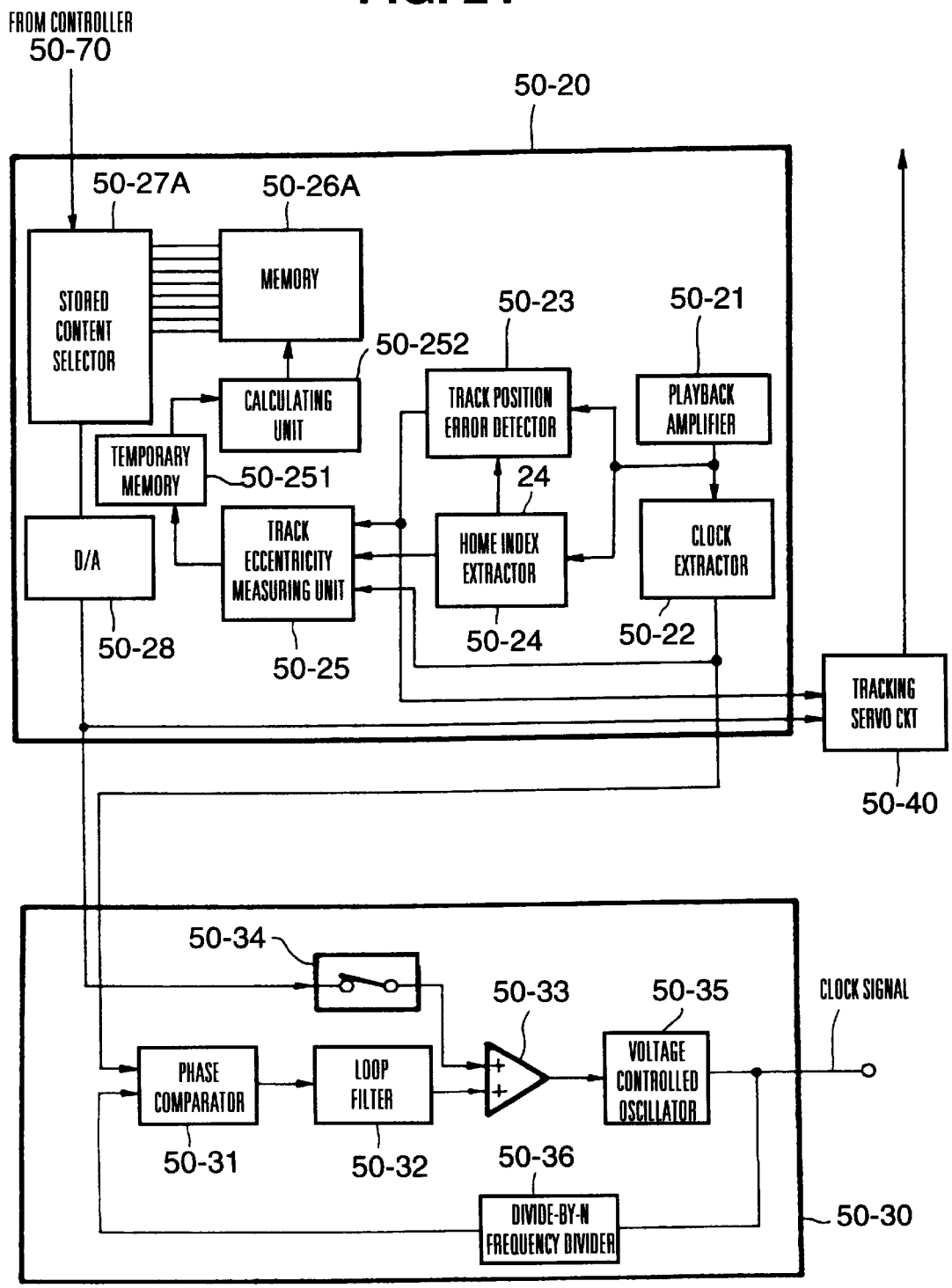
FIG. 24 is a block diagram of another circuit for correcting a time base error of a clock signal according to the present invention.

FIG. 24 shows a second embodiment of the clock signal correcting circuit according to the present invention.

In the embodiment shown in FIG. 21, displacements (eccentricities) of a track itself with respect to various rotational positions of the disk are stored in the memory 50-26. In the embodiment shown in FIG. 24, however, displacements of a track itself are temporarily stored in a temporary memory 50-251, and then calculations equivalent to those in the feed-forward compensator 50-29 shown in FIG. 21 are effected on the stored contents of the temporary memory 50-251 by a calculating unit 50-252, after which they are stored in a memory 50-26A. Therefore, the quantities stored in the memory 50-26A are speeds corresponding to eccentricities.

In the arrangement shown in FIG. 24, the feed-forward compensator 50-29 shown in FIG. 21 may be dispensed with. Specifically, the compensator 50-29 or filter shown in FIG. 21 is required to be composed of high-speed devices as it operates on a real-time basis. Since eccentricities may need to be measured once in a day, if calculations equivalent to those in the feed-forward compensator 50-29 shown in FIG. 21 are effected as with the embodiment shown in FIG. 24, then the calculating unit 50-252 may be composed of an inexpensive general-purpose processor. The arrangement shown in FIG. 24 is also advantageous in that operations which are difficult to carry out in an analog arrangement can be performed.

In the embodiment shown in FIG. 24, a stored content selector 50-27A selectively picks up quantities (i.e., speeds), corresponding to amounts of eccentricity of a plurality of disk surfaces, which are stored in the memory 50-26A based on a command from the controller 50-70.

Since the embodiment shown in FIG. 24 is arranged as described above, a measured eccentricity produced in the same manner as with the embodiment shown in FIG. 21 is adjusted to certain amplitude-phase characteristics by the calculating unit 50-252, and then stored in the memory 50-26A. Such an eccentricity measuring operation is repeated independently for each of the surfaces of plural disks at suitable times after the power supply switch is turned on. Since there are four disk surfaces, the eccentricity measuring operation is carried out four times using the heads that correspond respectively to the disk surfaces. Therefore, the memory 50-26A stores four types of eccentricities.

Operation at the time the controller 50-270 selects the disk 50-1B (see FIG. 21) will be described below. At this time, the selector 50-27A outputs eccentricity data detected by the head 50-3B from the information stored in the memory 50-26A, in synchronism with the rotation of the disk 50-1B. The outputted eccentricity data represent a phase-compensated amount of eccentricity at angular position coordinates on the disk which correspond to memory addresses.

The outputted eccentricity data are converted by the D/A converter 50-28 into an analog voltage, which is applied to the VCO (voltage-controlled oscillator) 50-35 through the adder 50-33. The VCO 50-35 accurately cancels out advances and delays of the clock signal which are caused by the eccentricity of the disk, and outputs pulses in very close phase with the clock signal reproduced from the disk.

In the embodiment shown in FIG. 24, the calculated amounts of eccentricity from the calculating unit 50-252 are stored in the memory 50-26A, and the calculated amount of eccentricity which corresponds to the disk surface to be processed is read out. However, the amounts of eccentricity themselves may be stored, and the calculated amount of eccentricity which corresponds to the disk surface to be processed may be read out.

According to the above embodiment of the present invention, it is possible to generate a clock signal which is highly accurately synchronous with clock marks impressed on a disk. If such a clock signal is used in the detection of a track position error signal or the demodulation of a data code, highly good results can be obtained. The gain of an eccentricity frequency range may be increased without increasing the band of a clock regenerating loop.

A process of measuring an amount of eccentricity will be described below.

Figure 25:
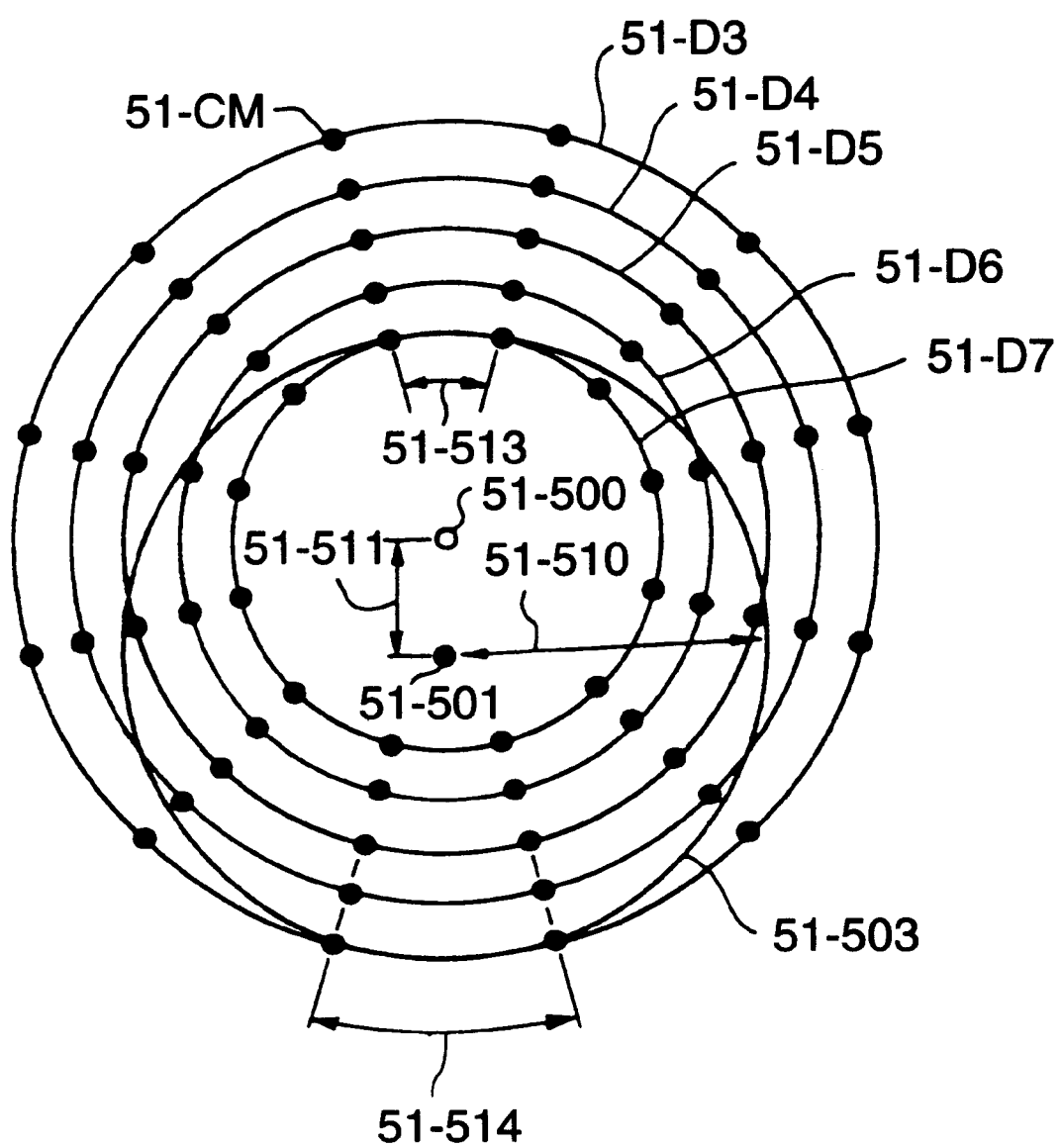
FIG. 25 is a diagram showing the relationship between clock marks and eccentricity.

FIG. 25 shows the relationship between a magnetic disk on which N clock mark signals (20-11 shown in FIG. 2) are physically stored at equal intervals along the full circumference of a circular data track and the path of a playback head, i.e., a signal reading head, that is fixed at a position spaced a certain radius from the center of the disk that is chucked. In FIG. 25, the reference numeral 51-500 represents the center of the circular data track. Data tracks 50-D3 through 50-D7 are formed concentrically around the center 51-500, and the N clock mark signals 51-CM (20-11 shown in FIG. 2) are physically recorded at equal intervals along the full circumference of each circular data track.

When the magnetic disk with the above circular data tracks is chucked on a spindle motor shaft 51-501, the magnetic disk suffers an eccentricity 51-511. The reference numeral 51-503 represents a circular path of a playback head, i.e., a signal reading head, that is fixed at a position spaced a certain radius 51-510 from the center 51-501 of the disk that is chucked. When the circular path 51-503 is closest to the center 51-500, the time in which the head travels through a distance 51-513 between clock mark signals 51-CM on the circular path 51-503 becomes shortest. When the circular path 51-503 is furthest from the center 51-500, the time in which the head travels through a distance 51-514 between clock mark signals 51-CM on the circular path 51-503 becomes longest. This is because the radius 51-510 of rotation of the disk is the same, and the head travels at the same speed.

Time intervals of clock mark reproduced signals reproduced from the playback head, i.e., the signal reading head, that is fixed at a position spaced the certain radius 51-510 from the center 51-501 of the disk that is chucked, are measured and utilized to produce amounts of eccentricities corresponding to angular positions on the disk which are caused by the eccentricity 51-511.

Figure 26:
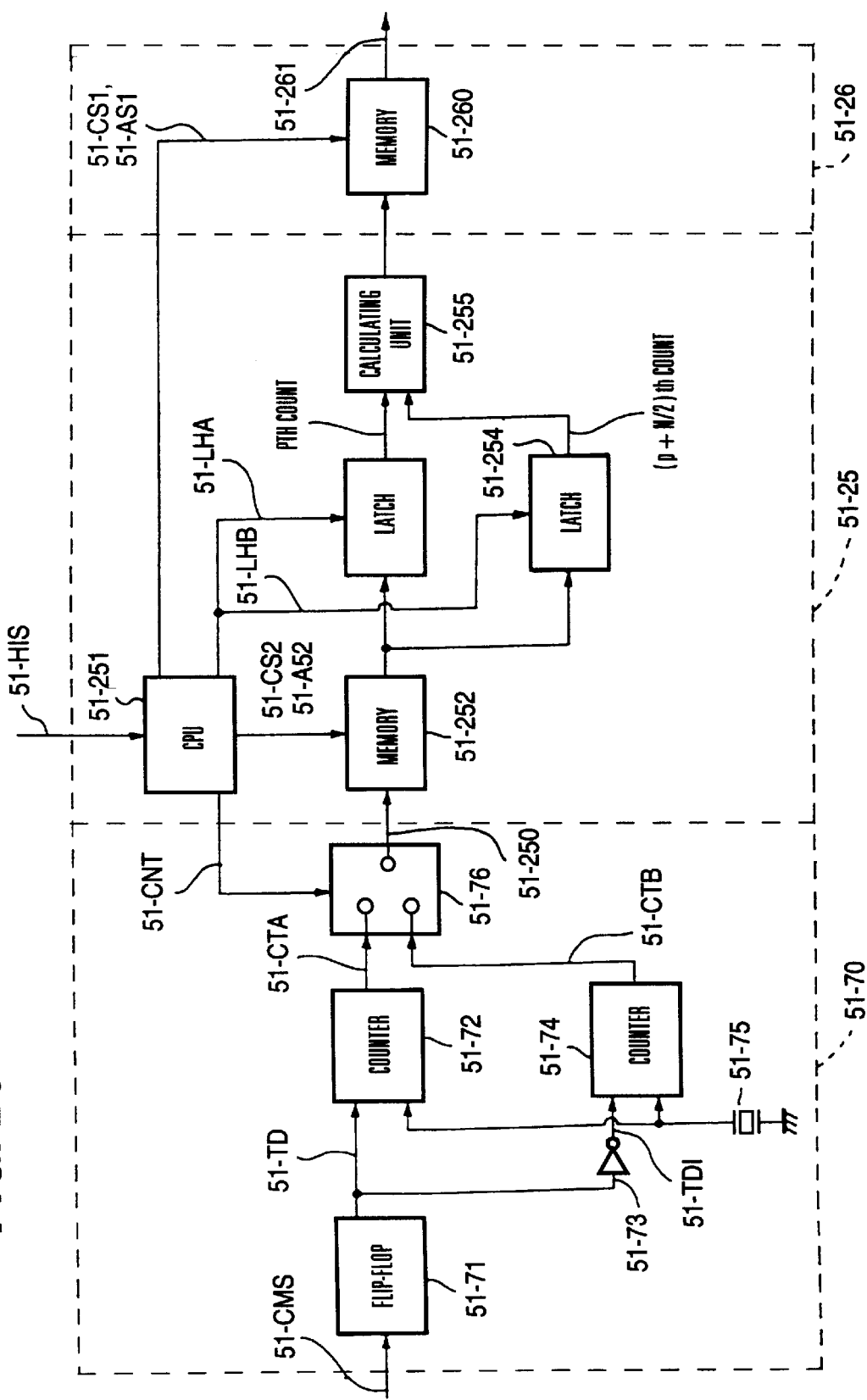
FIG. 26 is a block diagram of an arrangement of an eccentricity measuring unit 50-25 shown in FIG. 21.

FIG. 26 shows in specific details a time interval measuring unit 51-70 and an eccentricity calculating unit 51-25 of the eccentricity measuring unit 50-25 shown in FIG. 21. An eccentricity recording unit 51-26 corresponds to the eccentricity recording unit 50-26 shown in FIG. 21. In the example shown in FIG. 26, the time interval measuring unit 5170 comprises a flip-flop 51-71, a counter 51-72, an inverter 51-73, a counter 51-74, an oscillator 51-75, and a switch 51-76. The eccentricity calculating unit 51-25 comprises a CPU 51-251, a memory 51-252, latches 51-253, 51-254, and a calculating unit 51-255. The eccentricity recording unit 51-26 comprises a memory 51-260. The CPU 51-251 has a memory access function for the memory 51-252.

The flip-flop 51-71 outputs a pulse signal 51-TD which switches between high and low TTL levels each time a clock mark reproduced signal 51-CMS reproduced from the disk arrives. The pulse signal 51-TD is supplied directly to the counter 51-72, and also inverted by the inverter 51-73 and supplied to the counter 51-74.

The counter 51-72 measures, with the oscillator 5175, a time interval in which the pulse signal 51-TD is high, and outputs a measured time interval value 51-CTA. The counter 51-74 measures, with the oscillator 51-75, a time interval in which the pulse signal outputted from the inverter 51-73 is high, i.e., a time interval in which the pulse signal 51-TD is low, and outputs a measured time interval value 51-CTB.

The switch 51-76 outputs the measured time interval value 51-CTA outputted from the counter 51-72 and the measured time interval value 51-CTB outputted from the counter 51-74, alternatively as a count 51-250 according to a control signal 51-CNT which is outputted from the CPU 51-251 based on a home index signal 51-HIS (20-73 shown in FIG. 4). The memory 51-252 successively stores (N+N/2) measured time interval values 51-250 (for half revolution) supplied from the switch 51-76 according to a control signal 51-CS2 and an address 51-AS2 that are outputted from the CPU 51-251 based on the home index signal 51-HIS.

The measured time interval values stored in the memory 51-252 are read out according to the control signal 51-CS2 and the address signal 51-AS2 which are outputted from the CPU 51-251. The pth measured time interval value that has been read out is held by the latch 51-253 according to a latch signal 51-LHA outputted from the CPU 51-251. The (p+N/2)th measured time interval value (at a sampling position spaced from the pth sampling position by half revolution of the disk) that has been read out is held by the latch 51-254 according to a latch signal 51-LHB outputted from the CPU 51-251.

The subtractor 51-255 subtracts the (p+N/2)th measured time interval value from the pth measured time interval value. The subtractor 51-255 effects such a subtraction for each of p=1 through N. The N results of subtraction produced from the subtractor 51-255 are successively stored in the memory 51-260 according to a control signal 51-CS1 and an address signal 51-AS1 that are outputted from the CPU 51-251 based on the home index signal 51-HIS.

The results of subtraction stored in the memory 51-260 represent amounts of eccentricity corresponding to angular positions on the disk, and indicate distances produced between the circular data tracks 51-D3 and the head path 51-503 (see FIG. 25) due to the eccentricity. The results of subtraction are read out of the memory 51-260 as amounts 51261 of eccentricity according to the control signal 51-CS1 and the address signal 51-AS1 that are outputted from the CPU 51-251 based on the home index signal 51-HIS, and can be used as an eccentricity distance table for correcting eccentricities.

Figure 27:
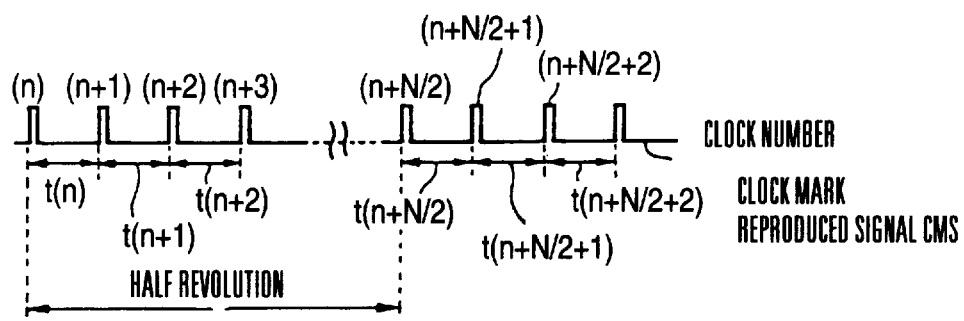
FIG. 27 is a diagram illustrating time intervals of a reproduced clock mark signal.

FIG. 27 shows the relationship between clock mark reproduced signals 51-CMS and time intervals that are measured in the arrangement shown in FIG. 26. In FIG. 27, it is assumed that the count of a time interval between an nth clock mark reproduced signal 51-CMS and an (n+1)th clock mark reproduced signal 51-CMS is represented by t(n). If the count at the time the circular path 51-503 shown in FIG. 25 is remotest from the center 51-500 of the circular data tracks is represented by t(k), then the count at the time the circular path 51-503 is closest to the center 51-500 of the circular data tracks is t(k+N/2).

Figure 28:
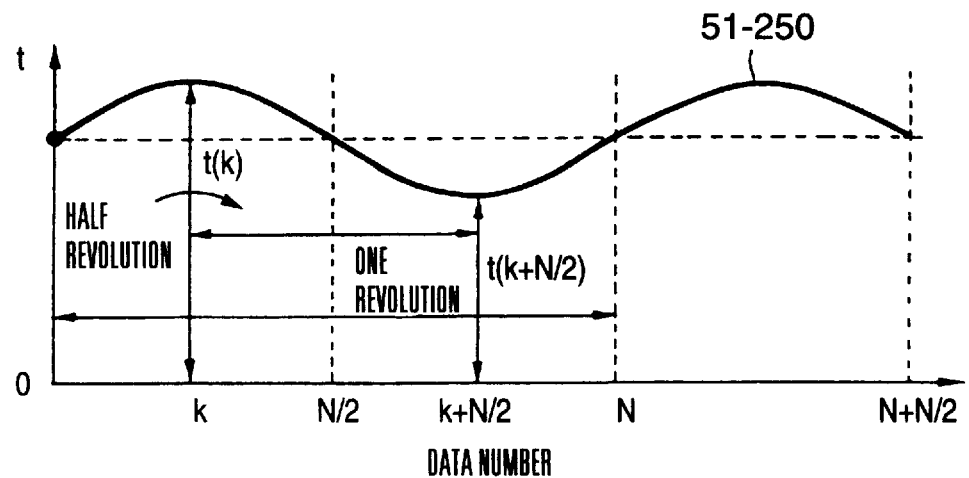
FIG. 28 is a diagram showing the manner in which a clock time interval count varies.

FIG. 28 shows time intervals of the clock mark reproduced signals measured by the time interval measuring unit 51-70 shown in FIG. 26, i.e., time intervals of the clock mark reproduced signals measured by the memory 51-70, i.e., a series of counts 51-250 stored in the memory 51-252, as related to data numbers (sampling numbers). In FIG. 28, the count at the time the circular path 51-503 shown in FIG. 25 is remotest from the center 51-500 of the circular data tracks is t(k), and the count at the time the circular path 51-503 is closest to the center 51-500 of the circular data tracks is t(k+N/2).

Figure 29:
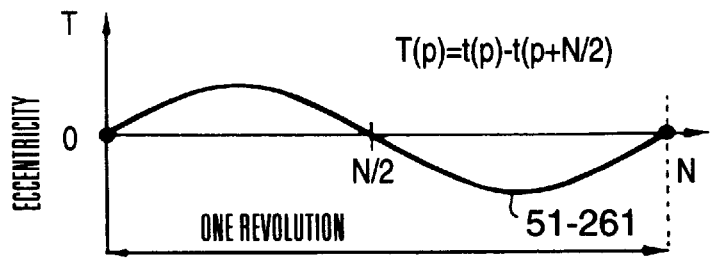
FIG. 29 is a diagram illustrative of the amount of eccentricity.

FIG. 29 shows amounts of eccentricity stored in the memory 51-260 of the eccentricity memory 51-26 arranged as shown in FIG. 26 and related to the rotational angle of the disk, i.e., distances produced between the circular data tracks and the head path 51-503 (see FIG. 25) due to the eccentricity. The illustrated amounts of eccentricity are measured results produced by subtracting the (p+N/2)th measured time interval value from the pth measured time interval value. The series of data 51-261 stored in the memory 51-260 can be used as an eccentricity distance table corresponding to disk angular positions for correcting eccentricities.

Figure 30:
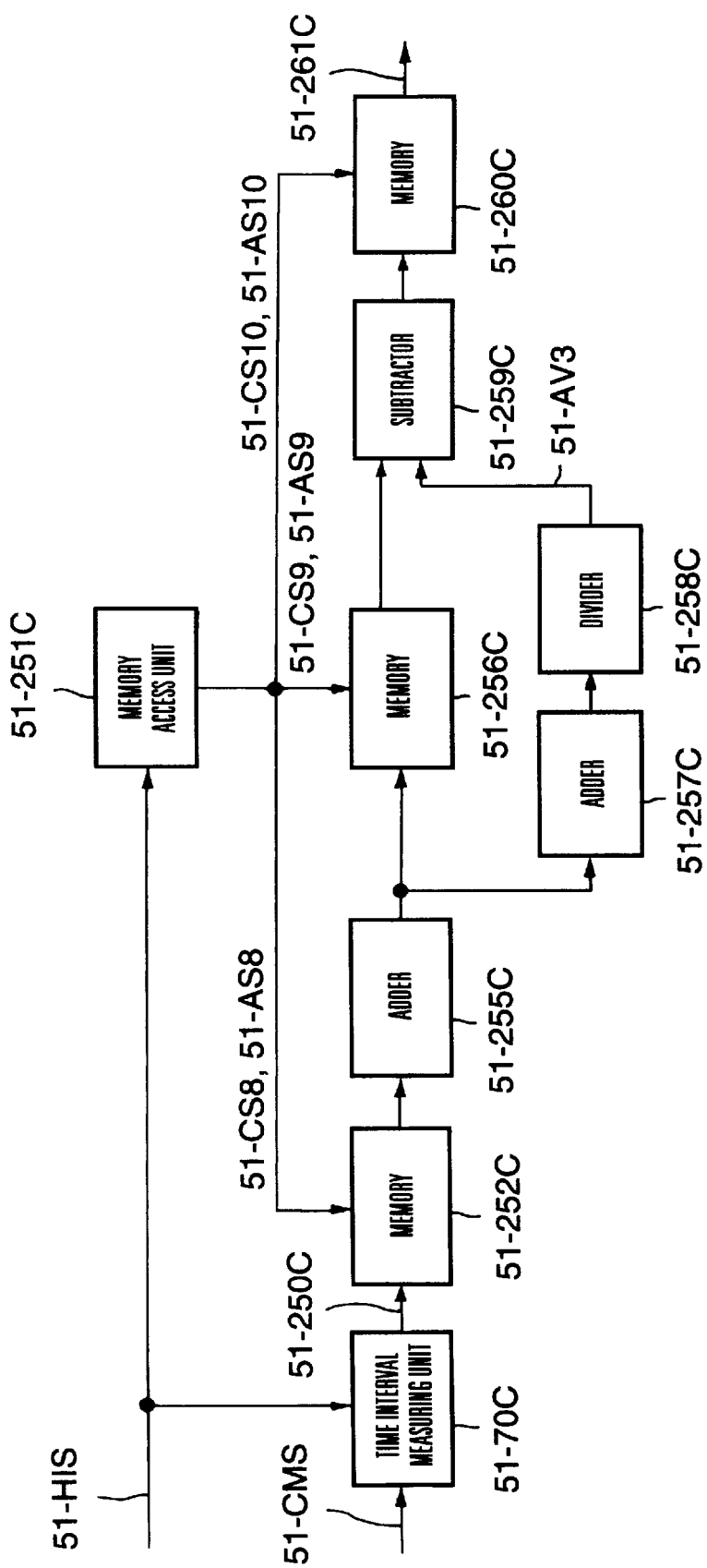
FIG. 30 is a block diagram of another arrangement of the eccentricity measuring unit 50-25.

FIG. 30 shows an arrangement of another embodiment of the eccentricity measuring unit 25 shown in FIG. 21. A time interval measuring unit 51-70C measures, using the home index signal 51-HIS, a time interval between an (n+m)th clock mark reproduced signal 51-CMS (n is an integer from 1 to N) and an (n+m+1)th clock mark reproduced signal 51-CMS which are reproduced from the disk, with respect to each integer m=0 through (N+N/2−1). The measured time interval values measured by the time interval measuring unit 51-70C are successively stored in a memory 51-252C according to a control signal 51-CS8 and an address signal 51-AS8 which are outputted from a memory access unit 51-251C based on the home index signal 51-HIS.

The measured time interval values stored in the memory 51-252C are read therefrom according to the control signal 51-CS8 and the address signal A51-S8 which are outputted from the memory access unit 51-251C based on the home index signal 51-HIS. An adder 51-255C adds N/2 measured time interval values ranging from the pth measured time interval value to the (p+N/2) measured time interval value (for half revolution) with respect to each integer p=1 through N. The results of addition produced by the adder 51-255C are successively stored in a memory 51-256C according to a control signal 51-CS9 and an address signal 51-AS9 which are outputted from the memory access unit 51-251C based on the home index signal 51-HIS.

N results of addition produced by the adder 51-255C (for one revolution) are added by an adder 51-257C, and the result of addition produced by the adder 51-257C is divided into 1/N by a divider 51-258C which outputs an average value 51-AV3.

The results of addition stored in the memory 51-256C are successively read therefrom according to the control signal 51-CS9 and the address signal 51-AS9 which are outputted from the memory access unit 51-251C based on the home index signal 51-HIS. A subtractor 51-259C divides the kth result of subtraction that has been read by the average value AV3 for each integer k=1 through N. The results of subtraction produced by the subtractor 51-259C are successively stored in a memory 51-260C according to a control signal 51-CS10 and an address signal 51-AS10 which are outputted from the memory access unit 51-251C based on the home index signal 51-HIS.

The results of subtraction stored in the memory 51-260C represent amounts of eccentricity corresponding to angular positions on the disk, and indicate distances produced between the circular data track 51-D3 and the head path 51-503 (see FIG. 25). The results of subtraction are read out of the memory 51-260C as amounts 51-261C of eccentricity according to the control signal 51-CS10 and the address signal 51-AS10 which are outputted from the memory access unit 51-251C based on the home index signal 51-HIS, and can be used as an eccentricity distance table for correcting eccentricities. Therefore, the embodiment shown in FIG. 30 is effective to reduce noise and reduce the lengths of the counters used in measuring time intervals.

Figure 31:
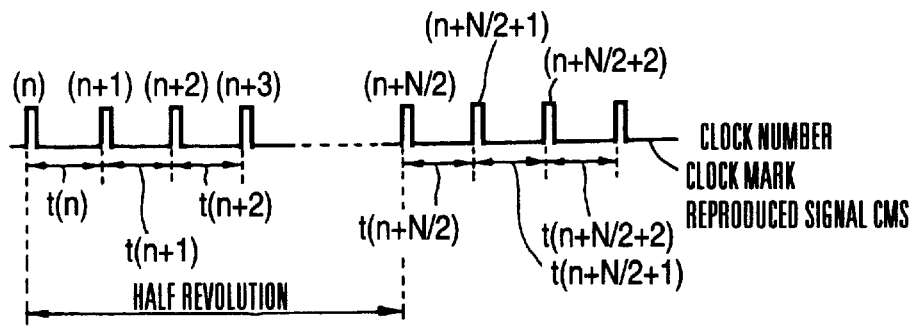
FIG. 31 is a diagram illustrating time intervals of a reproduced clock mark signal in the embodiment shown in FIG. 30.

FIG. 31 shows the relationship between clock mark reproduced signals and time intervals 51-250C that are measured in the embodiment shown in FIG. 30. In FIG. 31, a time interval between a second clock mark reproduced signal 51-CMS and an (n+1)th clock mark reproduced signal 51-CMS is represented by t(n).

Figure 32:
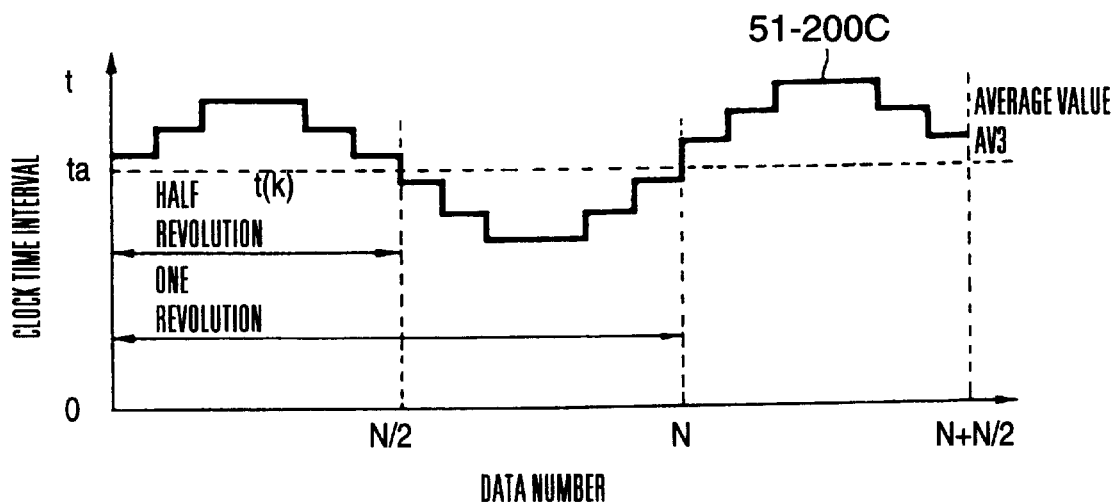
FIG. 32 is a diagram showing the manner in which a clock time interval varies in the embodiment shown in FIG. 30.

FIG. 32 shows time intervals 51-250C of the clock mark reproduced signals measured by the time interval measuring unit 51-70C, and an average value 51-AV3 outputted from the divider 51-258C in the embodiment shown in FIG. 30. The time interval measuring unit 51-70C measures a minimum time unit which the measuring means has. When the minimum time unit is coarse with respect to the amounts of eccentricity, the series 51-250C of time interval data is stepped with respect to the disk angular positions. If the number N/2 of time interval data 51-250C which have been measured stepwise and are added by the adder 51-255C is sufficiently large, the obtained eccentricity information can smoothly be reproduced with respect to the disk angular positions.

Figure 33:
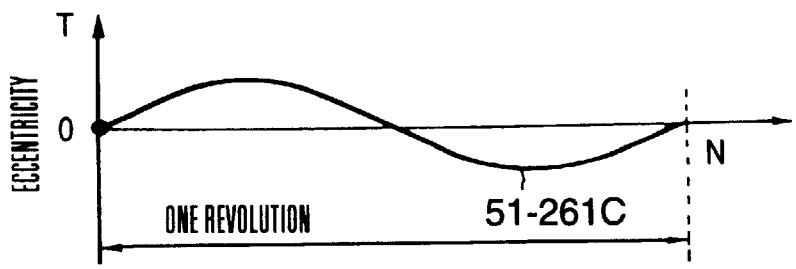
FIG. 33 is a diagram illustrative of the amount of eccentricity in the embodiment shown in FIG. 30.

FIG. 33 shows amounts 51-261C of eccentricity stored in the memory 51-260C in the embodiment shown in FIG. 30 and related to the rotational angle of the disk, i.e., distances produced between the circular data tracks 51-D3 and the head path 51-503 (see FIG. 25) due to the eccentricity. The series of data 51-261C stored in the memory 51-260C can be used as an eccentricity distance table corresponding to disk angular positions for correcting eccentricities.

In the foregoing embodiments, eccentricity is measured from clock marks. However, it may be measured from the servo pattern (the unique pattern 20-72, the gray code 20-71, the wobbled marks 20-12, 20-13, etc.) recorded in the servo data recording region 20-40 shown in FIG. 2.

The aspect of the tracking servo unit 10-7 shown in FIG. 1 will be described below.

Figure 34:
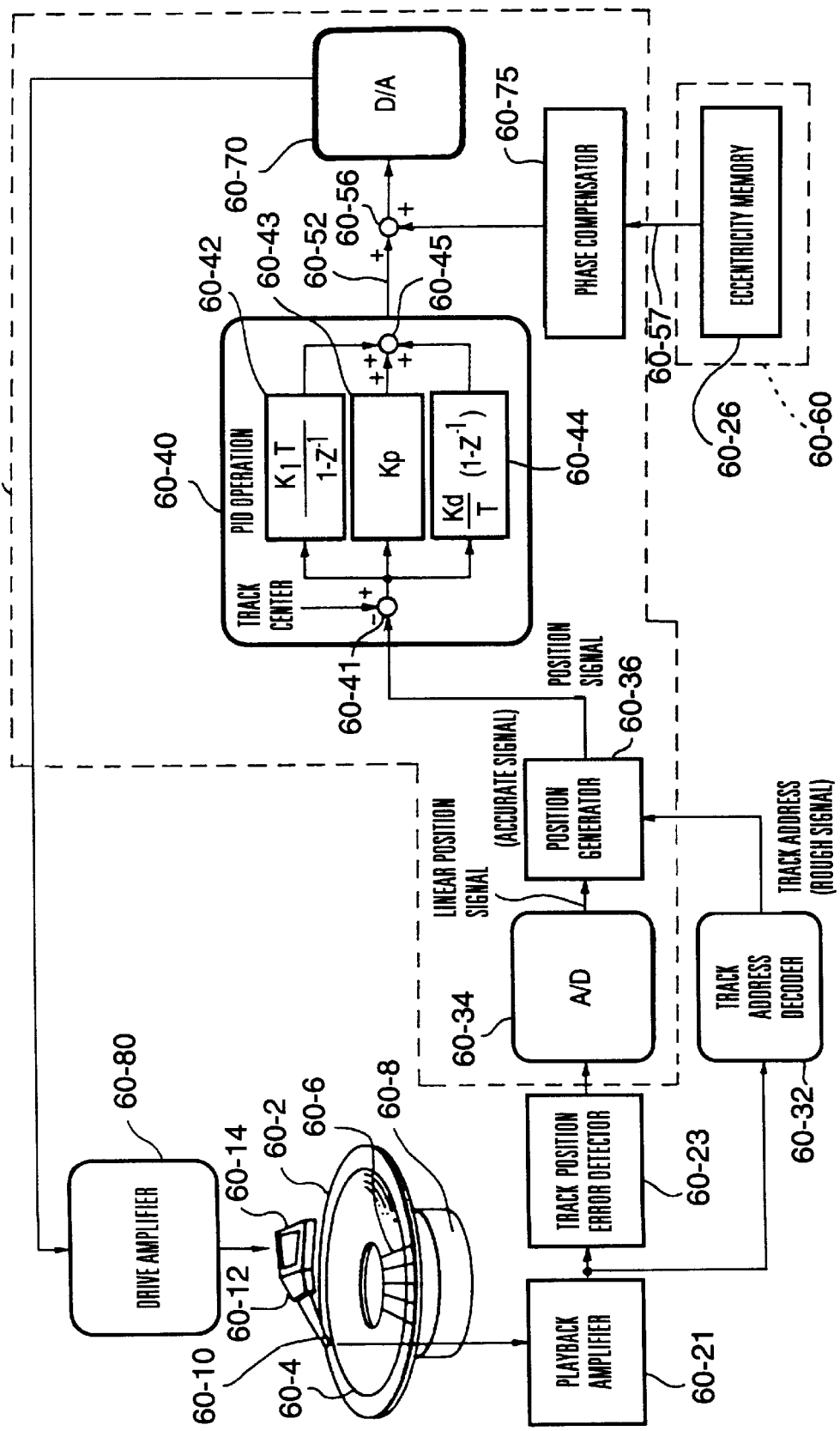
FIG. 34 is a block diagram of a tracking servo circuit according to the present invention.

FIG. 34 shows an arrangement of an embodiment for effecting tracking control in a magnetic disk device. A magnetic disk 60-2 (50-1A, 50-1B shown in FIG. 21) is rotated by a spindle motor 60-8. A magnetic head 60-10 (having the structure shown in FIGS. 17 and 18) is supported by an arm 60-12, and can be angularly moved by a voice coil motor (VCM) 60-14 for writing data on and reading data from the magnetic disk 60-2.

As has been described above with reference to FIG. 2, the magnetic disk 60-2 has a number of concentric or spiral tracks 60-4 in which there are recorded servo patterns including a rough pattern (gray code 20-71) and an accurate pattern (wobbled marks 20-12, 20-13) for positioning (tracking control) the magnetic head 60-10. The spindle motor 60-8 has a rotatable shaft that is driven at 3600 rpm, for example.

A playback amplifier 60-21 amplifies an output signal from the magnetic head 60-10 and outputs the signal to a track position error detector 60-23 and a track address decoder 60-32. The track address decoder 60-32 reads a track address of gray code from the inputted signal, compares the track address with the address of a desired track (to be accessed), and outputs the difference as a rough signal to a position generator 60-36. The track position error detector 60-23 detects a signal corresponding to wobbled marks from the inputted signal, and outputs a tracking error signal corresponding to a deviation of the magnetic head 60-10 from the track. The tracking error signal is converted by an A/D converter 60-34 into an analog signal, which is supplied to the position generator 60-36.

The position generator 60-36 adds the output signal from the track address decoder 60-32 and the tracking error signal from the A/D converter 60-34, thereby generating a positional signal (final tracking error signal).

A feedback controller 60-40 comprises a subtractor 60-41 for determining the difference between the positional signal from the position generator 60-36 and a signal indicative of a servo reference of a track (this signal corresponds to a position where to place the magnetic head, and becomes 0 when the position of the magnetic head is at the center of a track), and outputting a position error signal, components 60-42, 60-43, 60-44 for effecting a PID (Proportional plus Integral plus Derivative) action on the position error signal, and an adder 60-45 for adding output signals from these components 60-42, 60-43, 60-44. The feedback controller 6040 energizes the VCM 60-14 through a D/A converter 60-70 and a drive amplifier 60-80 to position the magnetic head 60-10 on a reference position (normally at the center) of a track 60-4. The foregoing arrangement is of known art.

The embodiment shown in FIG. 34 includes in a feed-forward controller 60-60 having an eccentricity memory 60-26 and an adder 60-56 for adding a signal which is produced by phase-compensating (equalizing) an output signal from the feed-forward controller 60-60 with a phase compensator 60-75 to an output signal from the feedback controller 60-40 and supplying a sum signal to the D/A converter 60-70. The eccentricity memory 60-26 of the feed-forward controller 60-60 may comprise the eccentricity memory 50-26 shown in FIG. 21 (the eccentricity memory 51-26 shown in FIG. 26). Thus, the eccentricity memory 60-26 stores data corresponding to eccentricities as described above with reference to FIGS. 25 through 33.

Feed-forward data stored in the eccentricity memory 60-26 are referred to at the same timing as the above eccentricity measuring operation for one revolution, and outputted as a feed-forward control output signal 60-57. This signal is phase-compensated (advanced in phase) by the phase compensator 60-75, and then applied to the adder 60-56. The adder 60-56 adds the signal to the output signal 60-52 from the feedback controller 60-40, and supplies the sum signal through the D/A converter 60-70 to the VCM drive amplifier 60-80. The drive amplifier 60-80 energizes the VCM 60-14 based on the supplied signal.

A reference signal for referring to the control quantity data stored in the eccentricity memory 60-26 at the same timing as when eccentricities are measured may be a signal which is reproduced by the head 60-10 as representing a servo pattern 60-6 (e.g., clock marks) recorded on the disk 60-2, or a rotational angle signal from the spindle motor 608.

Figure 35:
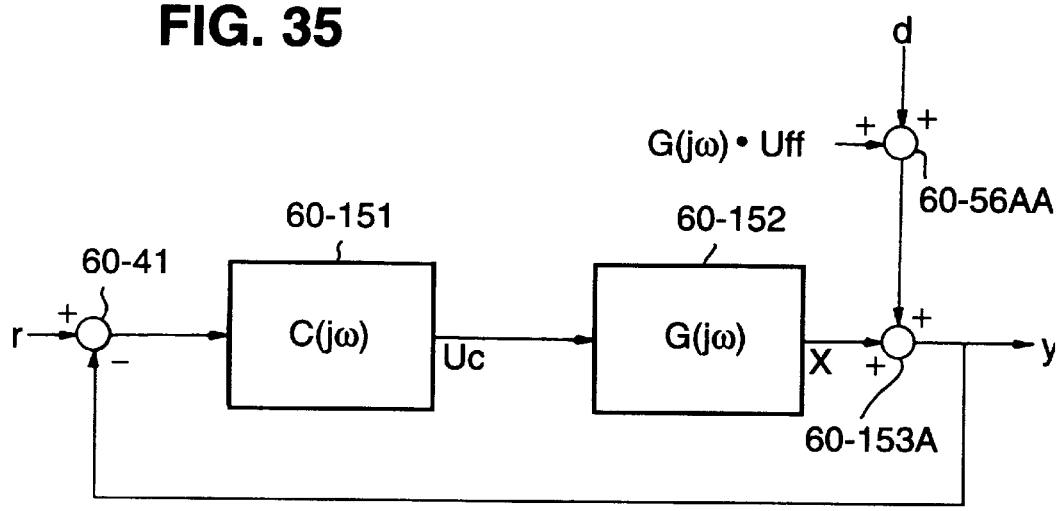
FIG. 35 is a diagram illustrating transfer characteristics of the embodiment shown in FIG. 34.

With the above arrangement, it is possible to reduce a normal positioning error with respect to a track reference position to be achieved by a closed control loop which is composed of the position generator 60-36, the feedback controller 60-40, the D/A converter 60-70, and the VCM drive amplifier 60-80. The principles of such an operation are as follows:

FIG. 35 is a block diagram of a simplified arrangement of the embodiment shown in FIG. 34. Denoted in FIG. 35 at 60-151 is a transfer function of a circuit system for energizing the VCM 60-14 (i.e., a feedback control block 60-40), a transfer function 60-152 of the VCM 60-14 to be controlled, a reference valued of a target track, a head position x, a track eccentricity, and an observed position y. These components are the same as the known art. Denoted at Uff is a feed-forward control output signal which is newly added according to the present invention.

A residual disturbance component d' in FIG. 35 is represented by the following equation:

$$d'=d+G(j\omega)\cdot U\!f\!f.$$

When a tracking control process is effected using the feed-forward data calculated by the above process, the feed-forward control output signal Uff is expressed by:

$$U\!f\!f=-\text{inverse}(G(j\omega))\cdot d$$

where $(G(j\omega))\cdot\text{inverse }(G(j\omega))=1$, and thus d'=0.

In the embodiment shown in FIG. 34, therefore, the effect of track eccentricity can be canceled out, reducing a normal positioning error with respect to the target track center.

According to the present invention, as described above, tracks are formed in advance on a magnetic disk by impression, and wobbled marks, a gray code, and other servo marks, and also clock marks, sector numbers, and track numbers are formed in advance on the magnetic disk by impression. When the magnetic disk with the impressed marks is assembled in a casing (described later), it is unavoidable to introduce an eccentricity of about 50 $\mu$m. For accurately recording and reproducing data, it is preferable to hold a positional error between a track and the magnetic head to about 1 $\mu$m.

For example, a magneto-optical disk of the sampled servo type having a diameter of 130 mm which is defined by ISO-10089(B) has 1367 servo regions per revolution (circumference) of the disk, and a magneto-optical disk of the sampled servo type having a diameter of 90 mm which is defined by ANSI-X3.213-1993 has 1472 servo regions per revolution (circumference) of the disk. When these disks are rotated at 60 Hz, the servo data are sampled at a sampling rate of 80 kHz to 88 kHz, thereby producing a position signal having a band of 40 kHz or less.

Tracking servo control for an optical head used to record data on and reproduce data from a magneto-optical disk is simply carried out by actuating a small objective lens for applying a laser beam to the magneto-optical disk with a voice coil. Consequently, it is possible to provide a tracking servo system having a gain of 1 substantially at 30 kHz as indicated by the broken-line curve in FIG. 36, for example. When the rotational frequency of the disk is 60 Hz, its gain becomes about 500 times. Therefore, even if there is an eccentricity of 50 $\mu$m, a follow-up error can be held to about 0.1 $\mu$m.

In the magnetic disk device to which the present invention is applied, tracking control is carried out by angularly moving an arm which holds a magnetic head and is rotatably supported by a ball bearing. Therefore, the mass of an assembled arm and head to be actuated is much larger than with an optical head, and suffers mechanical resonance at a frequency in the vicinity of 10 kHz.

Figure 36:
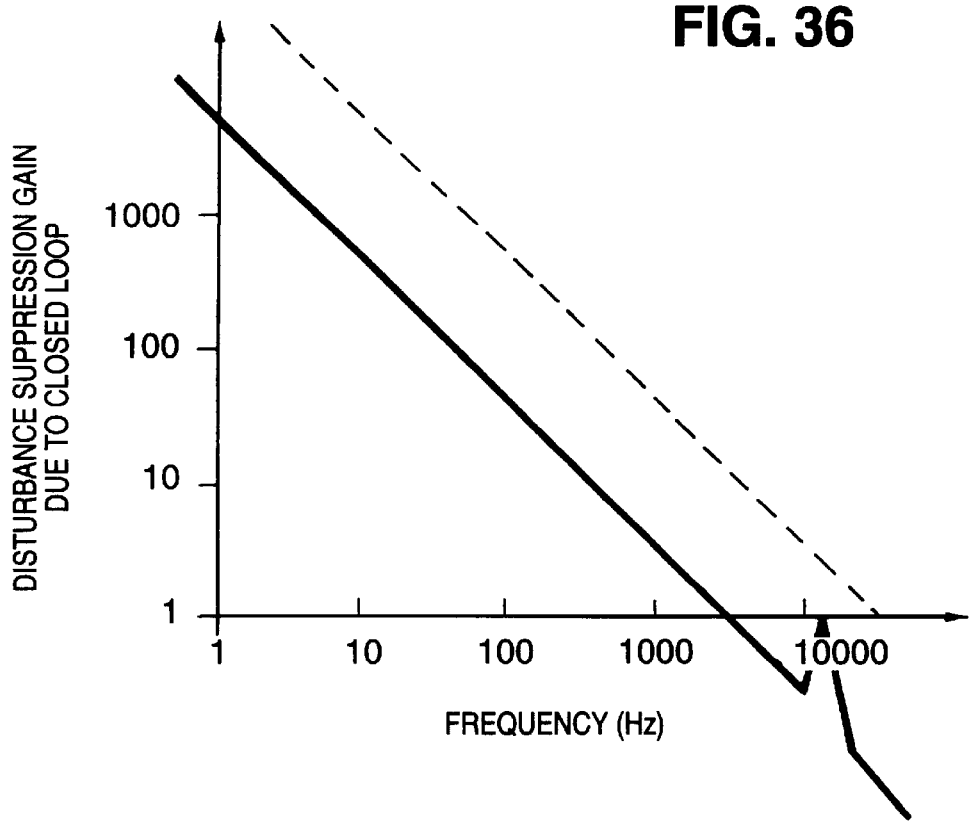
FIG. 36 is a diagram illustrating a disturbance suppression gain of a closed loop in the embodiment shown in FIG. 34.

Therefore, if the gain of the tracking servo system in the magnetic disk device, as indicated by the solid-line curve in FIG. 36, were to be increased as a whole up to the position indicated by the broken-line curve in FIG. 36, then oscillation would take place in the vicinity of the mechanical resonant frequency. For this reason, the gain of the tracking servo system cannot be increased in its entirety.

If the gain of the tracking servo system were increased in its entirety, then since the gain in a high-frequency range would also be increased, the sampling frequency for the servo data would have to be increased according to the Nyquist's theorem. This would mean an increase in the number of servo data per track, and a corresponding reduction in the recording capacity of the disk.

Conversely, if the gain of the tracking servo system were set to the magnitude indicated by the solid-line curve in FIG. 36, since only a gain of about 50 times would be produced at the rotational frequency of 60 Hz, the error of 50 $\mu$m would be reduced to only at most about 1 $\mu$m.

Figure 37:
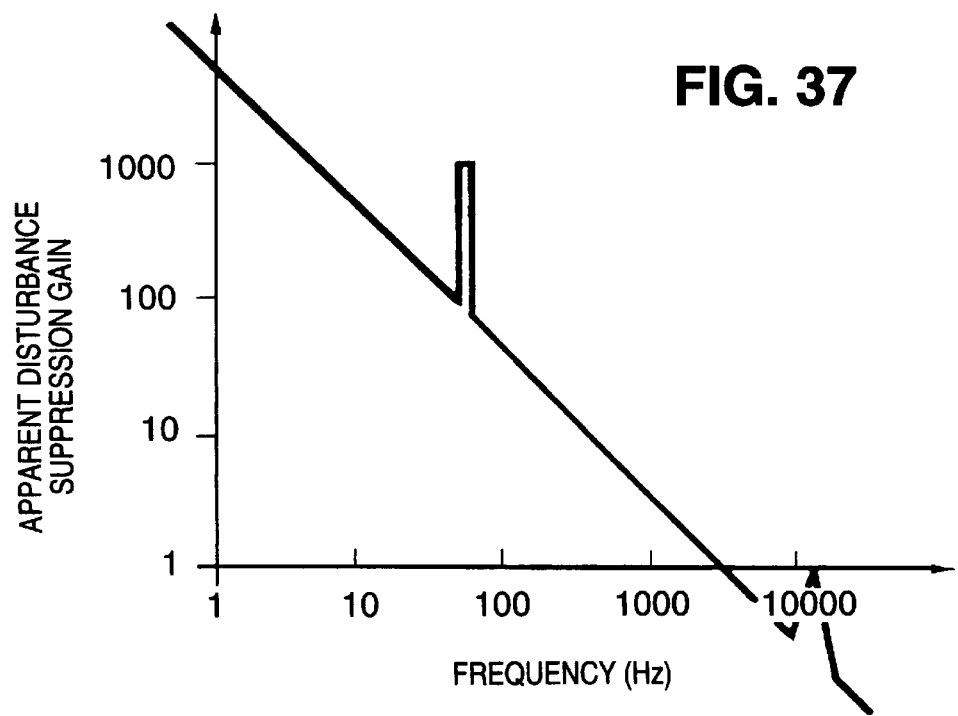
FIG. 37 is a diagram illustrating an apparent disturbance suppression gain in the embodiment shown in FIG. 34.

According to the present embodiment, however, a feed-forward signal is added to a normal tracking error signal at the rotational frequency of 60 Hz as described above. As a result, the apparent gain of the tracking servo system is locally increased at the frequency of 60 Hz as shown in FIG. 37. Because a gain of about 10 times can be obtained by the feed-forward signal, the residual error of 1 $\mu$m due to the closed loop can be reduced to 0.1 $\mu$m. Therefore, at least at the frequency of 60 Hz, it is possible to achieve a gain of 500 times, and the error of 50 $\mu$m can be reduced to 0.1 $\mu$m.

By increasing the gain only in the vicinity of the rotational frequency rather than increasing the gain as a whole, the frequency at which the gain becomes 1 can be reduced by about one figure as compared with increasing the gain as a whole. Specifically, the frequency is 30 kHz in the case of the broken-line curve shown in FIG. 36, but the frequency is 3 kHz in the case of the solid-line curve shown in FIG. 37.

The sampling frequency required to reproduce positional information up to 3 kHz is at least 6 kHz according to the Nyquist's theorem. However, since this Nyquist's frequency is a frequency beyond which the information would be lost, a sampling frequency which is 5 through 10 times the above sampling frequency is required from a practical viewpoint. Therefore, the practical sampling frequency is 6 kHz×10÷60 Hz=1000 (regions/circumference), and hence 1000 servo data regions may be sufficient per circumference. An experiment indicated that good positioning characteristics would be obtained even when the number of servo data regions per circumference was 840 or 420.

The aspect of detecting an off-track condition with respect to the tracking servo unit 10-7 shown in FIG. 1 will be described below.

Figure 38:
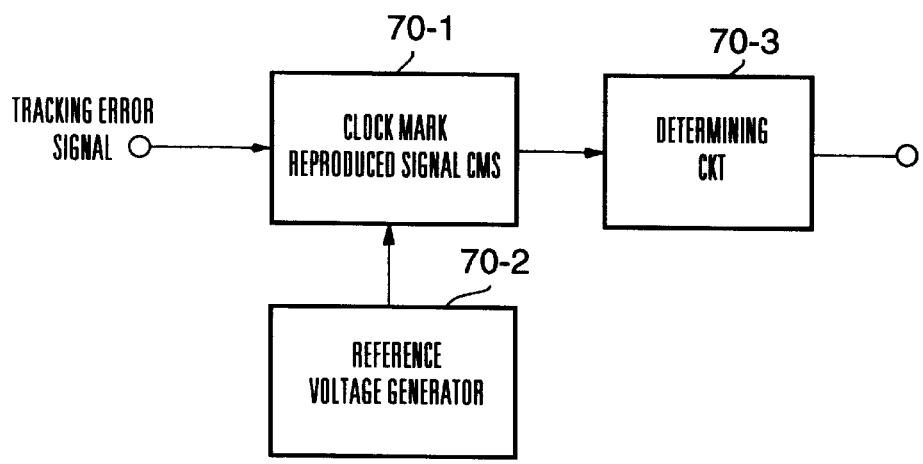
FIG. 38 is a block diagram of a circuit for determining an off-track condition according to the present invention.

FIG. 38 shows an embodiment of a detector for detecting an off-track condition. A window comparator 70-1 is supplied with a tracking error signal outputted from the track position error detector 50-23 shown in FIG. 21, for example. The window comparator 70-1 is also supplied with a reference voltage outputted from a reference voltage generator 70-2. The reference voltage includes a reference voltage as an upper threshold of a window and a reference voltage as a lower threshold of the window.

The window comparator 70-1 compares the tracking error signal with the two thresholds, and outputs a detected signal to a determining circuit 70-3 if the level of the tracking error signal is higher than the upper threshold or lower than the lower threshold. The determining circuit 70-3 determines whether a recording operation is to be interrupted or not based on the inputted signal, and outputs the result of determination to the recorder 10-9 shown in FIG. 1. The recorder 10-9 interrupts the recording operation when supplied with the signal from the determining circuit.

Figure 39:
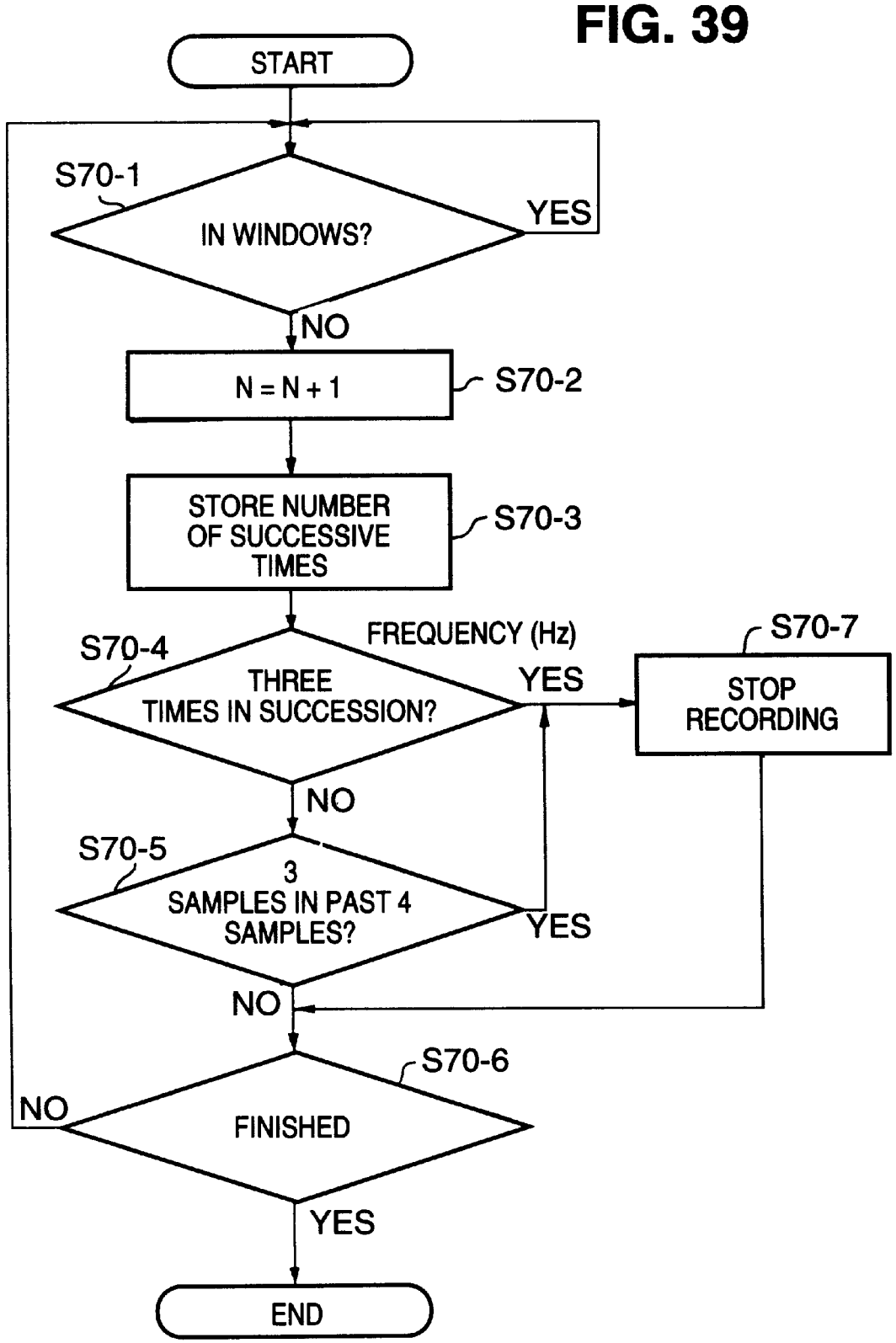
FIG. 39 is a flowchart of an operation sequence of the embodiment shown in FIG. 38.

A detailed determining process of the window comparator 70-1 and the determining circuit 70-3 will be described below with reference to a flowchart shown in FIG. 39.

First, the window comparator 70-1 determines in a step S70-1 whether the tracking error signal exists in a window or not. If the tracking error signal exceeds the range of the window, then a variable N is set to the number of times that the level of the tracking error exceeds the window range in a step S70-2. Therefore, the variable N represents the number of times that the level of the tracking error exceeds the window range.

Then, control proceeds to a step S70-3 in which the number of successive times that the level of the tracking error exceeds the window range is stored. Specifically, the tracking error signal is sampled each time a wobbled mark arrives (at the segment period), and when the tracking error signal exceeds the window ranges in successive segments, the number of times that it exceeds the window range is stored. Then, a step S70-4 determines whether or not the stored number of successive times is 3 or more. If not 3 in succession, control goes to a step S70-5 which determines whether the tracking error signal has exceeded the window range in three out of the four samplings in the past. If NO in the step S70-5, then control goes to a step S70-6. If an end is not instructed, then control returns to the step S70-1, and the above process is repeated.

If the stored number of successive times is 3 or more in the step S70-4, or if the tracking error signal has exceeded the window range in three out of the four samplings in the past in the step S70-5, then control goes to a step S70-7 in which a pulse is outputted to stop the recording operation. The pulse is supplied to the recorder 10-9 shown in FIG. 1, and the recorder 10-9 stops the recording operation at the time it is supplied with the pulse. After the step S70-7, the step S70-6 is carried out.

Since the magnetic disk of this embodiment has servo data recording regions to produce positional data at a high frequency of 25 kHz, the recording operation is stopped only when the positional data outside of the detecting window are produced at a predetermined frequency or higher.

It would theoretically be possible to stop the recording operation immediately when the tracking error signal exceeds the window range only once. In this case, if the window range were reduced, the magnetic head would be prevented from moving to an adjacent track and from recording data in the adjacent track upon application of a large shock to the magnetic disk device. If, however, the window range were reduced excessively, the recording operation would be stopped immediately even when small noise would be produced, resulting in a reduction in the throughput. If the window range were increased excessively, then when inverse noise is produced causing the magnetic head to move to an adjacent track, such a condition would not be detected, and data would be recorded in error on the adjacent track.

Therefore, as described above, it is preferable to stop the recording operation when an off-track condition is detected at a certain frequency.

The window has equal positive and negative widths from a reference position as a center. If each width (½ width of the window) from the reference position of the window is 0.75 $\mu$m (which can correspond to the level of the tracking error and a relative positional deviation of the magnetic head from the reference position of a track), then an error detection probability at the time a shock of 10 G, for example, is applied may be held to $10^{-3}$ or less. The probability that the recording operation can be stopped while an off-track quantity is 0.95 $\mu$m or less at the time a shock of 100 G is applied can be 95% or higher.

The reasons for the above probability will be described below.

It is assumed that any unbalanced condition between opposite sides of the center of rotation of the arm on which the magnetic head is mounted is 0.1 gcm or less, the sampling frequency for wobbled marks is 25 kHz, and the S/N ratio of the positional signal is 31 dB (if the track width is 5 μm and a noise-induced deviation is 0.07 μm, then their ratio is 31 dB).

Figure 40A:
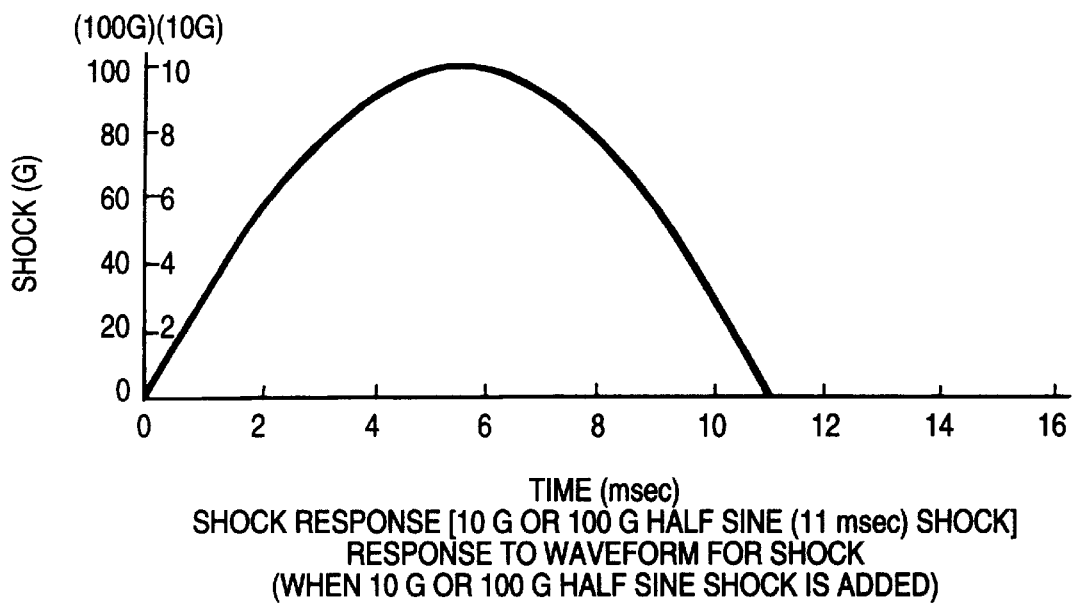
FIGS. 40A and 40B are diagrams showing response waveforms produced when a shock or 10 G or 100 G is applied.
Figure 40B:
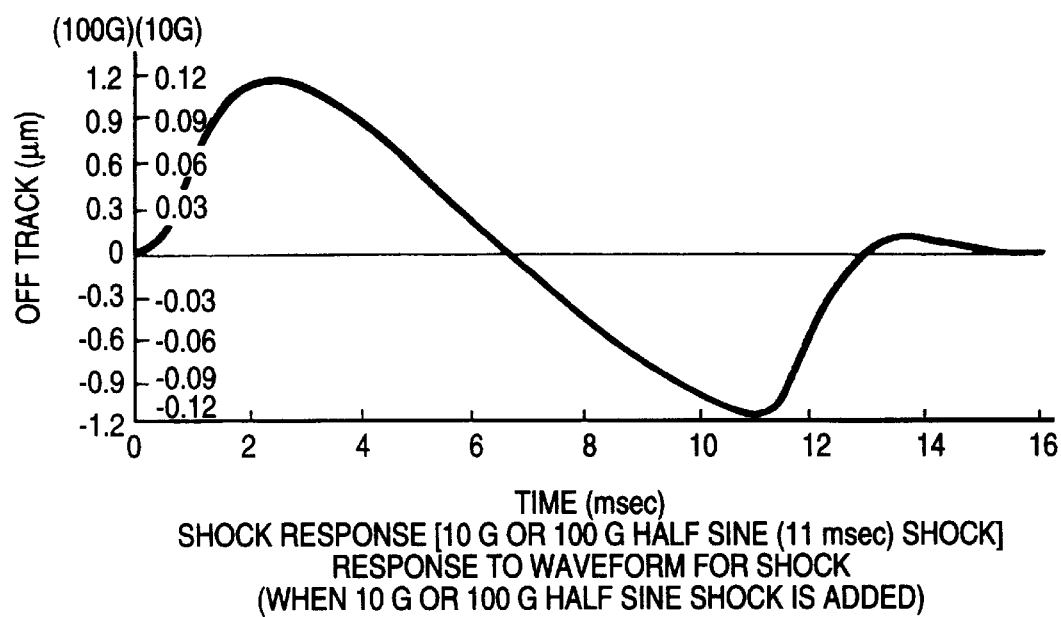

It is also assumed that the arm has an inertia of $1.06 \times 10^3$ gmm$^2$ and a length r of 36 mm. FIGS. 40A and 40B show the results of a simulation at the time a shock of 10 G is applied while the unbalanced condition of the arm is 0.1 gcm (FIGS. 40A and 40B illustrate conditions when shocks of 10 G and 100 G are applied). As can be seen from FIGS. 40A and 40B, an off-track condition of 0.12 μm to one side (to the left or right) is produced. It is assumed that an error can be detected in an interval in which the off-track condition is 0.1 μm or greater, the interval having a time period of about 1.8 ms (45 samples).

A maximum off-track condition caused when the shock of 10 G is applied is 0.6 μm. The probability of an error detection is calculated on the assumption that an off-track condition of 0.6 μm is produced during a period of 1.8 ms (45 samples). When the S/N ratio of the positional signal is 31 dB, the probability that the arm is observed as being displaced 0.15 μm or more to one side from an actual position is $1.62 \times 10^{-2}$. Therefore, the probability that three or more out of successive four samples are detected in error as being outside of the window (within 0.75 μm) while under an off-track condition of 0.6 μm is $1.68 \times 10^{-5}$. Since the probability that three or more out of successive four samples in this interval (45 samples) is about 40 times the above probability, i.e., about $7 \times 10^{-4}$, the probability of an error detection is $10^{-3}$ or less.

If the arm has an unbalanced condition of 0.1 gcm, then when a shock of 10 G is applied thereto as shown in FIG. 40A, the arm is subjected to an off-track condition caused after the application of the shock as shown in FIG. 40B. As shown in FIG. 40B, an off-track condition of ±1.2 μm occurs in excess of the window range (±0.76 μm), and it can be seen that it is necessary to stop the recording operation.

Figure 41:
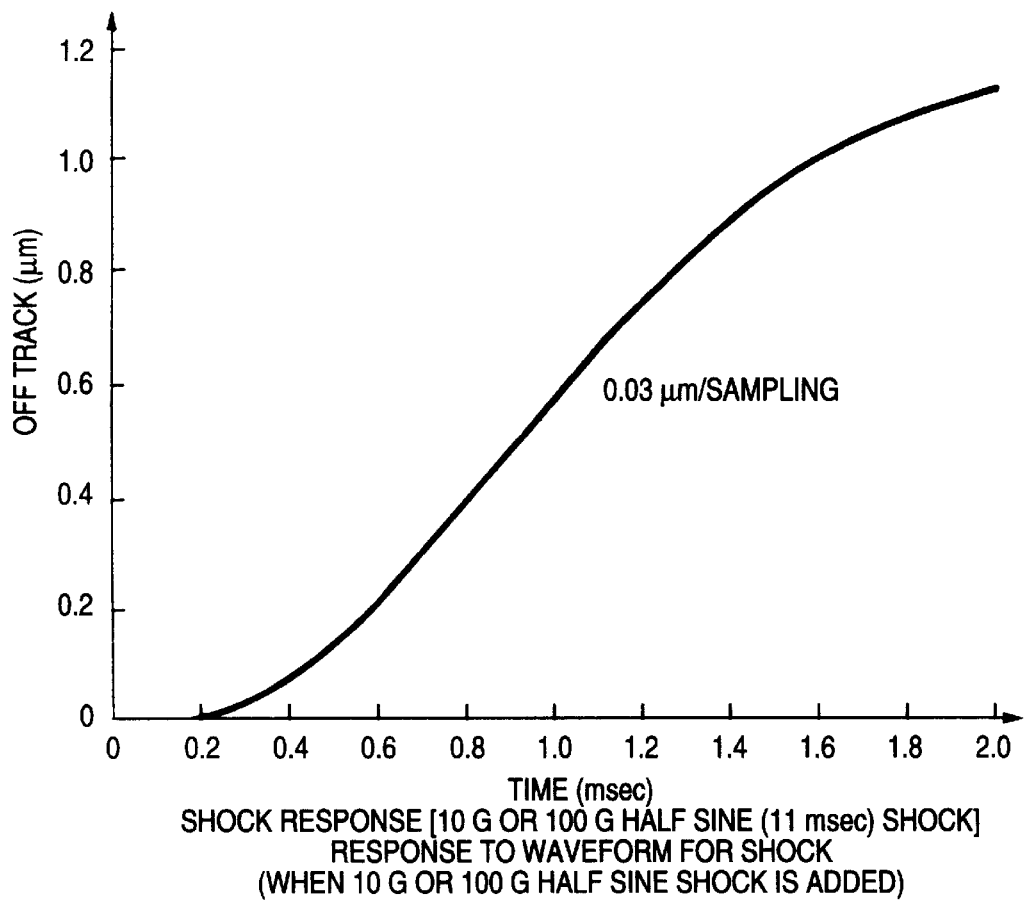
FIG. 41 is a diagram showing a response waveform produced immediately after a shock of 100 G is applied.

FIG. 41 shows on an enlarged scale a response immediately after a shock has been applied. It can be understood from FIG. 41 that in an interval in which an off-track condition ranges from 0.7 μm to 0.9 μm, the magnetic head moves at a speed of about 0.03 μm/sampling. Actually, since the path and speed of movement of the head vary due to noise, it is assumed that the head moves at a speed of 0.04 μm/sampling in the worst case.

Figure 42:
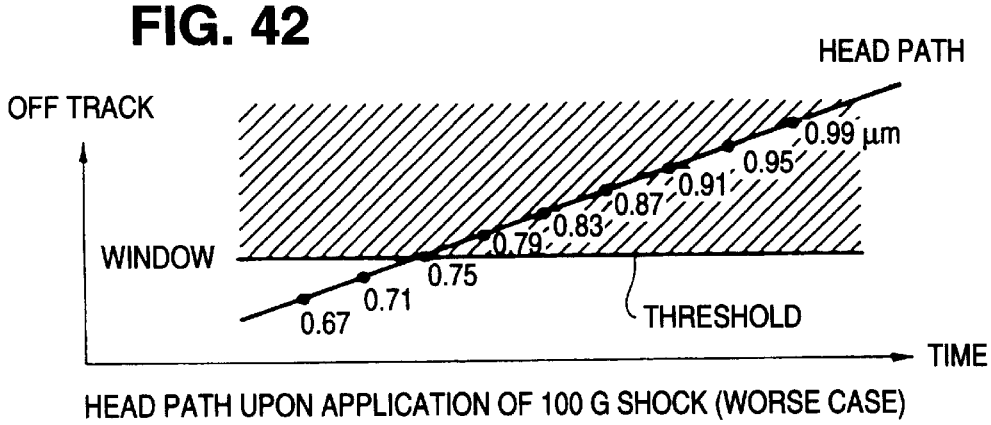
FIG. 42 is a diagram showing the path of movement of a head at the time a shock of 100 G is applied.

FIG. 42 shows the manner in which the magnetic head is shifted off track when a shock of 100 G is applied. While it has been described that an off-track condition of 0.95 μm may be detected, it is preferable to detect an off-track condition of 0.91 μm in FIG. 42 in view of a deviation (at most 1 sample) of the position detecting timing. Assuming that noise has a normal distribution of σ=0.07 μm, when the magnetic head moves along a path shown in FIG. 42, the probability that three or more out of four successive samples fall outside of the window (within ±0.75 μm) up to the off-track condition of 0.91 μm is 95.1%.

It follows from the above analysis that even when the magnetic head moves along a path other than the path shown in FIG. 42 (even when the position detection timing is incorrect), an off-track condition of 0.95 μm or smaller can be detected with a probability of 95% or higher.

Since the detection ratio up to the off-track condition of 0.95 μm shown in FIG. 42 is 99.7%, the detection of an off-track condition can be expected within 0.99 μm in the worst case.

Figure 43:
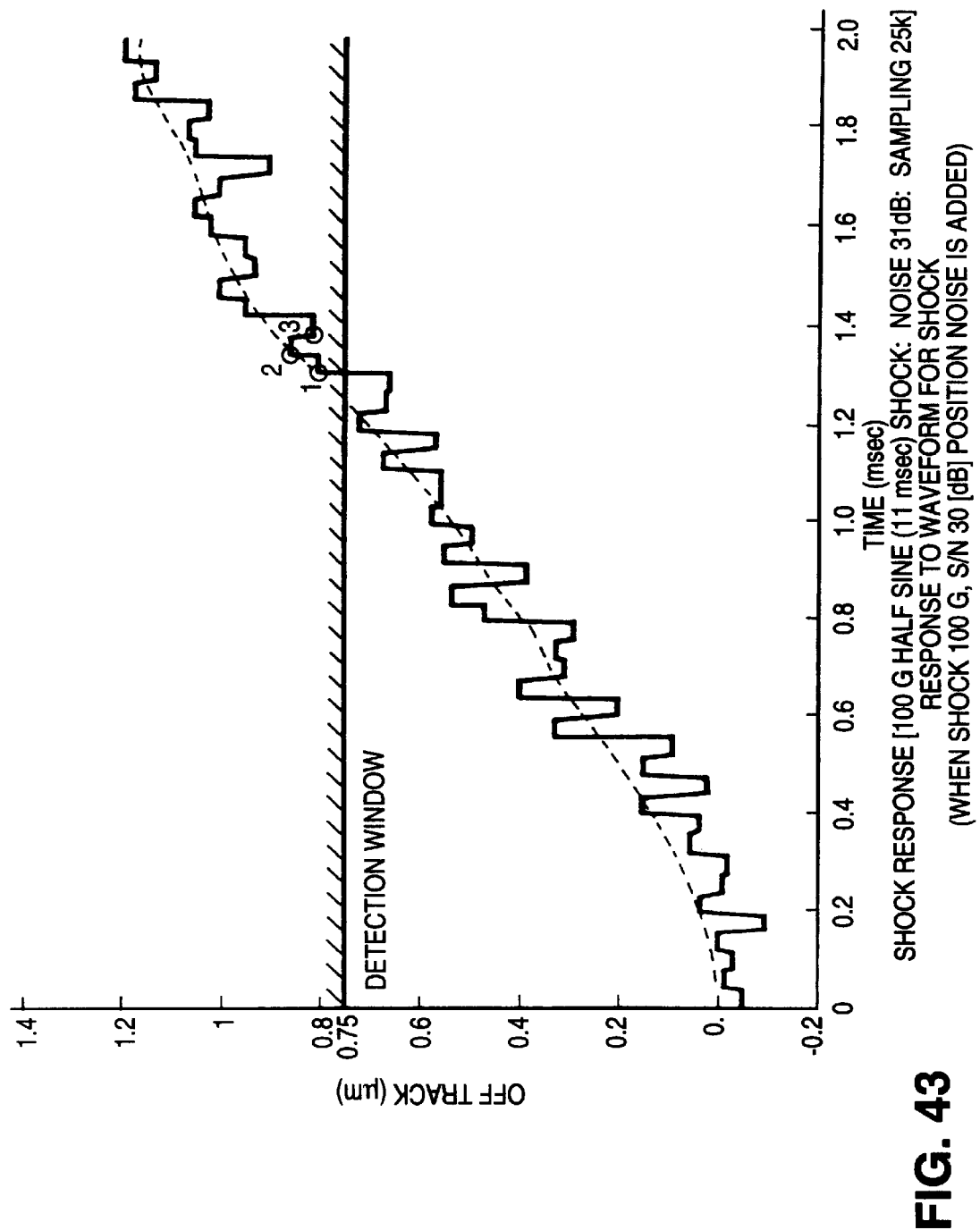
FIG. 43 is a diagram showing a response waveform produced when a shock of 100 G and noise are applied.

FIG. 43 shows a response to a shock of 100 G in a simulation in which the S/N ratio is 31 dB and noise is added. In FIG. 43, the broken-line curve represents an off-track quantity, and the solid-line curve represents an observed position. After the off-track quantity exceeds a window threshold of 0.75 μm and becomes 0.9 μm at the fourth sample, an off-track deviation is detected, and a recording operation can be stopped at the time the off-track quantity becomes 0.95 μm or less.

By thus detecting a shock from the tracking error signal, it is possible to detect a shock and stop a recording operation much faster than by providing a piezoelectric element or the like in the magnetic disk device for detecting shocks.

The aspect of the reproducer 10-8 shown in FIG. 1 will be described below.

A three-value level detecting process using three thresholds, −2, 0, +2, for example, may be relied on to decode data reproduced from a magnetic disk on which data and various marks are recorded. Such a process is advantageous in that a circuit arrangement required is simple, but disadvantageous in that the detecting capability is relatively low.

In view of its drawbacks, such a decoding process, though applicable to decode data in data regions, is not suitable for regions such as an ID region of a sector (the gray code 20-72, the sector number 20-41a, and the track numbers 20-41b1, 20-41b2) where after an ID has been decoded, it is to be quickly determined whether data are to be read from or written in the sector.

There has been known a Wood's algorithm as a process for recording data on and reproducing data from a magnetic disk using a partial response process, as described in "Viterbi Detection of Class IV Partial Response on a Magnetic Recording Channel", IEEE TRANSACTIONS ON COMMUNICATIONS, VOL. COM-34, NO. 5, MAY 1986, for example.

According to the Wood's algorithm described in the above literature, a Viterbi algorithm is simplified in accord with a pair of partial responses (1, −1) equivalent to a partial response class IV (partial responses (1, 0, −1)), and decoded data of an improved error ratio can be obtained by determining whether a survival path pattern is any one of three patterns as shown in FIGS. 44A, 44B, 44C:

status <−1> →status <−1> and status <−1> →status <+1> (FIG. 44A);

status <−1> →status <−1> and status <+1> →status <+1> (FIG. 44B); and status <+1> →status <+1> and status <+1> →status <−1> (FIG. 44C).

The three survival path patterns are represented by three two-character symbols: →↑ (upward divergence), →→ (parallel), and ←↓ (downward divergence).

According to the Wood's algorithm, when an upward divergence →↑ or a downward divergence ←↓ appears as a survival path pattern, a path from a location k where it appears to a location p which precedes the location k and in which a divergence has appeared can be determined, and data can be decoded by repeating such a process.

Figure 45:
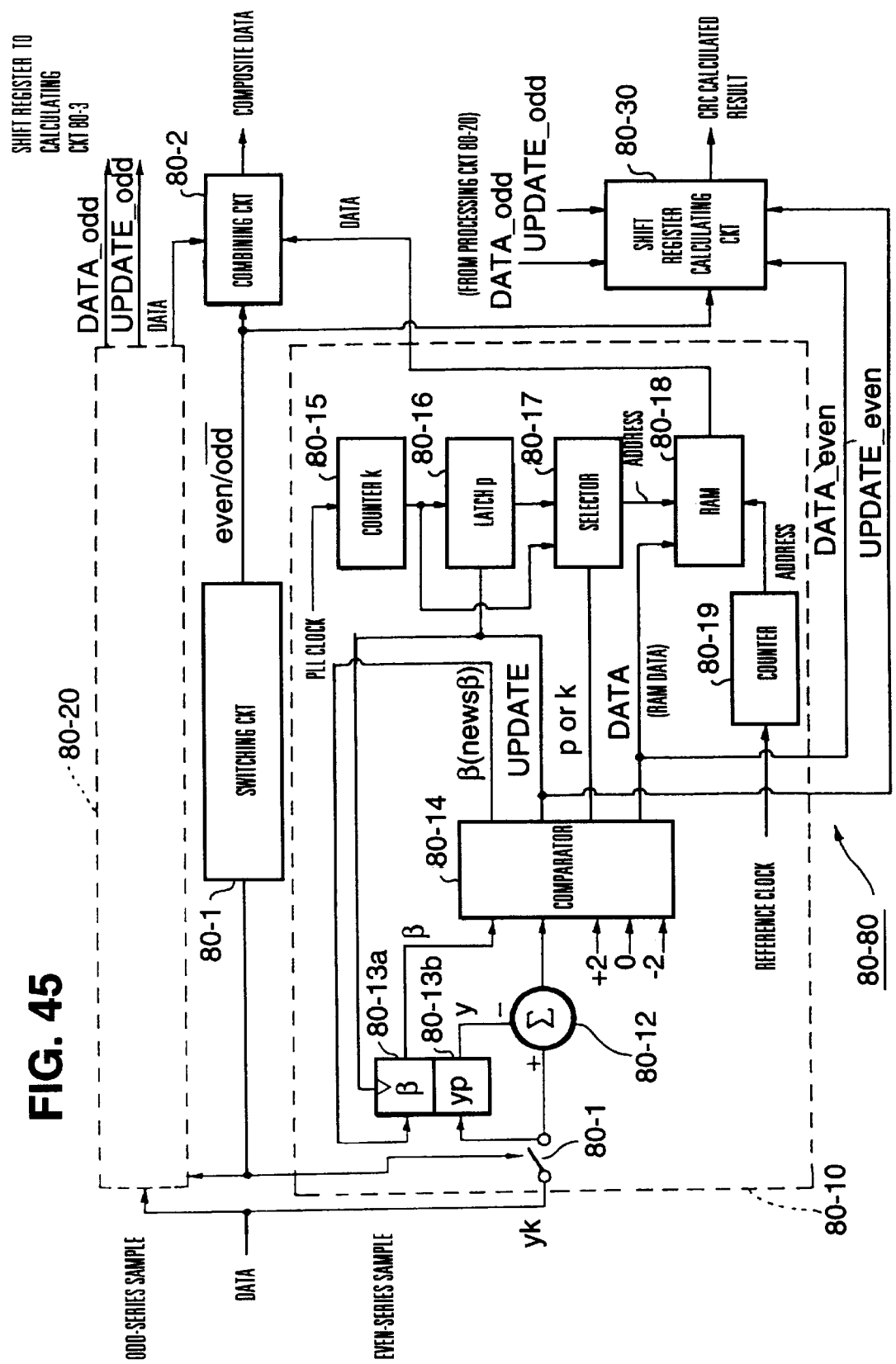
FIG. 45 is a block diagram of a Viterbi decoding circuit.

FIG. 45 shows an arrangement of a reproducing circuit 80-80 for decoding data from a magnetic disk (having a format shown in FIG. 2) using the Wood's algorithm, and detecting an error of the decoded data.

Data from the magnetic disk are inputted to a processor 80-10 or 80-20 in which even-series samples or odd-series samples are individually processed. Thereafter, the data are decoded into an original sequence by a combining circuit 80-2 based on the timing of a switching signal outputted from a switching circuit 80-1, and outputted.

In FIG. 45, the processor 80-10 for processing an even series of samples is shown in detail. The processor 80-20 for processing an odd series of samples is of the same arrangement.

In the processor 80-10, data from the magnetic disk are supplied to a subtractor 80-12 and a register 80-13b through a switch 80-11 which is turned on and off at the timing of even-series samples/odd-series samples by a switching signal (even/odd$^{-1}$ (indicated by odd with an overbar in FIG. 45)) outputted from a switching circuit 80-1. The subtractor 80-12 and the register 80-13b are supplied with even-series samples of data from the magnetic disk.

The register 80-13b stores a sample value yp in a preceding divergence location, and the subtractor 80-12 subtracts the value yp stored in the register 80-13b from the supplied even-series samples (even-series samples of data from the magnetic disk 10-2), i.e., calculates (yk−yp), and outputs the result to a comparator 80-14.

The comparator 80-14 effects calculations as shown in Tables 2 and 3 on thresholds +2, 0, −2, the output signal (yk−yp) from the subtractor 80-12, and β stored in a register 80-13a, and outputs output data shown in Tables 2 and 3 based on the calculated result. Details of such calculations will be described in detail later on with reference to FIG. 46.

As shown in FIG. 65 or 66, D outputted from the comparator 80-14 takes a value of +1 or −1. If a preceding divergence is an upward divergence (→↑), then β is set to 1, and if a preceding divergence is a downward divergence (←↓), then β is set to (−1). Therefore, β is indicative of the type of a preceding divergence (whether a preceding divergence is an upward or downward divergence).

A register 80-15 counts a PLL clock outputted from a PLL (not shown), and stores a count k (a sampling time). A register 80-16 stores the count k from the register 80-15 as a value p (a time at which a preceding divergence has occurred) according to an updating command (UPDATE) outputted from the comparator 80-14. A selector 80-17 selects the value p stored in the register 80-16 or the value k stored in the register 80-15 depending on a selection command (p or k) outputted from the comparator 80-14.

A RAM 80-18 writes output data (DATA) from the comparator 80-14 in a memory cell with the output signal (p or k) from the selector 80-17 being used as a write address. A counter 80-19 counts up data written in the RAM 80-18 based on a reference clock outputted from a circuit (not shown). When the writing of data in all memory cells is completed, the RAM 80-18 delivers the data in all memory cells to the combining circuit 80-2 based on the count of the counter 80-19. The combining circuit 80-2 returns the even-series samples from the processor 80-10 and the odd-series samples from the processor 80-20 back to their original sequence, and outputs them based on the switching signal (even/odd$^{-1}$) from the switching circuit 80-1.

With the arrangement shown in FIG. 45, no squaring unit is required and one adder and two comparators are sufficient for Viterbi decoding of data. However, the RAM 80-18 is needed for storing paths.

A shift register calculating circuit 80-3 effects Viterbi decoding based on the Wood's algorithm and at the same time carries out CRC calculations, using the switching signal (even/odd$^{-1}$) from the switching circuit 80-1, the updating command (UPDATE) and the output data (DATA) from the processor 80-10, and the updating command (UPDATE) and the output data (DATA) from the processor 80-20.

An operation of the circuit shown in FIG. 45 in response to a certain signal inputted thereto will be described below with reference to a timing chart shown in FIG. 46.

Figure 46:
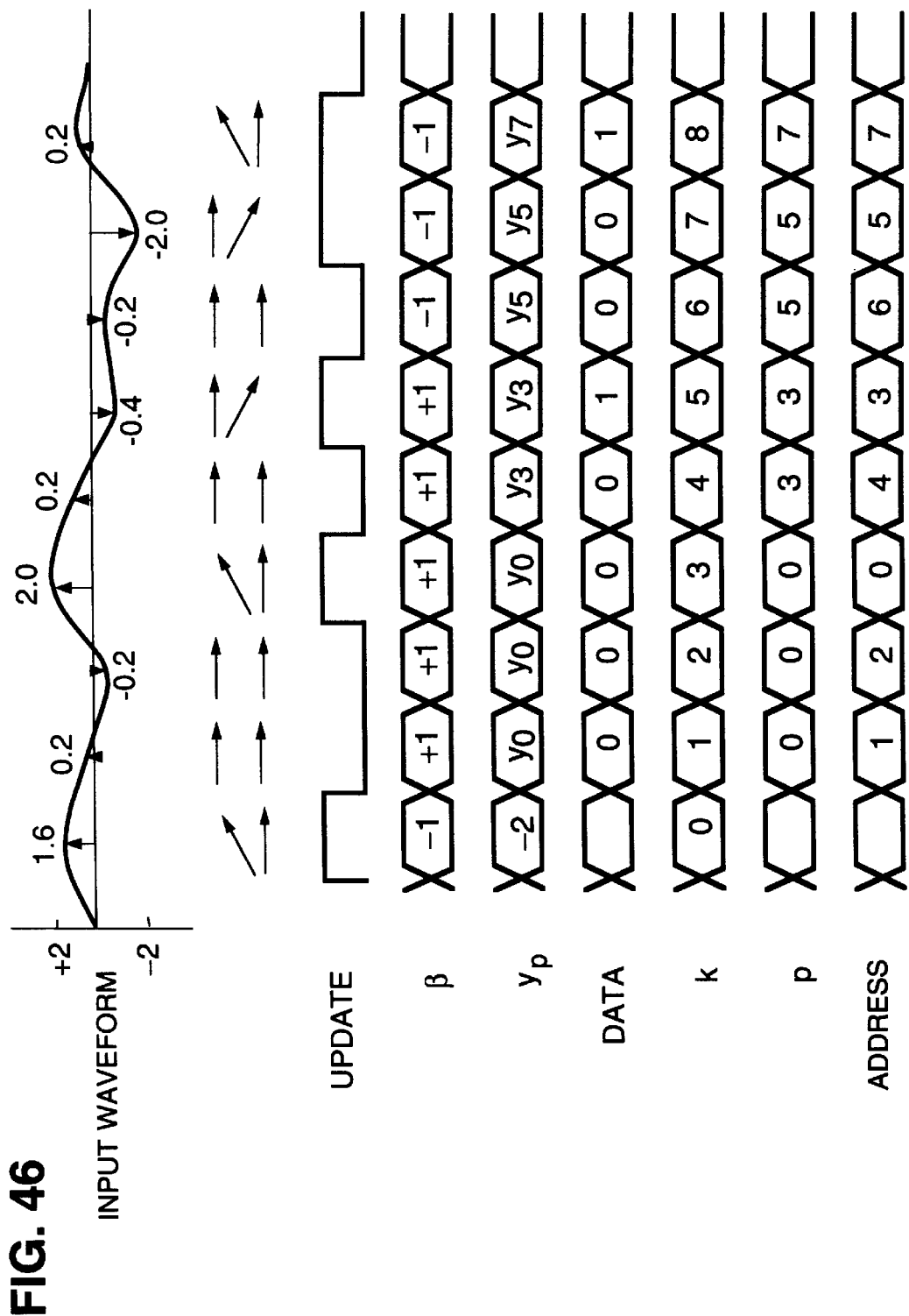
FIG. 46 is a timing chart illustrative of operation of the embodiment shown in FIG. 45.

When a signal (input waveform) shown in FIG. 46 is inputted to the reproducer 80-80 shown in FIG. 45, the comparator 80-14 operates as shown in FIGS. 65 and 66. It is assumed that yp and β have initial values: yp=−2, β=−1.
<When k=0: input yk=y0=1.6; yp=−2; β=−1>

Since yk−yp=1.6−(−2)=3.6 >2, the input corresponds to a condition pattern F shown in FIG. 66. Because it is an upward divergence, β of the register 80-13a is updated to +1 according to the table shown in FIG. 66, p (a time at which a preceding divergence has occurred) is updated to p=k=0 with the register 80-16, and yp (sample value at the time at which a preceding divergence has occurred) is set to yp=y0=1.6 with the register 80-13b. <When k=1: input yk=y1=0.2; yp=1.6; β=+1; p=0>

Since −2<yk−yp=0.2−1.6=−1.4≦0, the input corresponds to a condition pattern B shown in FIG. 65. Because it is a parallel path, β of the register 80-13a and yb of the register 80-13b remain as they are, the value k (=1) stored in the register 80-15 is selected by the selector 80-17, and data (RAM data) 0 are written at an address k (=1) in the RAM 80-18 (the logic of data at k=1 is set to 0 and the data decoded).
<When k=2: input yk=y2=−0.2; yp=1.6; β=+1; p=0>

Since −2<yk−yp=−0.2−1.6=−1.8≦0, the input corresponds to a condition pattern B shown in FIG. 65. Because it is a parallel path, β of the register 80-13a and yp of the register 80-13b remain as they are, the value k (=2) stored in the register 80-15 is selected by the selector 80-17, and data 0 are written at an address k (=2) in the RAM 80-18 (the logic of data at k=2 is set to 0 and the data decoded).
<When k=3: input yk=y3=2.0; yp=1.6; β=+1; p=0>

Since yk−yp=2.0−1.6=0.4>0, the input corresponds to a condition pattern C shown in FIG. 65. Because it is an upward divergence, the preceding candidate yp is defeated by the present value yk (yp<yk). Though it is determined as an upward divergence (β=+1) at k=0 (p=0), since an upward divergence (β=+1) occurs at present (k=3), the preceding divergence was a parallel path of an upward divergence (if an upward transition occurred at k=0, then a path would be discrete at k=3).

The value p (=0) of the register 80-16 is selected by the selector 80-17, and data 0 are written at an address p (=0) in the RAM 80-18 (the logic of data at k=0 is set to 0 and the data decoded). β in the register 80-13a is set to +1, the stored value p of the register 80-16 is updated with the stored value k of the register 80-15 so as to be p=k=3, and the stored value yp of the register 80-13b is set to yp=y3=2.0.
<When k=4: input yk=y4=0.2; yp=2.0; β=+1; p=3>

Since −2<yk−yp=0.2−2.0=−1.8≦0, the input corresponds to a condition pattern B shown in FIG. 65. Because it is a parallel path, β and yp remain as they are, k (=4) is selected, and data 0 are written at an address k (=4) in the RAM 80-18 (the logic of data at k=4 is set to 0 and the data decoded).
<When k=5: input yk=y5=−0.4; yp=2.0; β=+1; p=3>

Since yk−yp=−0.4−2.0=−2.4≦−2, the input corresponds to a condition pattern A shown in FIG. 65. Because it is a downward divergence, the preceding candidate is correct (an upward transition occurred of an upward divergence at k=3 (p=3)). Therefore, data 1 are written at an address p (=3) in the RAM 80-18 (the logic of data at k=3 is set to 1 and the data decoded). β is set to −1, p is updated to p=k=5, and yp is set to yp=y5=−0.4.
<When k=6: input yk=y6=−0.2; yp=−0.4; β=−1; p=5>

Since 0<yk−yp=−0.2−(−0.4)=0.2≦+2, the input corresponds to a condition pattern E shown in FIG. 66. Because it is a parallel path, β and yp remain as they are, k is selected, and data 0 are written at an address k (=6) in the RAM 80-18 (the logic of data at k=6 is set to 0 and the data decoded).
<When k=7: input yk=y7=−2.0; yp=−0.4; β=−1; p=5>

Since yk−yp=−2.0−(−0.4)=−1.6≦0, the input corresponds to a condition pattern D shown in FIG. 66. Because it is a downward divergence, the preceding candidate is defeated. As a parallel transition, rather than a downward transition, occurred at k=5 (p=5), data 0 are written at an address p (=5) in the RAM 80-18 (the logic of data at k=5 is set to 0 and the data decoded). β is set to −1, p is updated to p=k=7, and yp is set to yp=y7=−2.0.

<When k=8: input yk=y8=0.2; yp=−2.0; β=−1; p=7>

Since yk−yp=0.2−(−2.0)=2.2>+2, the input corresponds to a condition pattern F shown in FIG. 66. Because it is an upward divergence, the preceding data are correct. Therefore, as a downward transition occurred at k=7 (p=7), data 1 are written at an address p (=7) in the RAM 80-18 (the logic of data at k=7 is set to 1 and the data decoded). β is set to +1, and yp is set to yp=y8=0.2 (FIG. 46).

Data are subsequently decoded based on the Wood's algorithm in the same manner as described above, and the decoded data are successively written in the RAM 80-18.

Figure 47:
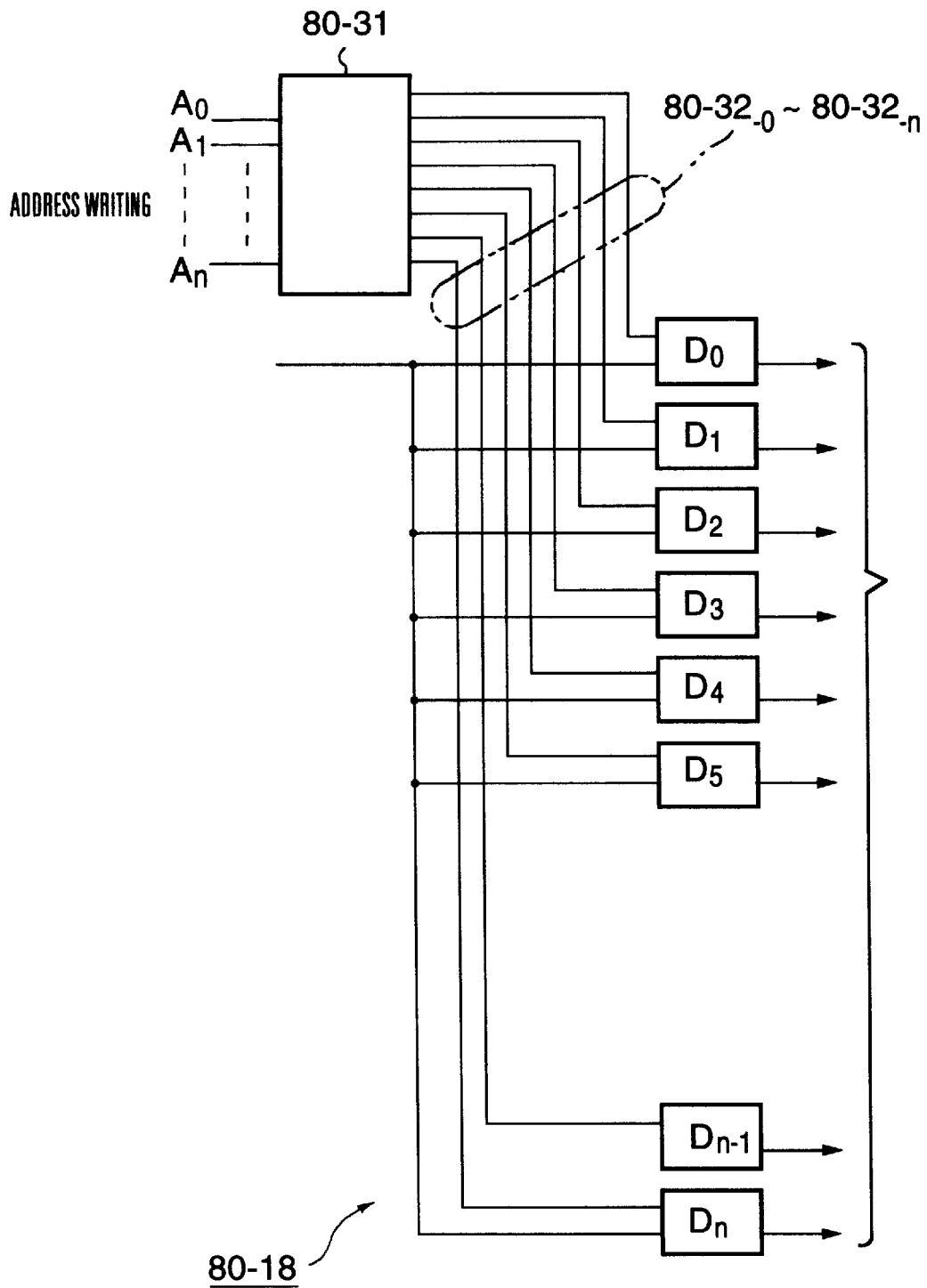
FIG. 47 is a block diagram of a RAM 80-18 shown in FIG. 45.

As shown in FIG. 47, the RAM 80-18 comprises, for example, a plurality of memory cells $D_0$ through $D_n$ each having a 1-bit capacity, an address decoder 80-31, and a plurality of write control lines $80\text{-}32_{-0}$ through $80\text{-}32_{-n}$ connected respectively to the memory cells $D_0$ through $D_n$. All of the memory cells $D_0$ through $D_n$ are supplied with data (DATA) from the comparator 80-14 shown in FIG. 45.

The address decoder 80-31 is supplied with write addresses $A_0$ through $A_n$ from the selector 80-17 shown in FIG. 45, decodes the write addresses $A_0$ through $A_n$, and supplies 1-bit signals as write signals to memory cells $D_0$ through $D_n$ for thereby writing the data (DATA) from the comparator 80-14 in prescribed memory cells.

After the writing of data in all the memory cells $D_0$ through $D_n$ is completed, the data stored in all the memory cells $D_0$ through $D_n$ are simultaneously outputted to the combining circuit 80-2. Therefore, all the data are read out at this time.

Figure 48A:
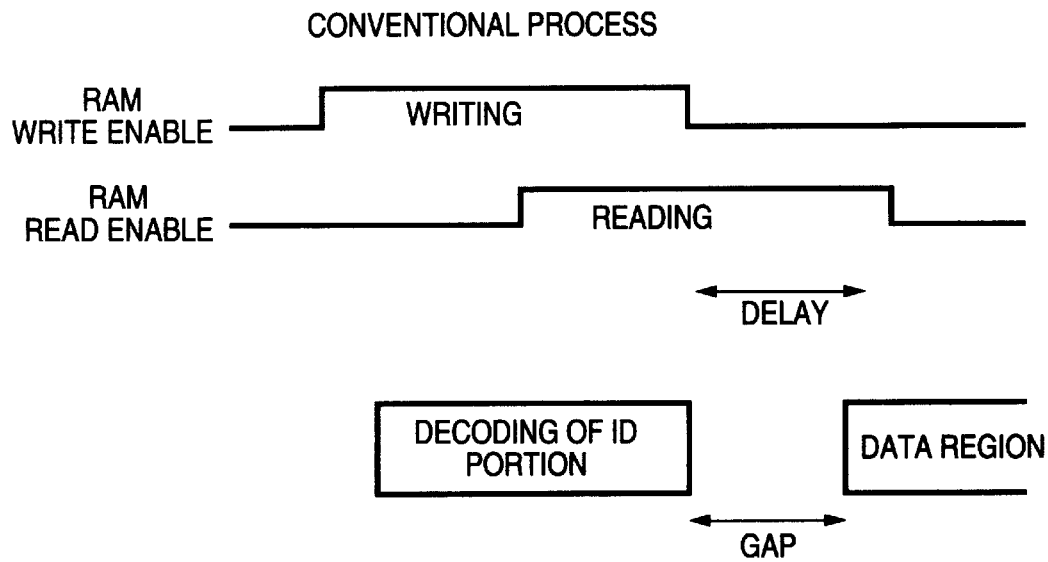
FIGS. 48A and 48B are timing charts illustrative of operation of the embodiment shown in FIG. 47.
Figure 48B:
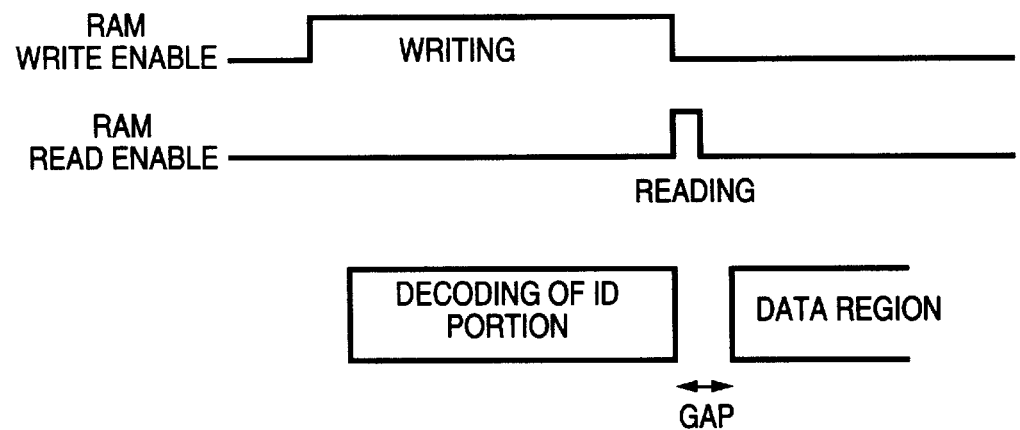

The data reading timing is compared with the conventional process (e.g., the process described in the above literature of Wood). Timing charts of the data reading processes are shown in FIGS. 48A and 48B. FIG. 48B is a timing chart of the data reading process carried out by the reproducer 80-80. When a write enable signal for writing data in the RAM 80-18 becomes active, the ID portion is decoded. When the writing of all the data is finished, a read enable signal for reading data from the RAM 80-18 becomes active, and the sequence enters a data region for simultaneously reading all the data.

Comparison with the conventional process shown in FIG. 48A indicates that a delay time after the writing of data is finished and until the reading of data from the RAM 80-18 is finished is greatly reduced. Each of the memory cells $D_0$ through $D_n$ can easily be implemented by a 1-bit flip-flop, for example, with a write control signal inputted in synchronism with a clock.

If the reproducer 80-80 is used for reproducing data from the ID recording region 20-41H, for example, then since it is possible to determine quickly whether a sector number and a track number are desired numbers or not, data can be processed without providing any essential accessing gap between ID and data portions.

Inasmuch as each of sector numbers and track numbers, for example, are composed of at most several bytes, all the bits may be outputted at once, which may amount to several tens bits. Consequently, the above arrangement is sufficiently practical.

All the bits may not be read from the RAM 80-18 at once, but lumps of 8 bits, for example, may be read. With such a modification, the time required after the data have started to be read from the RAM 80-18 and until they have fully been read from the RAM 80-18 can be reduced to ⅛. This process offers the same advantages as those of the above process.

To sector numbers and track numbers, there are normally added an error detecting code such as a CRC (Cyclic Redundancy Check) code, for example.

If a generator polynomial G(x) which is expressed by:

$$G(x)=x^{16}+x^{12}+x^5+1 \qquad (80\text{-}1)$$

is used for a CRC code, then data per bit length BL are divided by the generator polynomial $G(x)=x^{16}+x^{12}+x^5+1$, and the remainder is added to the end of the data (e.g., sector ID).

In the shift register calculating circuit 80-3 of the reproducer 80-80 shown in FIG. 45, the data are decoded (Viterbi decoding) and CRC calculations are effected thereon, using the switching signal (even/odd$^{-1}$) from the switching circuit 80-1, the updating command (UPDATE) and the output data (DATA) from the processor 80-10, and the updating command (UPDATE) and the output data (DATA) from the processor 80-20.

The updating command (UPDATE) and the output data (DATA) outputted from the comparator 80-14 of the processor 80-10 which processes even-series samples are indicated with "_even" added to the ends of their character trains to show that they are signals corresponding to even-series samples. The updating command (UPDATE) and the output data (DATA) outputted from the comparator of the processor 80-20 (corresponding to the comparator 80-14 of the processor 80-10) which processes odd-series samples are indicated with "_odd" added to the ends of their character trains to show that they are signals corresponding to odd-series samples.

Figure 49:
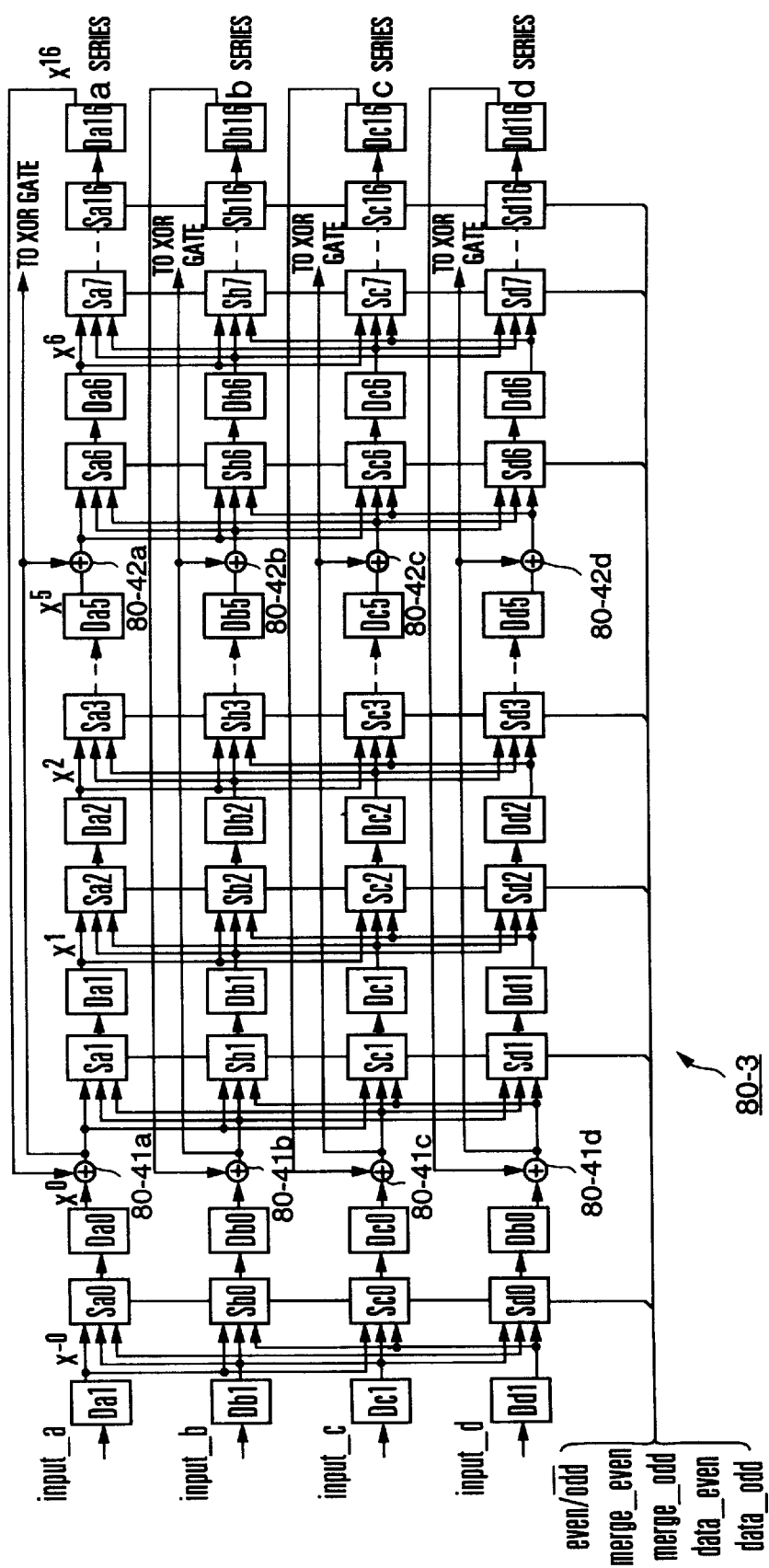
FIG. 49 is a block diagram of a circuit for simultaneously effecting Viterbi decoding and CRC calculations.

As shown in FIG. 49, if the largest degree of a generator polynomial in CRC calculations is indicated by J, then the shift register calculating circuit 80-3 comprises a parallel load/serial shift register composed of four a- to d-series serial shift registers having cascaded (J+2) flip-flops $D_{a-1}$ through $D_{aj}$ with (J+1) selectors $S_{a0}$ through $S_{aj}$ connected therebetween, cascaded (J+2) flip-flops $D_{b-1}$ through $D_{bj}$ with (J+1) selectors $S_{b0}$ through $S_{bj}$ connected therebetween, cascaded (J+2) flip-flops $D_{c-1}$ through $D_{cj}$ with (J+1) selectors $S_{c0}$ through $S_{cj}$ connected therebetween, and cascaded (J+2) flip-flops $D_{d-1}$ through $D_{dj}$ with (J+1) selectors $S_{d0}$ through $S_{dj}$ connected therebetween.

The flip-flops $D_{a-1}$ through $D_{aj}$, $D_{b-1}$ through $D_{bj}$, $D_{c-1}$ through $D_{cj}$, $D_{d-1}$ through $D_{dj}$ latch inputted data in timed relationship to a supplied clock (not shown). The selectors $S_{a0}$ through $S_{aj}$, $S_{b0}$ through $S_{bj}$, $S_{c0}$ through $S_{cj}$, $S_{d0}$ through $S_{dj}$ selects and outputs one of inputted three signals based on the switching signal (even/odd$^{-1}$ (indicated by odd with an overbar in FIG. 49)) outputted from the switching circuit 80-1, UPDATE_even and DATA_even from the processor 80-10, and UPDATE_odd and DATA_odd from the processor 80-20.

In this embodiment, the generator polynomial in CRC calculations is G(x) represented by the equation (80-1) given above. Therefore, J is 16.

In the shift register calculating circuit 80-3, (XOR) gates 80-41$a$ through 80-41$d$ are connected between the flip-flops $D_{a0}$, $D_{b0}$, $D_{c0}$, $D_{d0}$ and the selectors $S_{a1}$, $S_{b1}$, $S_{c1}$, $S_{d1}$, XOR gates 80-42$a$ through 80-42$d$ are connected between the flip-flops $D_{a5}$, $D_{b5}$, $D_{c5}$, $D_{d5}$ and the selectors $S_{a6}$, $S_{b6}$, $S_{c6}$, $S_{d6}$, and XOR gates (not shown) are connected between the flip-flops $D_{a12}$, $D_{b12}$, $D_{c12}$, $D_{d12}$ and the selectors $S_{a13}$, $S_{b13}$, $S_{c13}$, $S_{d13}$. Output signals from the respective flip-flops $D_{a16}$, $D_{b16}$, $D_{c16}$, $D_{d16}$ are inputted (fed back) to the XOR gates 80-41$a$ through 80-41$d$.

In the shift register calculating circuit 80-3, output signals from the XOR gates 80-41a through 80-41d are inputted respectively to the XOR gates 80-42a through 80-42d, and also to the XOR gates connected between the flip-flops $D_{a12}$, $D_{b12}$, $D_{c12}$, $D_{d12}$ and the selectors $S_{a13}$, $S_{b13}$, $S_{c13}$, $S_{d13}$ Therefore, each of the four a- to d-series serial shift registers of the shift register calculating circuit 80-3 is of the same arrangement as that which has selectors in a CRC decoder (not shown) for effecting CRC calculations corresponding to the generator polynomial according to the equation (80-1) and two flip-flops and one selector in a front stage of the CRC decoder.

Each of the four a- to d-series serial shift registers of the shift register calculating circuit 80-3 effects CRC calculations based on the generator polynomial G(x) according to the equation (80-1).

A circuit which is similar to the shift register calculating circuit 80-3 but devoid of all the XOR gates selects a surviving series of serial shift registers, i.e., a path, and decodes data by Viterbi decoding while combining even-series samples and odd-series samples, based on UPDATE_even and DATA_even from the processor 80-10 and UPDATE_odd and DATA_odd from the processor 80-20.

The circuit which is devoid of all the XOR gates in the shift register calculating circuit 80-3, therefore, decodes reproduced data successively (in the order of samples) by Viterbi decoding, and outputs the decoded data.

The shift register calculating circuit 80-3 is supplied with UPDATE_even and DATA_even from the processor 80-10 or UPDATE_odd and DATA_odd from the processor 80-20, and the switching signal (even/odd$^{-1}$) from the switching circuit 80-1 according to the tables shown in FIGS. 65 and 66.

If the switching signal (even/odd$^{-1}$) from the switching circuit 80-1 is of logic 1 (H level), then the data are processed based on UPDATE_even and DATA_even from the processor 80-10. If the switching signal (even/odd$^{-1}$) from the switching circuit 80-1 is of logic 0 (L level), then the data are processed based on UPDATE_odd and DATA_odd from the processor 80-20.

More specifically, in the shift register calculating circuit 80-3, a signal generator (not shown) generates four signals (input_a, input_b, input_c, input_d) indicated by respective equations given below, from the switching signal (even/odd$^{-1}$) from the switching circuit 80-1, UPDATE_even and DATA_even from the processor 80-10, and UPDATE_odd and DATA_odd from the processor 80-20.

input_a=(even/odd$^{-1}$=1*UPDATE_even+(even/odd$^{-1}$=0)*UPDATE_odd input_b=(even/odd$^{-1}$=1*UPDATE_even input_c=(even/odd$^{-1}$=0*UPDATE_odd input_d=0 where * indicates ANDing and +ORing. (even/odd$^{-1}$=1) becomes logic 1 if even/odd$^{-1}$ is logic 1 (at the timing of even-series samples), and becomes logic 0 if even/odd$^{-1}$ is logic 0 (at the timing of odd-series samples). (even/odd$^{-1}$=0) becomes logic 0 if even/odd$^{-1}$ is logic 1, and becomes logic 1 if even/odd$^{-1}$ is logic 0.

Therefore, the signal input_b is of the same value as UPDATE(UPDATE_even) outputted from the processor 80-10, which is effective only at the timing of even-series samples, and the signal input_c is of the same value as UPDATE(UPDATE_odd) outputted from the processor 80-20, which is effective only at the timing of odd-series samples. The signal input_a is of the same value as UPDATE(UPDATE_even) outputted from the processor 80-10 at the timing of even-series samples, and is of the same value as UPDATE(UPDATE_odd) outputted from the processor 80-20 at the timing of odd-series samples. The signal input_d is 0 at all times.

The four signals input_a, input_b, input_c, input_d are inputted respectively to the first flip-flops $D_{a-1}$ through $D_{d-1}$ of the shift register calculating circuit 80-3 (FIG. 49).

The signals input_a, input_b, input_c, input_d inputted respectively to the first flip-flops $D_{a-1}$ through $D_{d-1}$ are successively latched in next flip-flops through respective selectors in timed relationship to the clock.

The selectors $S_{aj}$, $S_{bj}$, $S_{cj}$, $S_{dj}$ (i=0, 1, . . . J (J=16 in this embodiment as described above)) output signals out_a, out_b, out_c, out_d, respectively, according to the following equations where signals from previous stages of the a- through d-series shift registers:

out_a=(even/odd$^{-1}$=1)*(UPDATE_even=1)* (DATA_even=0)*in_c+(even/odd$^{-1}$=1)* ((UPDATE_even=1) *(DATA_even=0))$^{-1}$* in_a+(even/odd$^{-1}$=0)* (UPDATE_odd=1)* (DATA_odd=0)*in_b+(even/odd$^{-1}$=0)* ((UPDATE_odd=1)*(DATA_odd=0))$^{-1}$*in_a out_b=(even/odd$^{-1}$=1)*(UPDATE_even=1)* (DATA_even=0)*in_d+(even/odd$^{-1}$=1)* ((UPDATE_even=1) *(DATA_even=0))$^{-1}$* in_b+(even/odd$^{-1}$=0)* (UPDATE_odd=1)* (DATA_odd=1)*in_a+(even/odd$^{-1}$=0)* ((UPDATE_odd=1)*(DATA_odd=1))$^{-1}$*in_b out_c=(even/odd$^{-1}$=1)*(UPDATE_even=1)* (DATA_even=1)*in_a+(even/odd$^{-1}$=1)* ((UPDATE_even=1) *(DATA_even=1))$^{-1}$* in_c+(even/odd$^{-1}$=0)* (UPDATE_odd=1)* (DATA_odd=0)*in_d+(even/odd$^{-1}$=0)* ((UPDATE_odd=1)*(DATA_odd=0))$^{-1}$*in_c out_d=(even/odd$^{-1}$1)*(UPDATE_even=1)* (DATA_even=1)*in_b+(even/odd$^{-1}$=1)* ((UPDATE_even=1) *(DATA_even=1))$^{-1}$* in_d+(even/odd$^{-1}$=0)* (UPDATE_odd=1)* (DATA_odd=1)*in_c+(even/odd$^{-1}$=0)* ((UPDATE_odd=1)*(DATA_odd=1))$^{-1}$*in_d where ( )$^{-1}$ indicates negation of what is contained in ( ). Therefore, ( )$^{-1}$ is logic 0 if the logic in ( ) is 1, and logic 1 if the logic in ( ) is 0.

According to the above equations, a surviving series (correct path) of serial shift registers is selected from UPDATE_even and DATA_even from the processor 80-10 and UPDATE_odd and DATA_odd from the processor 80-20, and the data latched in the flip-flops of the selected series of shift registers are copied into the flip-flops of another series of shift registers and Viterbi-decoded.

Simultaneously in the shift register calculating circuit 80-3, output signals from the final flip-flops $D_{a16}$ through $D_{d16}$ of the a- and d-series serial shift registers and the flip-flops $D_{a0}$ through $D_{d0}$ thereof are XORed by the respective XOR gates 80-41a through 80-41d, whose output signals are inputted to the selectors $S_{a1}$ through $S_{d1}$ respectively.

The output signals from the XOR gates 80-41a through 80-41d and output signals from the flip-flops $D_{a5}$ through $D_{d5}$ of the a- and d-series serial shift registers are XORed by the respective XOR gates 80-42a through 80-42d, whose output signals are inputted to the selectors $S_{a6}$ through $S_{d6}$, respectively. The output signals from the XOR gates 80-42a through 80-42d and output signals from flip-flops $D_{a12}$ through $D_{d12}$ (not shown) of the a- and d-series serial shift registers are XORed by XOR gates disposed between those flip-flops $D_{a12}$ through $D_{d12}$ and flip-flops $D_{a13}$ through $D_{d13}$ (not shown). Output signals from those XOR gates are inputted to the respective selectors $S_{a13}$ through $S_{d13}$.

Therefore, the shift register calculating circuit 80-3 carries out CRC calculations based on the generator polynomial according to the equation (80-1).

In order to Viterbi-decoding partial responses (1, 0, −1), a 2-bit code for ending a trellis diagram (hereinafter referred to as a "trellis") is required at the end of a block of data (a bit series) to be decoded (a bit series as a unit to be decoded). The 2-bit code is a code prior to a precode, and 11 is generally added as such a 2-bit code to the end of a block.

The 2-bit code for ending a trellis is not required for effecting CRC calculations. In the shift register calculating circuit 80-3, therefore, when 2-bit data corresponding to a code (11) for ending a trellis are latched respectively by the flip-flops $D_{a-1}$ through $D_{d-1}$ and $D_{a0}$ through $D_{d0}$ of the a- and d-series serial shift registers, the result of CRC calculations is evaluated based on 16 bits latched in any of the flip-flops $D_{a1}$ through $D_{a16}$, $D_{b1}$ through $D_{b16}$, $D_{c1}$ through $D_{c16}$, and $D_{d1}$ through $D_{d16}$.

Specifically, if 16 bits latched in any of the flip-flops $D_{a1}$ through $D_{a16}$, $D_{b1}$ through $D_{b16}$, $D_{c1}$ through $D_{c16}$, and $D_{d1}$ through $D_{d16}$ are all 0, then the result of CRC calculations is evaluated such that the data contain no error, and if any one of the 16 bits is not 0, then the result of CRC calculations is evaluated such that the data contain an error.

In the shift register calculating circuit 80-3, as described above, the XOR gates for XORing output signals from the cascaded flip-flops of the a- and d-series serial shift registers for carrying out a Viterbi decoding process are disposed between those flip-flops to effect CRC calculations. Therefore, if a Jth-degree generator polynomial for a CRC code is used, then a result of CRC calculations can be obtained within a J−1 clock after the final bit of a block of data from the magnetic disk 10-2 has been inputted to the reproducer 80-80 shown in FIG. 45.

Figure 50A:
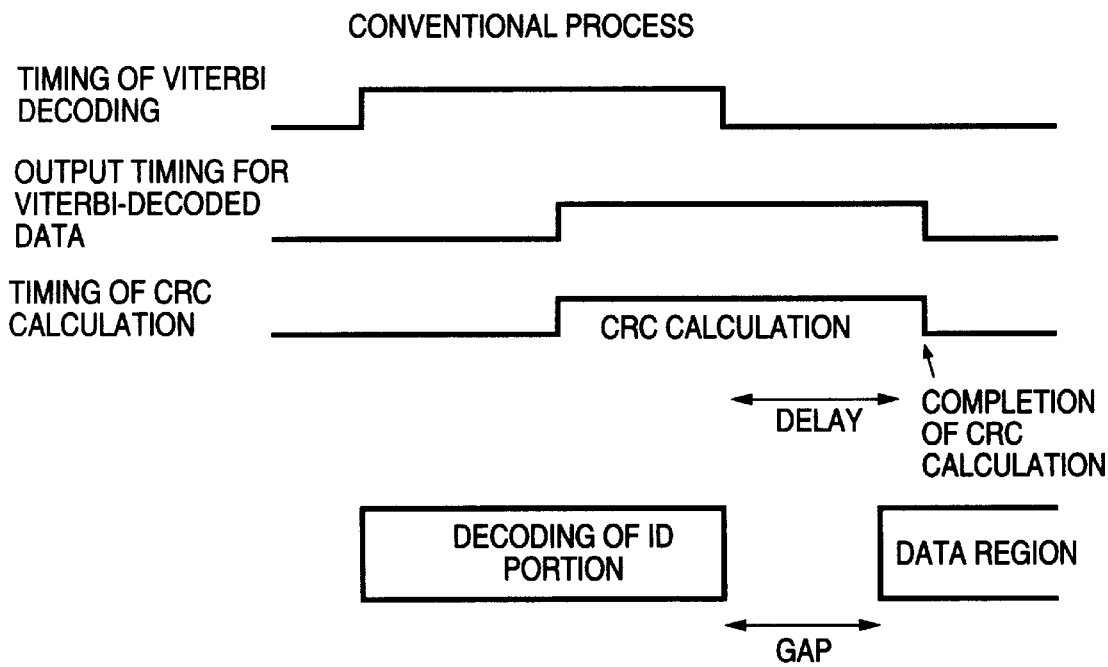
FIGS. 50A and 50B are timing charts illustrative of operation of the embodiment shown in FIG. 49.
Figure 50B:
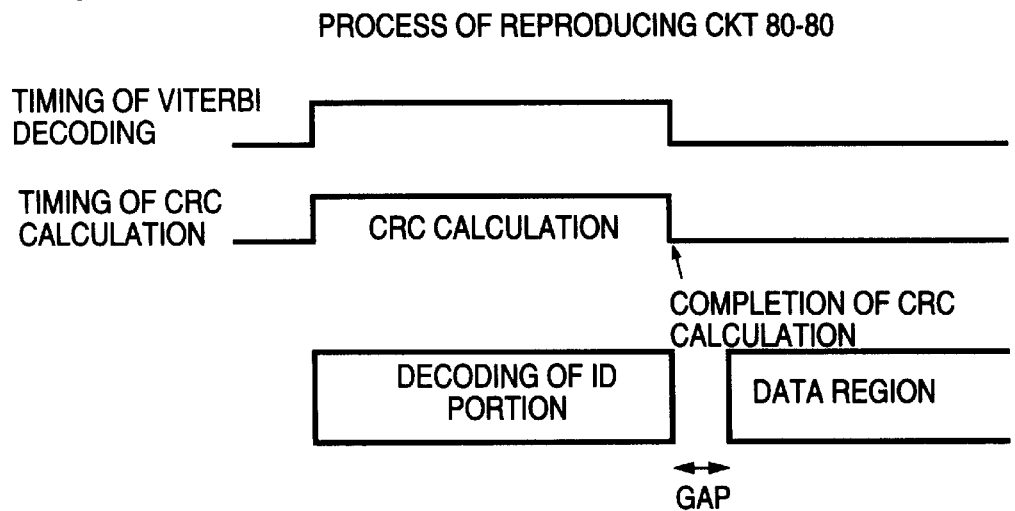

Since Viterbi decoding and CRC calculations are simultaneously carried out as shown in FIG. 50B, any time delay necessary for decoding data and detecting an error can greatly be reduced.

Consequently, as compared with the conventional process shown in FIG. 50A in which CRC calculations are carried out after data have been Viterbi-decoded, the gap between the ID and data portions of the magnetic disk (e.g., the distance between the ID recording region 20-41H and the data recording region 20-41D or the distance between the gray code 20-71 and the ID recording region 20-41H as shown in FIG. 2) can be reduced for a larger capacity of the magnetic disk.

In the above description of the shift register calculating circuit 80-3, the generator polynomial for CRC according to the equation (80-1) has been employed. However, the generator polynomial is not limited to the equation (80-1), but may be represented by another equation. Depending on the generator polynomial that is used, the step number of flip-flops of the shift register calculating circuit 80-3 may be increased or reduced, and the number and inserted position of XOR gates may be varied.

The reproducer 80-80 is also applicable to decode not only the ID portion but also data in the data region (data recorded in the data recording region 20-41D shown in FIG. 2).

The aspect of the recorder 10-9 shown in FIG. 1 will be described below.

Figure 51:
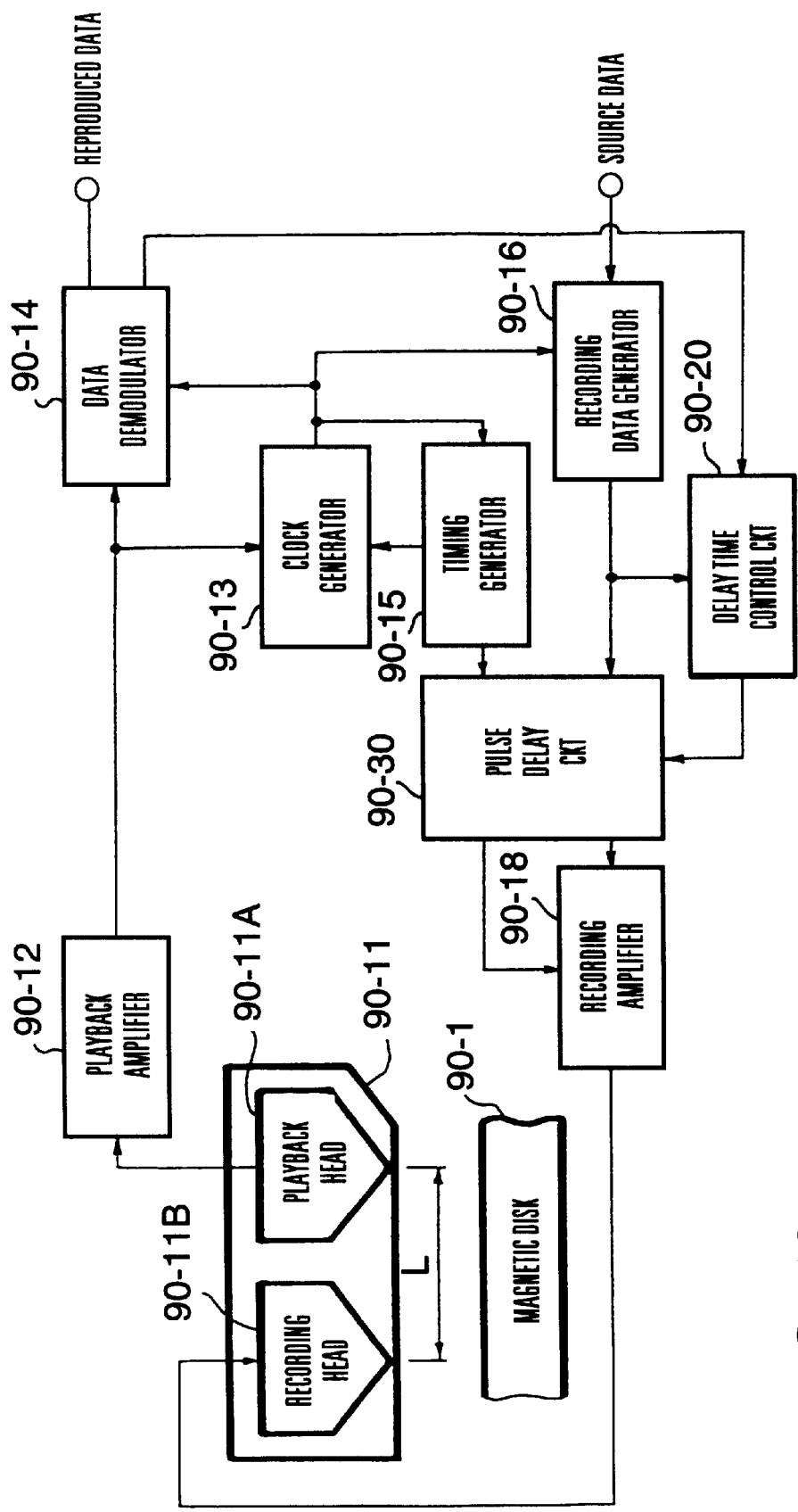
FIG. 51 is a block diagram of a recording circuit according to the present invention.
Figure 52:
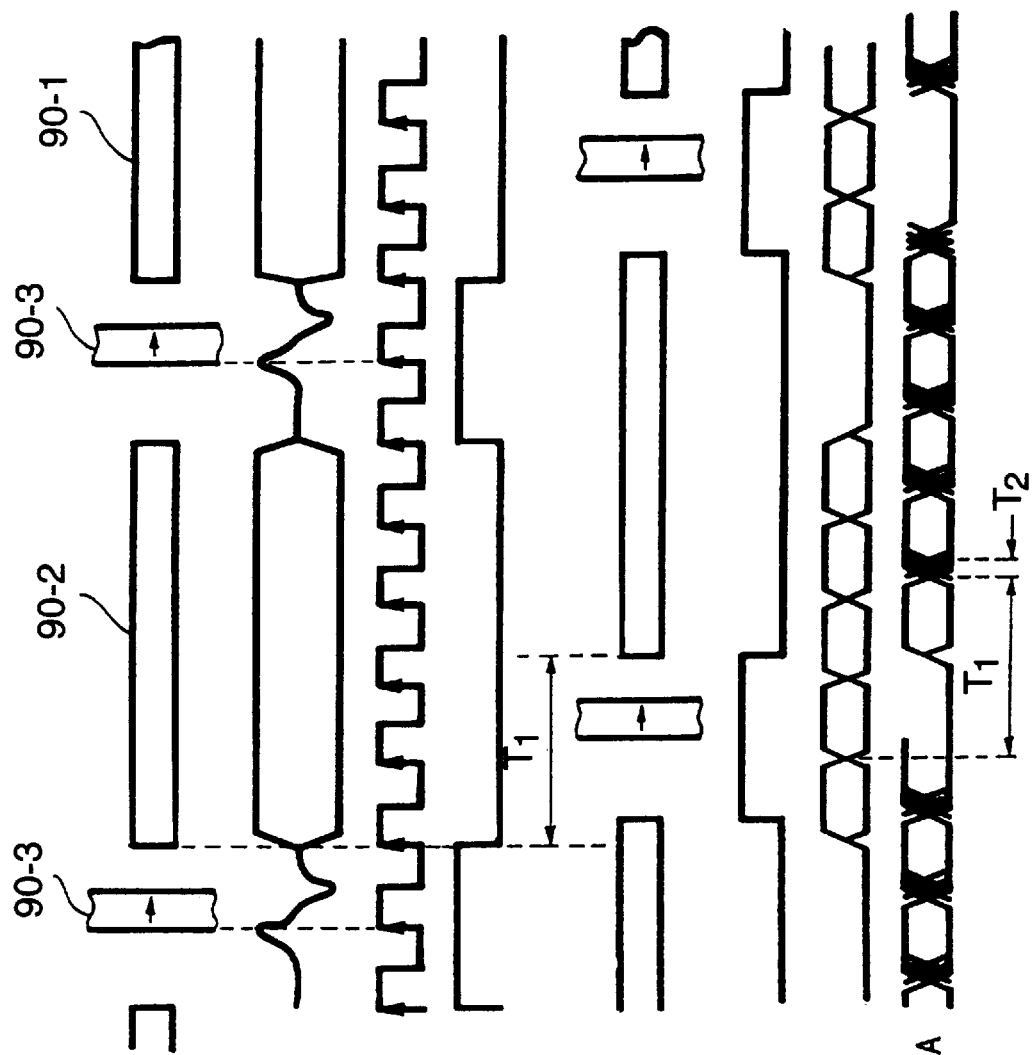
FIGS. 52A–52H are timing charts illustrative of operation of the embodiment shown in FIG. 51.

FIG. 51 is a block diagram showing an entire arrangement of a magnetic disk device. The magnetic disk device is of the so-called external synchronous type (sample servo type) in which data are recorded on or recorded data are reproduced from a magnetic disk 90-1 (that is formatted as shown in FIG. 2) on which clock marks have been recorded for generating a clock.

The magnetic disk device has a playback head 90-11a for reproducing data from the magnetic disk 90-1, a playback amplifier 90-12 for amplifying a signal reproduced by the playback head 90-11a, a clock generator 90-13 for generating a clock based on a reproduced signal amplified by the playback amplifier 90-12 and corresponding to clock marks on the magnetic disk 90-1, and a data demodulator 90-14 for reproducing data or the like from the reproduced signal from the playback amplifier 90-12 using the clock from the clock generator 90-13.

The magnetic disk device also has a timing generator 90-15 for counting a clock from the clock generator 90-13 to control the clock generator 90-13 and output a switching signal to switch between recording and playback modes, a recording data generator 90-16 for converting inputted data (corresponding to the recording signal inputted to the recorder 10-9 shown in FIG. 1, and hereinafter referred to as "source data") into data suitable for recording (hereinafter referred to as "recording data"), a pulse delay circuit 90-30 for delaying the recording data from the recording data generator 90-16, a recording head 90-11b for recording the recording data delayed by the pulse delay circuit 90-30 on the magnetic disk 90-1, a recording amplifier 90-18 for supplying a current based on the recording data delayed by the pulse delay circuit 90-30 to the recording head 90-11b, and a delay time control circuit 90-20 for controlling a delay quantity in the pulse delay circuit 90-30 based on a position (hereinafter referred to as "head position information") of the recording head 90-11b in the radial direction of the disk, from the data demodulator 90-14.

As described above with reference to FIGS. 17 and 18, the playback head 90-11a comprises a so-called magnetoresistance-effect head (MR head) for achieving high-density recording, and the recording head 90-11b comprises an ordinary magnetic head. The playback head 90-11a and the recording head 90-11b are spaced from each other by a distance L in the direction in which they run with respect to the magnetic disk. The playback head 90-11a and the recording head 90-11b jointly constitute a so-called recording/playback-separated head 90-11.

On the magnetic disk 90-1 which is rotated at a constant angular velocity (so-called zone bit recording with a clock frequency changed per zone) by a spindle motor (100-21 shown in FIG. 59), there are formed, as shown in FIG. 52A, radially successive clock marks 90-3 (20-11 in FIG. 2) for generating a clock by partially removing a magnetic layer, for example, as by etching, between data segments 90-2 (the data recording regions 20-41D in FIG. 2) which are regions for recording data on concentric recording tracks. These clock marks 90-3 are magnetized in one direction by a direct current, and provided in about several hundred to one thousand locations (840 locations in the above example) per circumference for generating a highly accurate clock.

The playback head 90-11a outputs a reproduced signal corresponding to data recorded in the data segments 90-2 and also outputs a reproduced signal corresponding to the clock marks 90-3, and supplies these reproduced signals through the playback amplifier 90-12 to the clock generator 90-13 and the data demodulator 90-14.

The clock generator 90-13 has the PLL circuit 50-30 described with reference to FIG. 21, and generates a clock based on the reproduced signal corresponding to the clock marks 90-3.

More specifically, when the clock marks 90-3 magnetized in one direction (the rightward direction indicated by the arrows in FIG. 52A) by a direct current as shown in FIG. 52A are reproduced, a reproduced signal having an isolated waveform is reproduced by leading and trailing edges of the clock marks 90-3 as shown in FIG. 52B. The timing generator 90-15 counts the clock supplied from the clock generator 90-13, predicts a period in which the reproduced signal corresponding to the clock marks 90-3 appears based on the past history, supplies a clock gate signal representative of the predicted period to the clock generator 90-13, and generates a switching signal for switching between the recording and playback modes as shown in FIG. 52D.

The clock generator 90-13 regards an isolated waveform appearing in a period in which a clock gate signal is produced, as a normal clock mark, updates the PLL phase so as to synchronize a positive-going edge of the clock with the peak of the isolated waveform corresponding to the leading edge, as shown in FIG. 52N, for example, and generates a clock kept in phase with the clock marks 90-3.

In the playback mode, the data demodulator 90-14 discriminates the reproduced signal (samples the level) at the times of positive-going edges (hereinafter referred to as "data-present-point phase" of the clock generated by the clock generator 90-13, for example, and demodulates (Viterbi-decodes, as described above with reference to FIGS. 44 through 50) the signal to reproduce data. The data demodulator 90-14 also reproduces head position information (e.g., the gray code 20-71, the track numbers 20-41b1, 20-41b2, etc. in FIG. 2) of the head 90-11 in the radial direction of the disk based on the reproduced signal, and supplies the head position information to the delay time control circuit 90-20.

In the recording mode, the recording data generator 90-16 converts source data into recording data synchronous with the clock generated by the clock generator 90-13 according to a prescribed modulation process suitable for recording (PR modulation as described above), and supplies the recording data synchronous with the clock to the pulse delay circuit 90-30 and the delay time control circuit 90-20.

The pulse delay circuit 90-30 is controlled by the delay time control circuit 90-20 to delay recording data so as to compensate for a phase deviation of data, to be recorded in the data segments 90-2, due to the distance L between the playback head 90-11a and the recording head 90-11b in the direction in which they run with respect to the disk, and also to compensate for a positional deviation (hereinafter referred to as a "nonlinear bit shift") of magnetization reversal due to the pattern of the recording data. The recording amplifier 90-18 amplifies the delayed recording data, and supplies a current based on the recording data to the recording head 90-11b.

Figure 53:
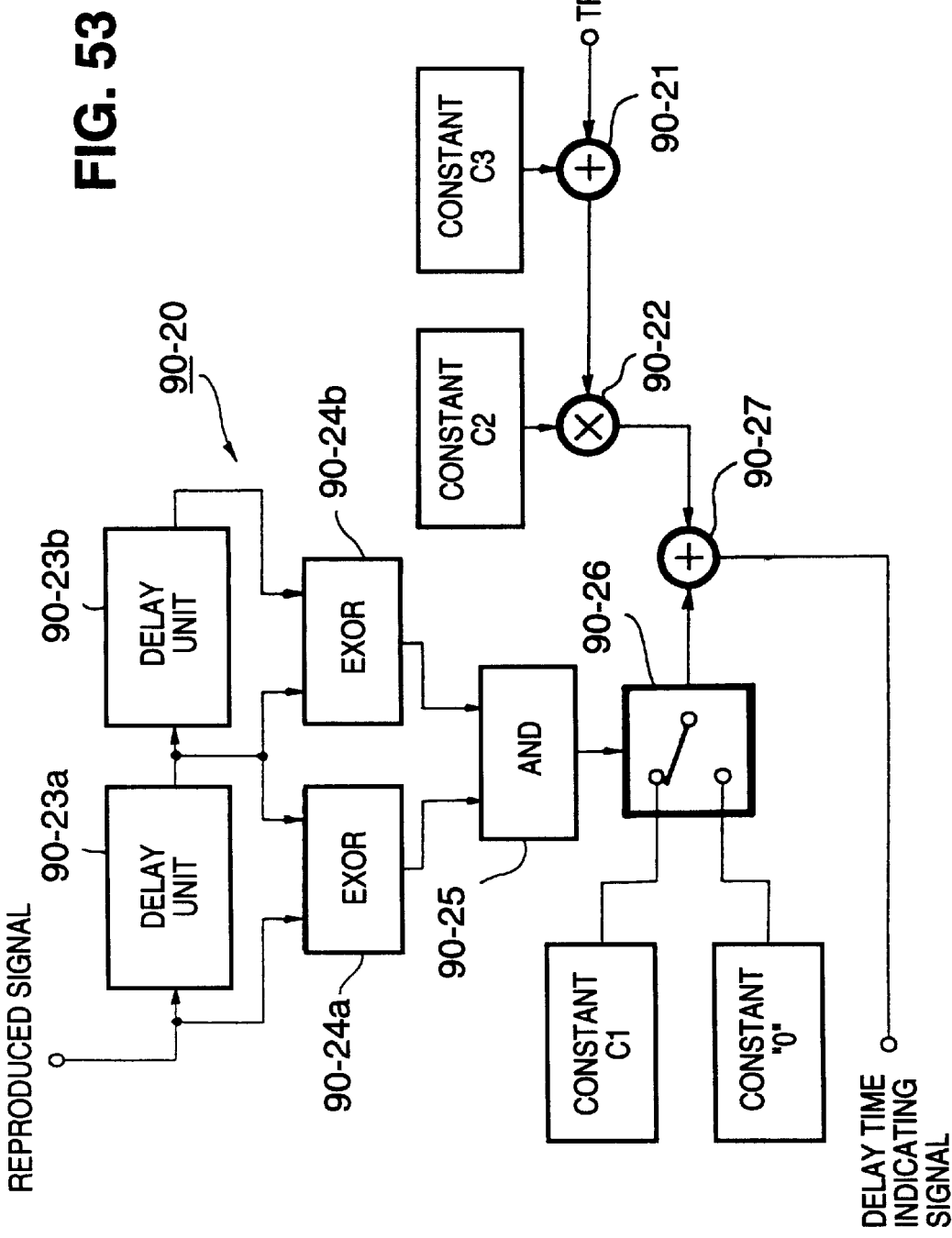
FIG. 53 is a block diagram of an arrangement of a delay time control circuit 90-20 shown in FIG. 51.

More specifically, as shown in FIG. 53, the delay time control circuit 90-20 comprises an adder 90-21 for adding a constant C3 to the head position information (track number) from the data demodulator 90-14, a multiplier 90-22 for multiplying an output signal from the adder 90-21 by a constant C2, cascaded delay units 90-23a, 90-23b each for delaying the recording data from the recording data generator 90-16 by one clock, an exclusive-OR (hereinafter referred to as "XOR") gate 90-24a for XORing the recording data from the recording data generator 90-16 and the recording data delayed by the delay unit 50-23a, an XOR gate 90-24b for XORing the recording data delayed by the delay unit 90-23a and the recording data delayed by the delay unit 90-23b, an AND gate 90-25 for ANDing an output signal from the XOR gate 90-24a and an output signal from the XOR gate 90-24b, a selector switch 90-26 for selecting a constant C1 or a constant 0 based on an output signal from the AND gate 90-25, and an adder 90-27 for adding an output signal from the selector switch 90-26 and an output signal from the multiplier 90-22 to each other.

The delay time control circuit 90-20 calculates the time difference between the data-present-point phase and a time at which the recording current is to be actually reversed based on the head position information supplied from the data demodulator 90-14 and the recording data, and outputs a delay time indicating signal.

More specifically, if it is assumed that the head position information supplied from the data demodulator 90-14 is a track number N where the head 90-11 is currently positioned, for example, then the adder 90-21 adds the track number N and the constant C3 (corresponding to the distance from the center of the disk to a radially innermost track), and the multiplier 90-22 multiplies the sum from the adder 90-21 by the constant C2. The multiplier 90-22 outputs a value proportional to the distance (N+C3) from the disk center to the head 90-11 as a delay time T1 for compensating for a phase deviation of the data due to the distance L between the playback head 90-11a and the recording head 90-11b in the direction in which they run, according to the following equation (90-1):

$$T1 = (N+C3) \times C2 \qquad (90\text{-}1).$$

The constants C2, C3 are of such a value as to satisfy T1=L/v where v is a speed of the head 90-11 at the time it is positioned on the track whose track number is N. Stated otherwise, the delay time T1 is equal to a time in which the magnetic disk moves by the distance L.

Each of the delay units 90-23a, 90-23b delays the recording data by one clock. The XOR gates 90-24a, 90-24b XOR 2 adjacent bits of successive 3 bits of the recording data. The AND gate 90-25 ANDs output signals from the XOR gates 90-24a, 90-24b. As a result, the AND gate 90-25 outputs a successive magnetization reversal detected signal of H level, for example, when the data have a pattern in which a nonlinear bit shift (the time for which the drive current is supplied and the length of a magnetized region are not proportional) is easy to happen, i.e., a pattern (010 or 101) in which the recording data have 2 successive bits of magnetization reversal (a condition in which different logic levels (1 or 0) are adjacent to each other continues 2 successive times), and outputs a successive magnetization reversal detected signal of L level otherwise.

The selector switch 90-26 selects the constant C1 when the successive magnetization reversal detected signal is of H level, for example, and selects the constant 0 when it is of L level, and supplies the selected constant to the adder 90-27. As a result, the selector switch 90-26 outputs the constant C1 as a delay time T2 for compensating for a nonlinear bit shift with respect to a pattern in which magnetization reversal is produced successively, i.e., a pattern (010 or 101, as described above) in which the nonlinear bit shift occurs.

The adder 90-27 adds the delay time T1 and the delay time T2, and supplies the sum (T1+t2) as a delay time indicating signal to the pulse delay circuit 90-30.

The pulse delay circuit 90-30 has its delay time controllable from the outside thereof. For example, as shown in FIG. 52H, the pulse delay circuit 90-30 delays the recording data (FIG. 52G) supplied from the recording data generator 90-16 by the time (T1+T2) indicated by the delay time indicating signal supplied from the delay time control circuit 90-20, and delays a switching signal (FIG. 52D) supplied from the timing generator 90-15 to generate a write enable signal (active-low signal) as shown in FIG. 52F.

Figure 54:
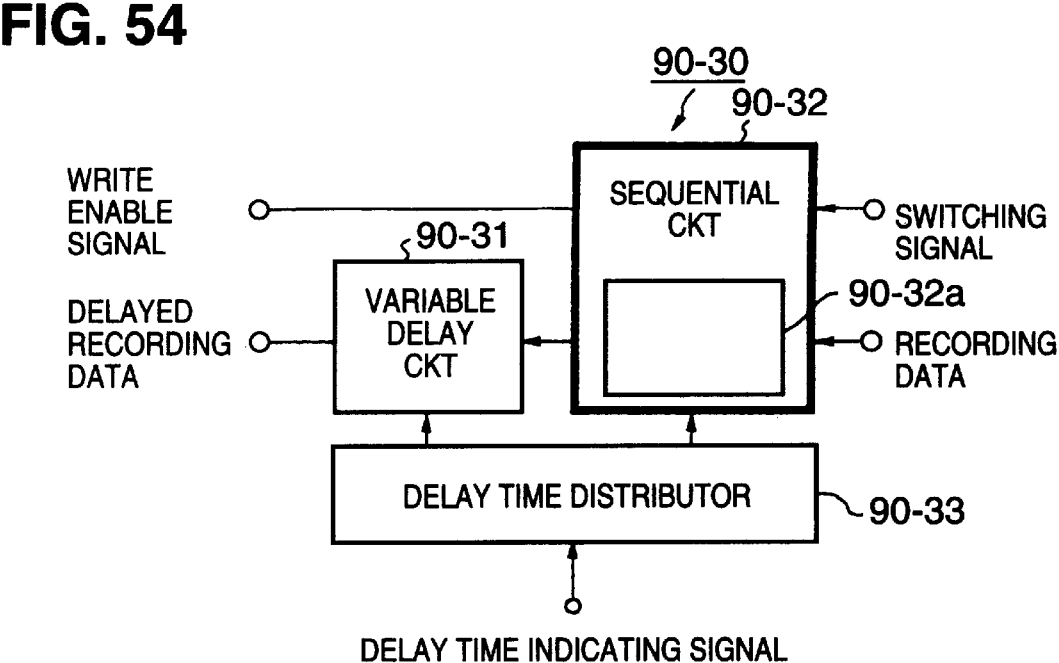
FIG. 54 is a block diagram of a pulse delay circuit 90-30 shown in FIG. 51.

Specifically, as shown in FIG. 54, the pulse delay circuit 90-30 comprises a variable delay circuit 90-31 having a delay time whose period is equal to or less than one clock, a sequential circuit 90-32 having a delay time in units of one clock, and a delay time distributor 33 for dividing the delay time indicating signal from the delay time control circuit 90-20 into a delay time in units of one clock and a delay time representing the remainder, and supplying them respectively to the sequential circuit 90-32 and the variable delay circuit 90-31.

The delay time distributor 33 divides the delay time indicating signal from the delay time control circuit 90-20 into a delay time in units of one clock and a delay time representing the remainder, supplies the delay time in units of one clock to the sequential circuit 90-32, and supplies the delay time representing the remainder to the variable delay circuit 90-31.

The sequential circuit 90-32 comprises a delay circuit operating in synchronism with the clock, and includes a counter 90-32a for counting the clock. The counter 90-32a counts the clock for the delay times in units of one clock for thereby generating a write enable signal shifted in timing by delay times in units of one clock and an intermediate output of the recording data, based on the switching signal and the recording data.

The variable delay circuit 90-31 delays the data within the time of one clock by the delay time representing the remainder, thus more accurately delaying the intermediate output of the recording data, and outputs the delayed recording data.

The pulse delay circuit 90-30 supplies the write enable signal and the delayed recording data to the recording amplifier 90-18. With such an arrangement, there is required one variable delay circuit 90-18 which is of a large circuit scale and is required to have a high time accuracy. Since the maximum delay time of the variable delay circuit 90-18 may be as long as one clock, the entire circuit scale thereof can be reduced, and its power consumption may be lowered.

The recording amplifier 90-18 controls the supply and cutoff of the recording current according to the write enable signal supplied from the pulse delay circuit 90-30, and reverses the recording current according to the recording data delayed by the pulse delay circuit 90-30.

The switching signal outputted from the timing generator 90-15 and the recording data outputted from the recording data generator 90-16 are held in synchronism with the clock (FIG. 52C) generated by the clock generator 90-13 as shown in FIGS. 52D and 52G. As illustrated in FIG. 52A, these signals correspond to positions on the data segments 90-2 as seen from the playback head 90-11a.

If the relative speed between the head 90-11 and the disk is represented by v, then there is a time difference T1=L/v between the data segments 90-2 as seen from the playback head 90-11a as shown in FIG. 52A and the data segments 90-2 as seen from the recording head 90-11b as shown in FIG. 52E. As shown in FIGS. 52F and 52H, the pulse delay circuit 90-30 delays the switching signal and the recording data by the time difference T1, generates a write enable signal and delayed recording data which correspond to positions on the data segments 90-2 as seen from the recording head 90-11b, and further delays the recording data by the time T2 which compensates for the nonlinear bit shift.

As a result, it is possible to compensate for a phase deviation of data, to be recorded in the data segments 90-2, due to the distance L between the playback head 90-11a and the recording head 90-11b in the direction in which they run with respect to the disk, and also to compensate for a positional deviation (nonlinear bit shift) of magnetization reversal due to the pattern of the recording data. The data can now be recorded in correct positions on the data segments 90-2.

Stated otherwise, the times at which the recording current starts and stops being supplied and the time at which the recording current is reversed are controlled by the pulse delay circuit 90-30 for thereby recording data in correct positions on the data segments 90-2 without depending on the position of the head 90-11 in the radial direction of the disk and the pattern of the data. In the playback mode, therefore, the reproduced signal is discriminated at the times (data-present-point phase) of positive-going edges of the clock generated by the clock generator 90-13, so that the reproduced signal is referred to at positions where data are present which are recorded on the data segments 90-2, making it possible to reproduce data free of errors.

Another specific circuit arrangement of the delay time control circuit 90-20 shown in FIG. 51 will be described below with reference to FIG. 55. The delay time control circuit 90-20 shown in FIG. 55 comprises cascaded delay units 90-41a, 90-41b each for delaying the recording data from the recording data generator 90-16 by one clock, and a memory 90-42 in which the delay time (T1+T2) has been stored in advance, using as readout addresses the recording data delayed by the delay units 90-41a, 90-41b and the head position information from the data demodulator 90-14.

The recording data delayed by the delay units 90-41a, 90-41b and track numbers each of 8 bits are supplied as 11-bit readout addresses to the memory 90-42.

The memory 90-42 stores delay times corresponding to combinations of patterns of track numbers and recording data, and outputs a delay time indicating signal according to the readout addresses.

Specifically, since the memory 90-42 stores appropriate delay times with respect to all combinations of patterns of track numbers and recording data, the memory 90-42 can output nonlinear delay times, for example, with respect to positions of the head 90-11 in the radial direction of the disk, for controlling delay times in small increments.

Figure 55:
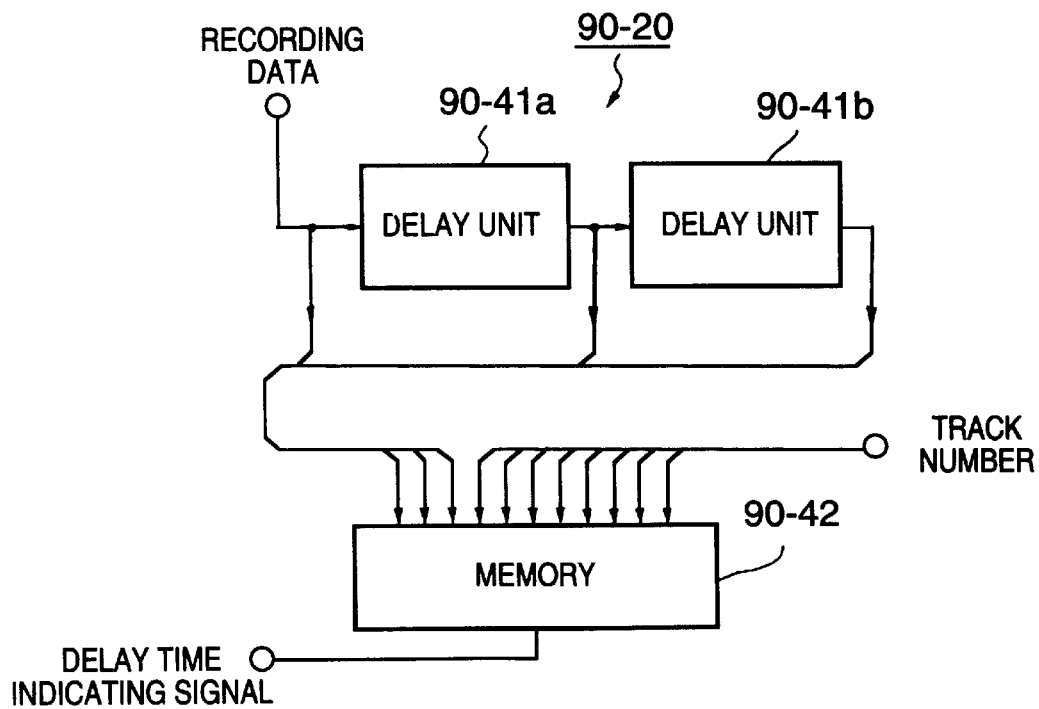
FIG. 55 is a block diagram of another arrangement of the delay time control circuit 90-20 shown in FIG. 51.

The delay time control circuit shown in FIG. 55 may be combined with the delay time control circuit shown in FIG. 53 such that rough delay times can be calculated by the delay time control circuit shown in FIG. 53 and remaining fine time adjustment can be made by the delay time control circuit shown in FIG. 55, for thereby reducing the capacity of the memory 90-42.

Figure 56:
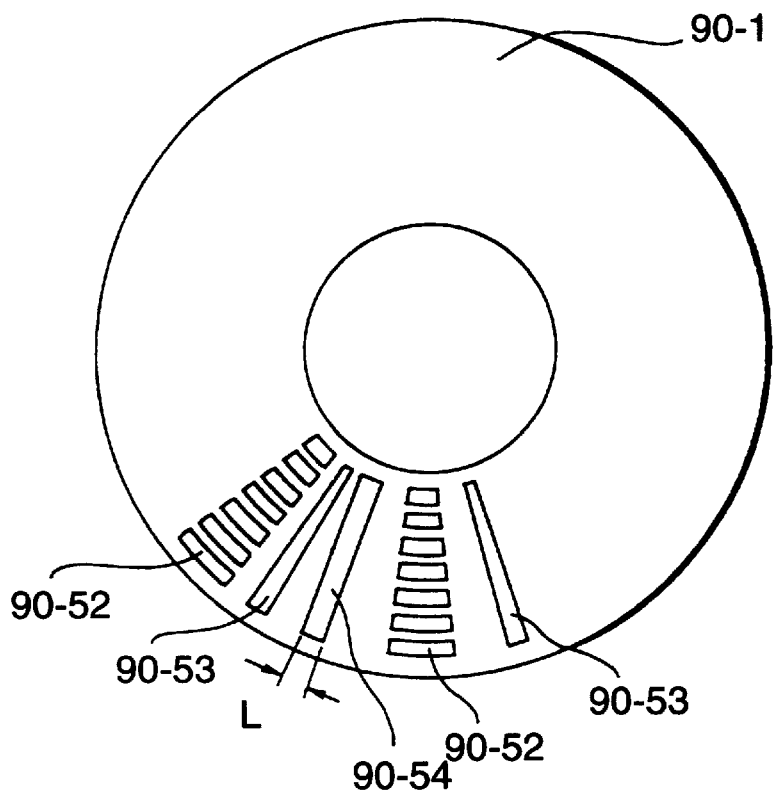
FIG. 56 is a view showing a recording format of a magnetic disk to which the present invention is applied.
Figure 57:
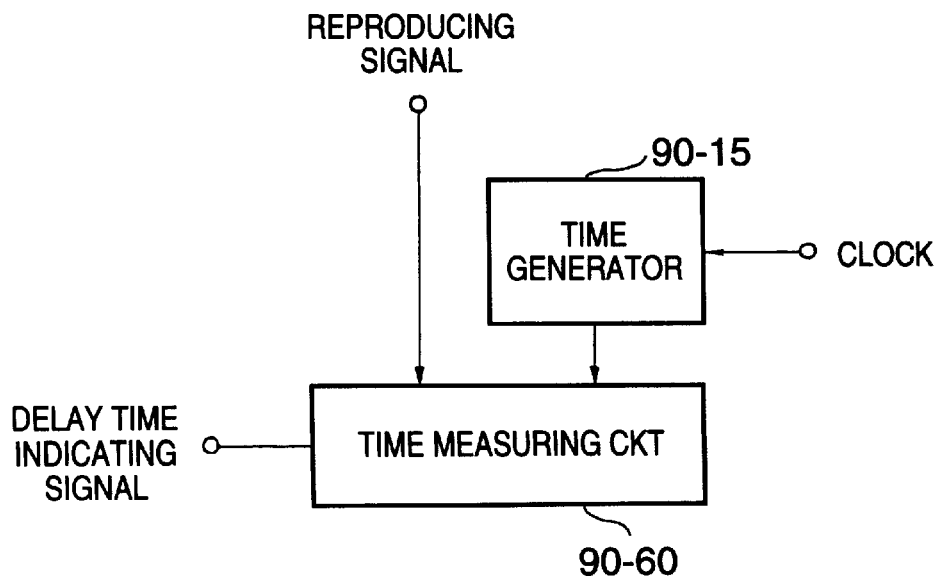
FIG. 57 is a block diagram of a recording circuit according to the present invention which incorporates the embodiment shown in FIG. 56.
Figure 58:
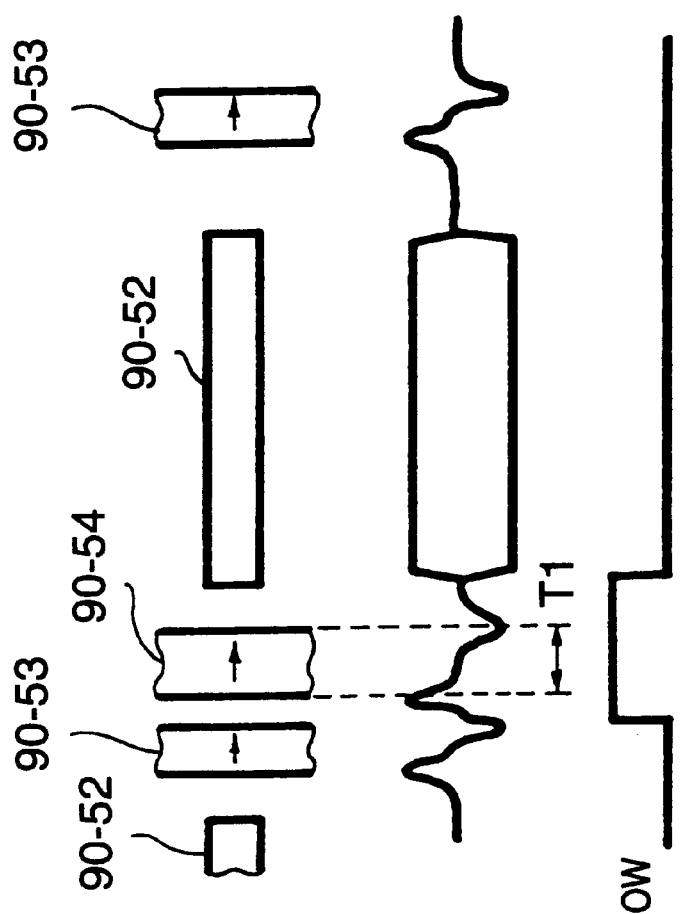
FIGS. 58A, 58B, and 58C are timing charts illustrative of operation of the embodiment shown in FIG. 57.

As shown in FIG. 56, a magnetic layer, for example, is partly removed as by etching between data segments 90-52 which are regions to record data on concentric magnetic tracks to form radial successive clock marks 90-53 (the clock marks 20-11 shown in FIG. 2) for generating a clock and a timing compensating pattern 90-54 having a predetermined width, for example, a width equal to the distance L between the playback head 90-11a and the recording head 90-11b, on the magnetic disk 90-1 shown in FIG. 51. If the clock marks 90-53 and the timing compensating pattern 90-54 are magnetized in one direction (the direction indicated by the arrows in FIG. 58A) by a direct current, then the magnetic disk device shown in FIG. 51 may have a time measuring circuit 90-60 for measuring the time difference T1, rather than the delay time control circuit 90-20, arranged as shown in FIG. 57.

The description of the circuits having the same functions as those of the circuits shown in FIG. 51 is omitted.

The timing generator 90-15 counts a clock to generate a time measuring window signal indicative of a period in which the playback head 90-11a scans the timing compensating pattern 90-54, as shown in FIG. 58C, and supplies the time measuring window signal to the time measuring circuit 90-60.

The time measuring circuit 90-60 measures a time T1 between the peaks of two isolated waveforms reproduced by leading and trailing edges of the timing compensating pattern 90-54 in a period in which the time measuring window signal is of H level, as shown in FIG. 58B, and supplies the time T1 as the delay time indicating signal to the pulse delay circuit 90-30.

Since the duration L of the timing compensating pattern 90-54 is constant regardless of the radius of the disk, the difference between the times at which the leading and trailing edges thereof pass across the playback head 90-11a is always equal to the difference T1 between the times at which the playback head 90-11a and the recording head 90-11b pass.

Specifically, the time difference between the peaks of the reproduced signal corresponding to the timing compensating pattern 90-54 is the delay time T1 to be supplied to the pulse delay circuit 90-30.

Therefore, the delay time T1 can be determined directly from the timing compensating pattern 90-54 which is formed in advance on the magnetic disk 90-1. Inasmuch as calculating circuits including the adder 90-21, the multiplier 90-22, etc. shown in FIG. 53, and the memory 90-42 shown in FIG. 55 are dispensed with, the cost of the magnetic disk device can be lowered.

In FIG. 56, each of the regions is illustrated linearly in the radial direction of the disk for the sake of brevity. Actually, however, each of the regions is formed along the path of angular movement of the magnetic head as shown in FIGS. 6 and 7.

As described above, the recording data are delayed based on the reproduced signal corresponding to the timing compensating pattern of given width to compensating for a phase deviation of data, to be recorded on the magnetic disk 90-1, due to the distance between the playback head 90-11a and the recording head 90-11b in the direction in which they run with respect to the disk. Therefore, data can be recorded in correct positions, and as a result, data free of errors can be reproduced.

In the manner described above, not only sector numbers and track numbers in the ID recording region 20-41H shown in FIG. 2, but also data on the data recording region 20-41D can be recorded and reproduced by PRML.

The aspect of the casing 10-10 shown in FIG. 1 will be described below with reference to FIG. 59.

A lower casing 100-1 (40-51 in FIG. 19) made of aluminum or the like has a hole 100-2 defined in a flat panel thereof for attachment of a spindle motor 100-21. The lower casing 100-1 also includes a step extending around the hole 100-2, and a gasket 100-3 made of rubber or the like is placed on the step for preventing air from leaking through a region where the spindle motor 100-21 is attached. A shaft 100-4 is mounted on the lower casing 100-1, and a ball bearing 100-6 (40-55 in FIG. 19) attached to an arm 100-5 (40-53 in FIG. 19) is mounted on the shaft 100-4.

A voice coil 100-7 (40-63 in FIG. 19) is attached to one end of the arm 100-5, and a slider (40-57 in FIG. 19) having a magnetic head is attached to the other end of the arm 100-5. The coil 100-7 and the magnetic head are supplied with a signal from a flexible printed-circuit board 100-8 on which there is placed an IC 100-9 for processing signals. An end of the flexible printed-circuit board 100-8 extends out of the casing. Magnets 100-11, 100-12 (62, 61 in FIG. 19) are mounted on the lower casing 100-1 such that the voice coil 100-7 is positioned between the magnets 100-11, 100-12. The voice coil 100-7 and the magnets 100-11, 100-12 jointly serve as a voice coil motor (50-5 in FIG. 21).

Two magnetic disks 100-23 (40-52 in FIG. 19, 50-1A, 50-1B in FIG. 21) are rotatably attached to the motor 100-21. The motor 100-21 has a flexible printed-circuit board 100-22 having an end extending out of the casing for supplying a control signal to the motor 100-21 from an external source.

Figure 59:
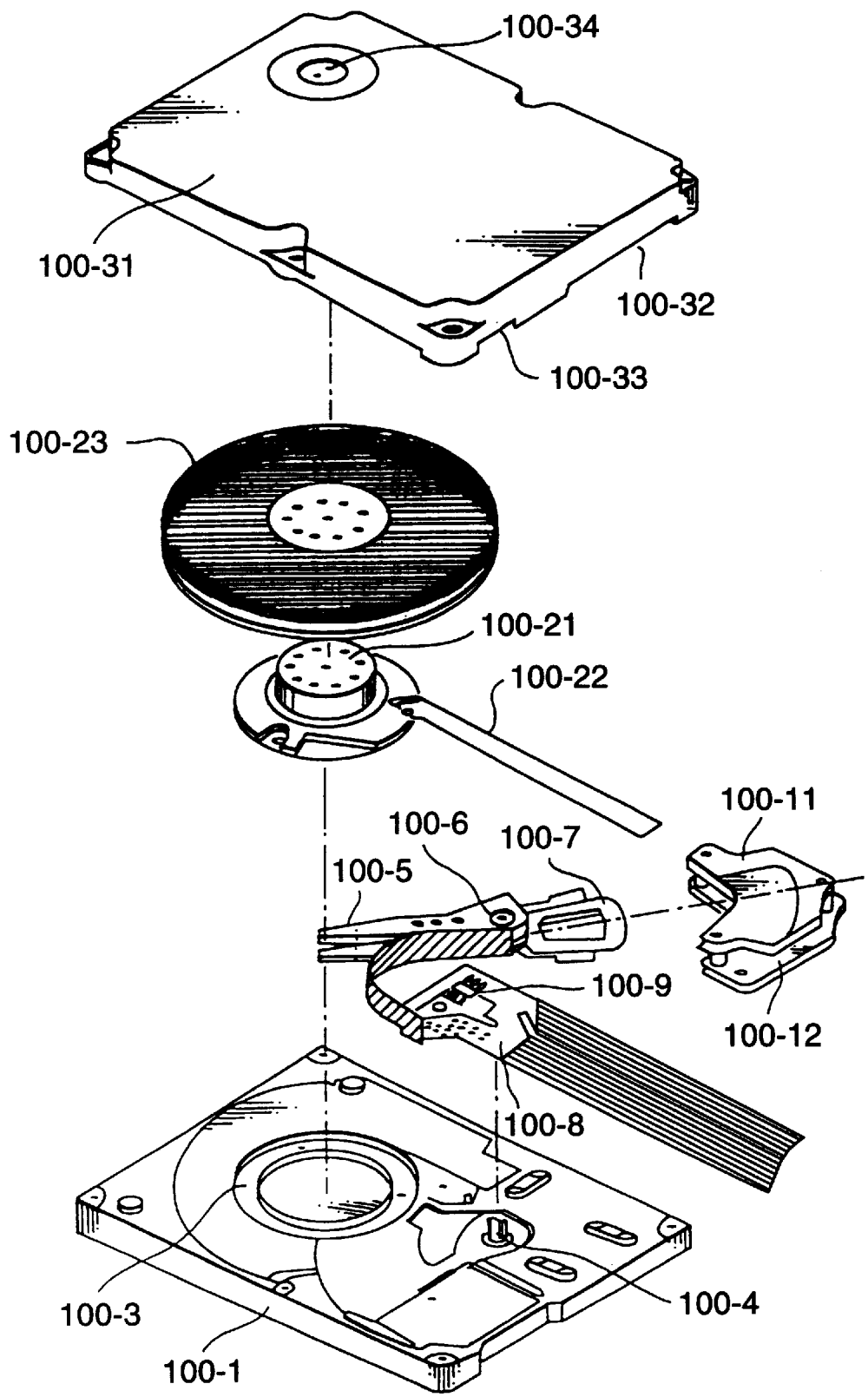
FIG. 59 is an exploded perspective view showing how a casing and internal parts according to the present invention are assembled.

An upper casing 100-31 has steps 100-32, 100-33 on a right-hand side thereof (as seen in FIG. 59). The ends of the flexible printed-circuit boards 100-8, 100-22 extend out of the casing through the steps 100-32, 100-33. The upper casing 100-31 has a vent hole 100-34 defined in an upper panel (flat panel) thereof. A filter and a valve are mounted in the vent hole 100-34 for introducing air, but blocking water.

Figure 60:
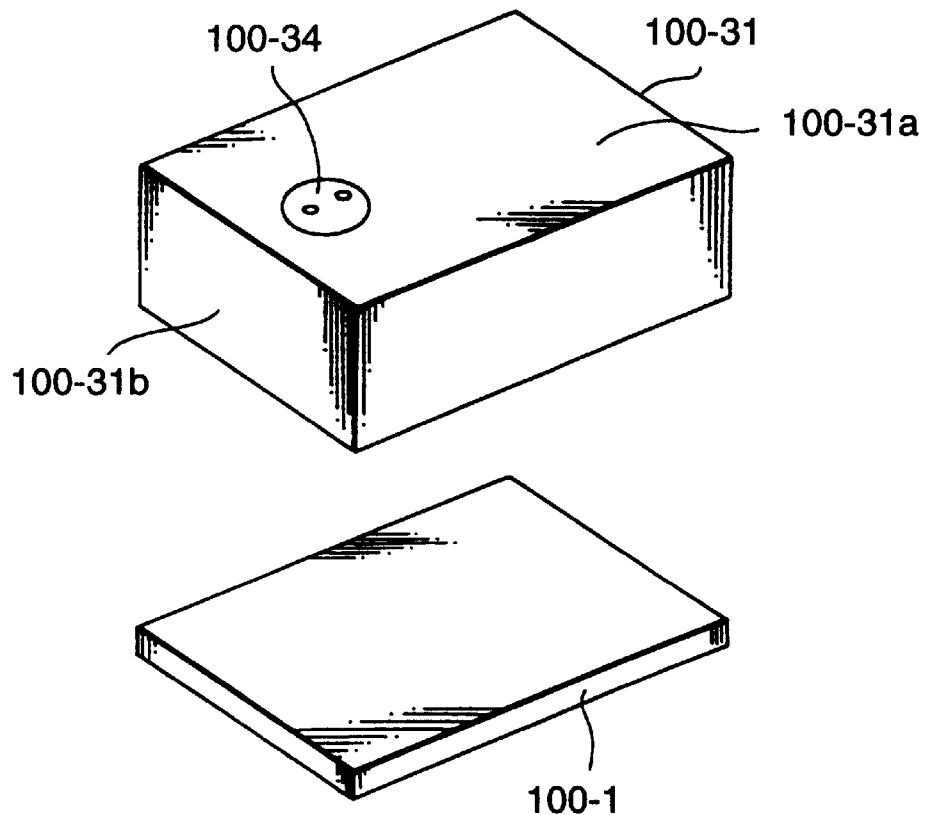
FIG. 60 is a perspective view of the casing according to the present invention.
Figure 61:
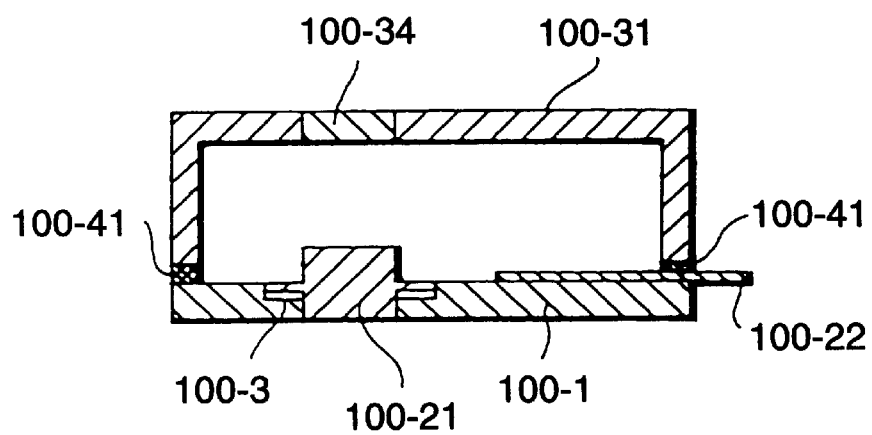
FIG. 61 is a cross-sectional view of the embodiment shown in FIG. 60.

FIGS. 60 and 61 schematically show assembled conditions of the lower casing 100-1 and the upper casing 100-31. As show in FIGS. 60 and 61, the lower casing 100-1 comprises a plate-like member, and the upper casing 100-31 is in the form of a box including a flat panel 100-31a and a side wall 100-31b. A gasket 100-41 is inserted between the lower casing 100-1 and the upper casing 100-31 for preventing air from entering the assembled and closed casing from around the flexible printed-circuit board 100-22 (or the flexible printed-circuit board 100-8) that extends out of the casing.

More specifically, after the lower casing 100-1 and the upper casing 100-31 have been assembled and closed, the interior of the casing is shielded from outside, and air can flow only through the vent hole 100-34 in the flat panel 100-31a. Dust and dirt are prevented from entering the casing. Since air flows in and out through the vent hole 100-34, the air pressure in the casing is substantially equal to the air pressure outside of the casing.

The lower casing 100-1 and the upper casing 100-31 have a length of 100 mm and a width of 70 mm. When the lower casing 100-1 and the upper casing 100-31 are assembled together, their height is 15.0 mm if two magnetic disks 100-23 are employed, and 12.7 mm if one magnetic disk 100-23 is employed.

Figure 62:
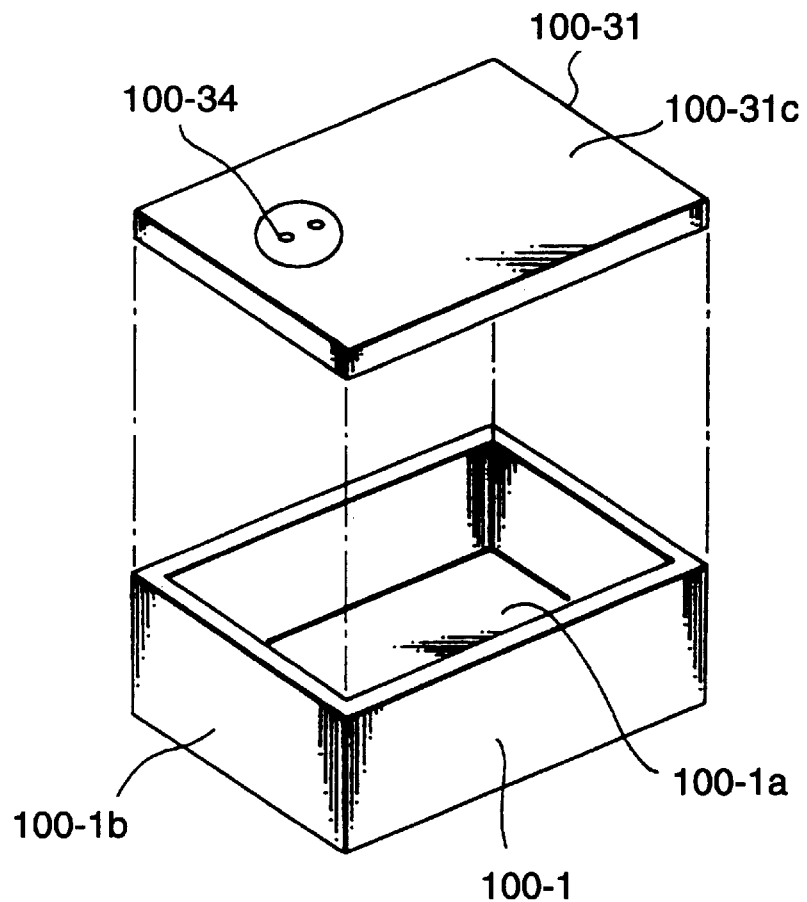
FIG. 62 is a perspective view of another embodiment of the casing according to the present invention.
Figure 63:
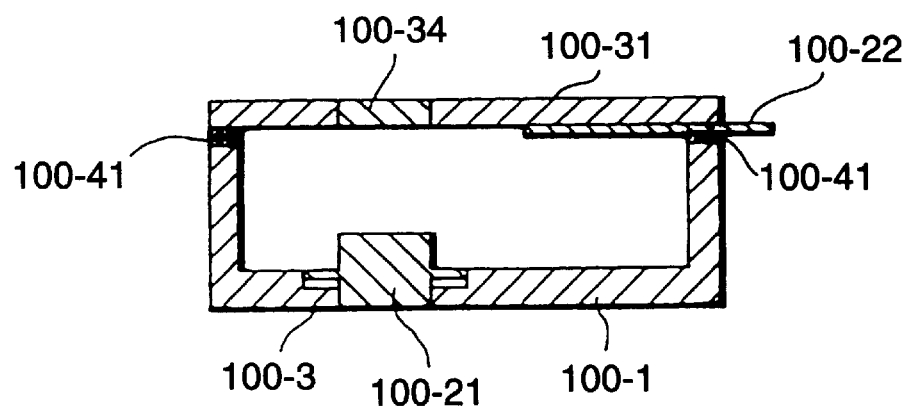
FIG. 63 is a cross-sectional view of the embodiment shown in FIG. 62.

While the lower casing 100-1 is in the form of a plate and the upper casing 100-31 is in the form of a box in this embodiment, the lower casing 100-1 may be in the form of a box composed of a flat panel 100-1a and a side wall 100-1b, and the upper casing 100-31 may be in the form of a plate (flat panel 100-31c), as shown in FIGS. 62 and 63.

Figure 67:
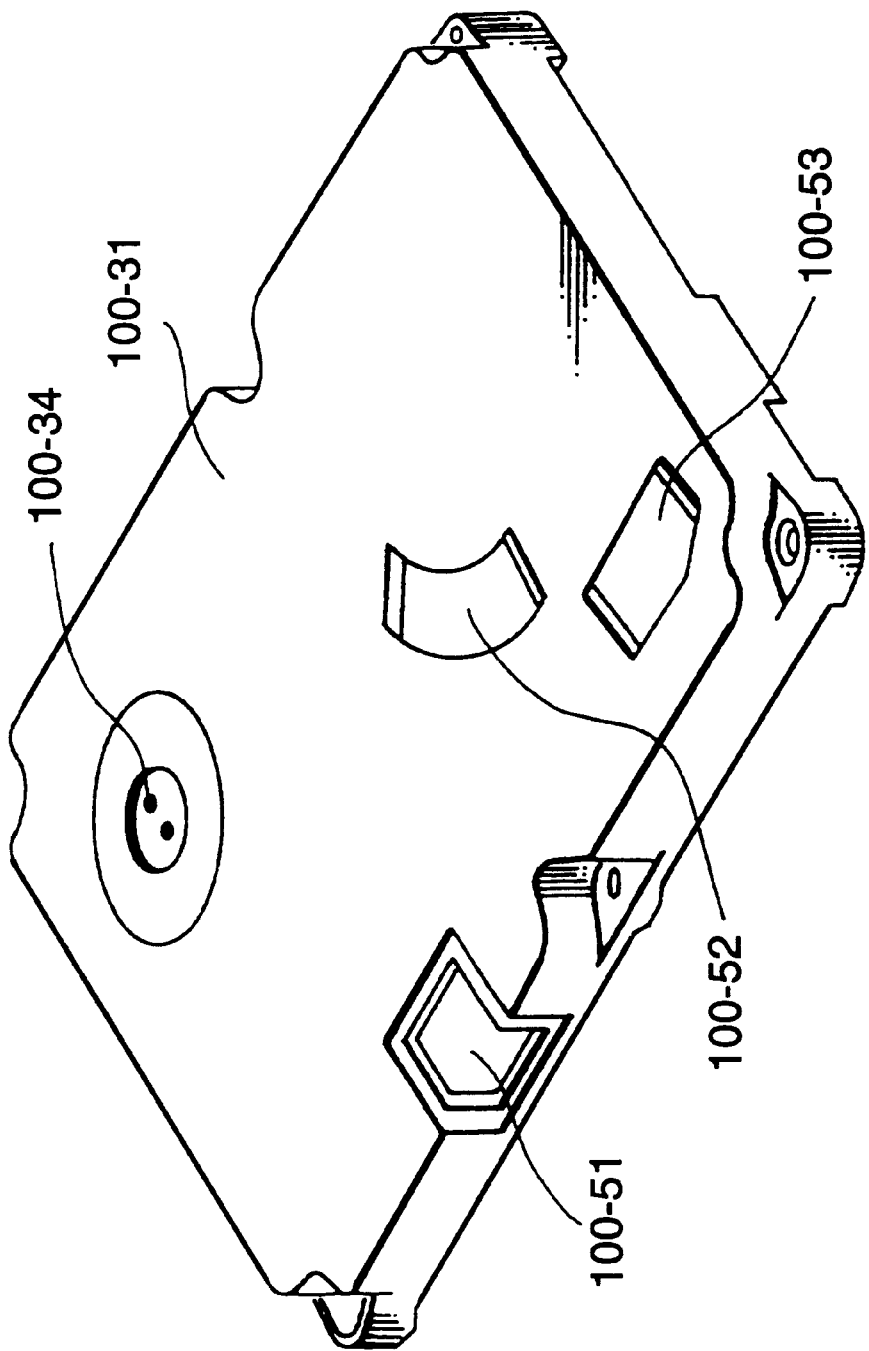
FIG. 67 is a perspective view of a conventional casing.

The casing shown in FIGS. 62 and 63 is characterized in that no hole other than the vent hole 100-34 is defined in the flat panel 100-31a. For a better understanding of this feature, FIG. 67 shows the shape of a conventional upper casing 100-31. As shown in FIG. 67, the conventional upper casing 100-31 has holes 100-51, 100-52 and a recess 100-53. The recess 100-53 is used to apply a label therein, and the hole 100-51 is used to insert a servo write head.

In the conventional magnetic disk device, if a servo signal such as of an encoder were recorded on a magnetic disk before the magnetic disk is put in the casing, then since the magnetic disk would suffer eccentricity due to pressure-induced deformation or an attachment error at the time the magnetic disk is assembled, the positions where the servo signal is recorded as a positional signal would not correspond accurately to positions where data are actually recorded. Therefore, accurate servo control could not be performed. In the conventional magnetic disk device, therefore, a servo signal is recorded on the magnetic disk after the magnetic disk is assembled in the casing.

Specifically, to record a servo signal on the magnetic disk assembled in the casing, a recording magnetic head (servo write head) is inserted through the hole 100-51. Then, a servo signal is recorded on the magnetic disk by the head.

A mirror is installed through the hole 100-51 on an arm which is placed in the casing, and a laser beam from a laser length measuring unit is applied to the mirror to accurately measure the position of the arm. While accurately measuring the position of the arm with the laser length measuring unit, the arm is moved successively in the radial direction of the magnetic disk. Servo data (encoder) are then recorded in a given track on the magnetic disk.

For example, when servo data are recorded in a radially outermost track, the servo data are recorded in quarters of the width of the track at positions which are staggered by quarters in a direction perpendicular to the track. Therefore, a servo signal can be recorded on one track in four revolutions of the magnetic disk. In this manner, a rotary encoder is recorded on the radially outermost track on the magnetic disk.

After the servo data have been recorded on the magnetic disk, the holes 100-51, 100-52 are closed off by given members, closing the casing.

On the magnetic disk according to the present invention, as described above, tracks and servo data are recorded in advance by impression at positions as dedicated recording regions that are physically separate from other regions. Therefore, the positions where the tracks and servo data (formed positions) are recorded can be adjusted highly accurately using a technique for finely controlling the position where the laser beam is applied at the time the disk is formed. In this embodiment, it is only necessary to take into account eccentricity due to attachment errors.

According to this embodiment, as described above with reference to FIGS. 34 and 35, eccentricity can accurately be controlled by adding an offset signal to a tracking error signal under feed-forward control. As a result, servo patterns such as of the home index 100-73, the unique pattern 20-72, the gray code 20-71, and the wobbled marks 20-12, 2013, and the clock marks 20-11, the sector numbers 20-41*a,* and the track numbers 20-41*b*1, 20-41*b*2 are impressed in advance on the magnetic disk. Even though the magnetic disk is subsequently assembled in the casing, data can accurately be recorded on and reproduced from the magnetic disk. As a consequence, it is not necessary to define a hole for recording servo data in the casing in accordance with the present invention.

As no hole needs to be defined in the casing, the casing may be formed as a simple box or plate having a uniform height, and the mechanical rigidity of the casing may be increased. Since mechanical resonance of the casing is thus suppressed, the head can be positioned highly accurately with respect to the magnetic disk.

Heretofore, since holes are defined in the casing, the magnetic disk device has had to be tested in a clean room to determine whether it is to be accepted or rejected. According to the present invention, however, since no hole is defined in the casing, the assembled magnetic disk device is not required to be handled in a clean room.

If the spindle motor 100-21 is of a lower profile, the hole 100-2 for attachment of the spindle motor 100-21 may be dispensed with.

The magnetic disk device according to the present invention can easily be manufactured within a shortened period of time, and hence can be reduced in cost.

In the magnetic disk device of the present invention since the guard bands are impressed as concavities with respect to the tracks, the guard bands are not required to be wide for reducing crosstalk, and the track pitch may be reduced to increase the recording capacity. Since the tracking marks, the track number indicating marks, or the clock marks are impressed as concavities and convexities along the path of angular movement of the magnetic head, they can accurately be accessed even if the track pitch is small.

In the magnetic disk device according to another aspect of the present invention, a change corresponding to eccentricity of the disk-shaped medium is measured, and recording or reproducing operation of the magnetic head is controlled according to a result of measurement. Therefore, accurate data can be recorded and reproduced even though the disk-shaped medium on which the tracking marks, the track number indicating marks, and the clock marks are recorded in advance is subsequently assembled into a casing.

In the magnetic disk device according to further aspect of the present invention, because the tracking marks, the track number indicating marks, and the clock marks are provided in 1000 combinations or less per circumference, the recording capacity is maintained, and the disk-shaped medium can accurately be controlled.

Since the control signal recording region occupies 40% or less of one circumference of the disk-shaped medium, the recording capacity is maintained, and any disturbed motion of the magnetic head caused by the impressed mark signals is held to a minimum, allowing data to be recorded and reproduced with accuracy.

Inasmuch as the disk-shaped medium comprises a resin or glass substrate, the magnetic disk device is lightweight. Because the surface accuracy of the disk-shaped medium can be made better, the distance between the magnetic head and the disk-shaped medium can be reduced, and hence the magnetic disk device can be reduced in size.

Since the recording head and the playback head are separate from each other, data can be recorded and reproduced at high speed.

As the first marks are formed at positions radially displaced from the tracks, even though the recording head and the playback head are separate from each other, the recording head can be aligned accurately with a track under tracking control when data are recorded.

Since a plurality of marks are provided, even when one of the marks suffers a dropout, data can be accessed with reference to another mark, and hence the safety is increased.

Because a positional change is measured from the tracking marks or the track number indicating marks, or a time change is measured from the clock marks, eccentricity of the disk-shaped medium can accurately be detected.

Inasmuch as an eccentricity control quantity for correcting a positional deviation due to eccentricity of the magnetic head from the tracks is calculated from the signal produced by reproducing the tracking marks, the track number indicating marks, or the clock marks, a positional deviation due to eccentricity can be corrected with accuracy.

The eccentricity control quantity which is calculated is stored, and the stored eccentricity control quantity is read out and added to a tracking control signal to effect tracking control on the magnetic head. Therefore, reliable tracking control can be effected without increasing the overall servo gain of the tracking control.

The time change is measured from the clock marks, and a time base of the clock signal is corrected according to the stored time change. Consequently, jitter caused by eccentricity or the like can be suppressed.

Since Viterbi decoding and CRC calculations are simultaneously carried out, the reproduced signal can quickly be processed.

Since recording data are delayed according to the clock signal, a phase deviation due to the distance between the playback head and the recording head and a nonlinear bit shift are corrected, and the recording data can be recorded in accurate positions.

Because recording operation is controlled according to the magnitude of a positional deviation, erroneous operation can be suppressed at the time an undue shock is applied to the magnetic disk device.

Since only a vent hole is defined in the casing, the time required to manufacture the magnetic disk device is shortened, and the cost thereof is lowered.

The disk-shaped medium has a diameter of about 2.5, 1.8, or 1.3 inches. Consequently, the magnetic disk device can be small and light.

In the method of manufacturing the magnetic disk device according to the present invention, the disk-shaped medium is assembled in the casing after the tracking marks, the track number indicating marks, and the clock marks have been formed and recorded on the disk-shaped medium. As a result, the magnetic disk device can be completed quickly, and the cost thereof can be lowered.

What is claimed is:

1. A magnetic disk device having:
   a disk-shaped medium with a magnetic film formed on a surface for recording or reproducing information;
   a magnetic head for recording on and reproducing information from said disk-shaped medium;
   an arm supporting said magnetic head and angularly movable to move said magnetic head to a predetermined radial position on said disk-shaped medium;
   said disk-shaped medium has a data recording region and a control signal recording region;
   said data recording region has concentric or spiral tracks formed therein, said tracks being impressed to have convexities as recording portions for recording data and concavities as guard bands for separating adjacent ones of said recording portions; and
   said control signal recording region having impressed concavities and convexities representing tracking marks for effecting tracking control on said magnetic head, track number indicating marks for identifying said tracks, and clock marks dividing one circumference into equal intervals, at least one of the marks being formed along a path of angular movement of said magnetic head;
   wherein said recordings portions, said guard bands, and said control region convexities and concavities all contain said magnetic film therein, and recording or reproducing operation of said magnetic head is controlled according to a signal produced by reproducing said tracking marks, said track number indicating marks, or said clock marks.

2. A magnetic disk device according to claim 1, wherein said tracking marks, said track number indicating marks, and said clock marks are provided in 1000 combinations or less per circumference.

3. A magnetic disk device according to claim 1 or 2, wherein said control signal recording region occupies 40% or less of one circumference of said disk-shaped medium.

4. A magnetic disk device according to claim 1 or 2, wherein said magnetic head is separated into a recording head for recording data and a playback head for reproducing data.

5. A magnetic disk device according to claim 4, wherein said tracking marks and said track number indicating marks have first marks used when data are recorded and second marks used when data are reproduced, said second marks being disposed along substantial centers of said tracks, and said first marks being disposed at positions that are displaced a predetermined distance radially from substantial centers of said tracks.

6. A magnetic disk device according to claim 5, wherein said tracking marks and said track number indicating marks comprise a plurality of marks having the same function.

7. A magnetic disk device according to claim 1 or 2, wherein the signal produced by reproducing said track number indicating marks is subjected to CRC calculations simultaneously while the signal is being Viterbi-decoded.

8. A magnetic disk device according to claim 1 or 2, wherein a clock signal is generated from the signal produced by reproducing said clock marks, recording data are delayed according to said clock signal, and the delayed recording data are recorded on said disk-shaped medium.

9. A magnetic disk device according to claim 1 or 2, further comprising:
   means for determining the magnitude of a relative positional deviation between said magnetic head and said tracks as measured from said tracking marks, wherein recording operation on said disk-shaped medium is controlled according to a result of the determination of said deviation.

10. A magnetic disk device according to claim 1 or 2, wherein said disk-shaped medium. said magnetic head, and said arm are housed in a closed casing comprising an upper casing and a lower casing, each of said upper casing and said lower casing having a flat panel formed of continuous material except for only a single pressure-regulating vent hole for adjusting the difference between an air pressure in the closed casing and an air pressure outside of the closed casing.

11. A magnetic disk device according to claim 1 or 2, wherein said disk-shaped medium has a diameter of about 2.5 inches.

12. A magnetic disk device according to claim 1 or 2, wherein said disk-shaped medium has a diameter of about 1.8 inches.

13. A magnetic disk device according to claim 1 or 2, wherein said disk-shaped medium has a diameter of about 1.3 inches.

14. A magnetic disk device according to claim 1, wherein said disk-shaped medium comprises a resin or glass substrate.

15. A method of manufacturing a magnetic disk device having a disk-shaped medium with a magnetic film formed on a surface for recording or reproducing information, and a magnetic head for recording on and reproducing information from said disk-shaped medium, comprising the steps of:
   forming a data recording region and a control signal recording region on said disk-shaped medium;
   forming concentric or spiral tracks in said data recording region, said tracks being impressed to have convexities as recording portions for recording data and concavities as guard bands for separating adjacent ones of said recording portions;
   forming impressed concavities and convexities in said control signal recording region which represent at least tracking marks for effecting tracking control of said magnetic head, track number indicating marks for identifying said tracks, and clock marks dividing one circumference into equal intervals, wherein said recording portions, said guard bands, and said control region convexities and concavities all contain said magnetic film therein; and
   assembling said disk-shaped medium and said magnetic head in a casing after said tracking marks, said track number indicating marks, and said clock marks have been formed and recorded on the disk-shaped medium.

* * * * *